(12) United States Patent
Abe

(10) Patent No.: US 7,764,839 B2
(45) Date of Patent: Jul. 27, 2010

(54) EDGE DETECTING APPARATUS AND METHOD, AND IMAGE SIZE ENLARGING AND REDUCING APPARATUS AND METHOD

(75) Inventor: Yuko Abe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1677 days.

(21) Appl. No.: 10/917,505

(22) Filed: Aug. 13, 2004

(65) Prior Publication Data

US 2005/0041871 A1 Feb. 24, 2005

(30) Foreign Application Priority Data

| Aug. 14, 2003 | (JP) | ............................. 2003-293486 |
| Aug. 14, 2003 | (JP) | ............................. 2003-293488 |
| Sep. 17, 2003 | (JP) | ............................. 2003-324568 |

(51) Int. Cl.
  *G06K 9/48* (2006.01)
(52) U.S. Cl. ....................... 382/199; 382/100; 382/190; 382/205; 382/266
(58) Field of Classification Search ................. 382/100, 382/190, 205, 206, 199, 266
See application file for complete search history.

(56) References Cited

U.S. PATENT DOCUMENTS

| 4,908,872 | A | * | 3/1990 | Toriu et al. ................... 382/197 |
| 5,054,100 | A | * | 10/1991 | Tai .............................. 382/300 |
| 5,418,899 | A | | 5/1995 | Aoki et al. |
| 5,446,804 | A | * | 8/1995 | Allebach et al. ............. 382/298 |
| 6,226,414 | B1 | * | 5/2001 | Go .............................. 382/240 |
| 6,618,097 | B1 | | 9/2003 | Yamada |
| 6,724,398 | B2 | | 4/2004 | Someya et al. |
| 6,771,835 | B2 | * | 8/2004 | Han et al. .................... 382/260 |
| 6,810,156 | B1 | * | 10/2004 | Itoh ........................... 382/300 |
| 7,245,326 | B2 | * | 7/2007 | Orlick ........................ 348/448 |
| 2004/0135798 | A1 | | 7/2004 | Someya et al. |
| 2005/0156944 | A1 | | 7/2005 | Someya et al. |

FOREIGN PATENT DOCUMENTS

| JP | 5-328106 | 12/1993 |
| JP | 11-69144 | 3/1999 |
| JP | 11-308442 | 11/1999 |
| JP | 2001-119610 | 4/2001 |
| JP | 2001-346070 | 12/2001 |
| JP | 2002-10070 | 1/2002 |
| JP | 2002-319020 | 10/2002 |

\* cited by examiner

*Primary Examiner*—Matthew C Bella
*Assistant Examiner*—Eric Rush
(74) *Attorney, Agent, or Firm*—McGinn IP Law Group, PLLC

(57) ABSTRACT

Filtering processing is performed with a difference filter and on two pixels in an image, which pixels are adjacent to each other, and a difference between pixel values of the two pixels, which are adjacent to each other, is thus obtained. A judgment is made as to whether an absolute value of the thus obtained difference is or is not equal to at least a predetermined threshold value. In cases where the absolute value of the difference has been judged to be equal to at least the predetermined threshold value, it is judged that an edge is located between the two pixels, which are adjacent to each other. Detection as to whether an edge is or is not located between the pixels in the image is thus capable of being made quickly with simple operation processing.

24 Claims, 28 Drawing Sheets

FIG.3 ☐-1☐1☐

FIG.24
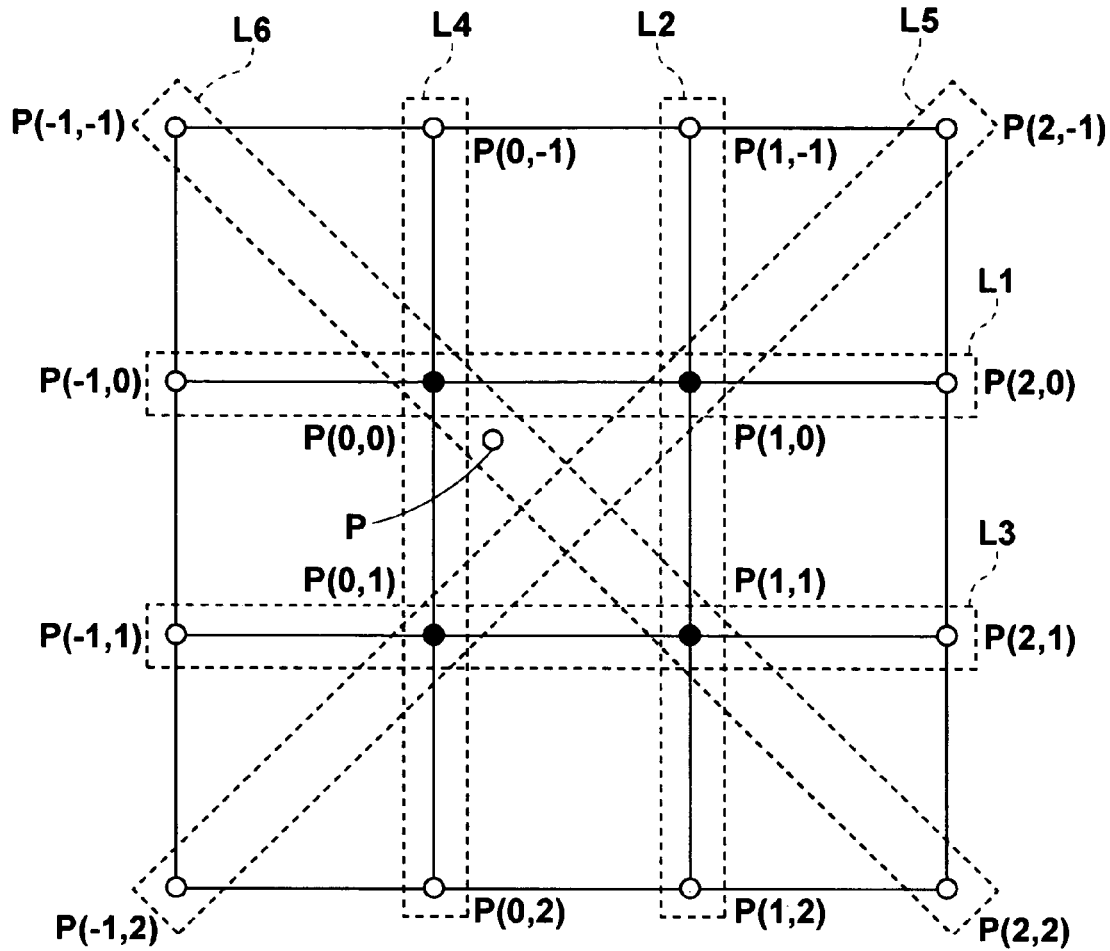
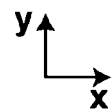
FIG.25
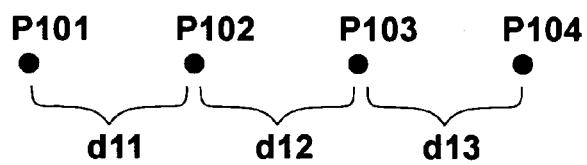

| | |
|---|---|
| ![Pattern 0] PATTERN 0 | · NO EDGE<br>· e1<br>· e2<br>· e3<br>· e4 |
| ![Pattern 1] PATTERN 1 | · e1,e2<br>· e1,e2,e5<br>· e1,e2,e6<br>· e1,e2,e3,e5<br>· e1,e2,e4,e5<br>· e1,e2,e5,e6 |
| ![Pattern 2] PATTERN 2 | · e2,e3<br>· e2,e3,e5<br>· e2,e3,e6<br>· e1,e2,e3,e6<br>· e1,e2,e4,e6<br>· e2,e3,e5,e6 |

| | |
|---|---|
| 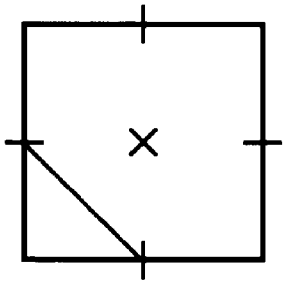<br>PATTERN 3 | • e3,e4<br>• e3,e4,e5<br>• e3,e4,e6<br>• e1,e3,e4,e5<br>• e2,e3,e4,e5<br>• e3,e4,e5,e6 |
| 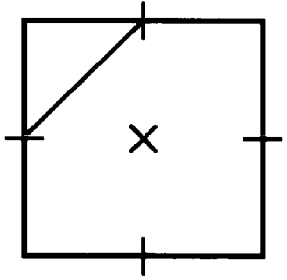<br>PATTERN 4 | • e1,e4<br>• e1,e4,e5<br>• e1,e4,e6<br>• e1,e2,e4,e6<br>• e1,e3,e4,e6<br>• e1,e4,e5,e6 |
| 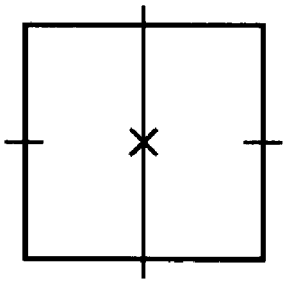<br>PATTERN 5 | • e1,e3<br>• e1,e5<br>• e1,e6<br>• e3,e5<br>• e3,e6<br>• e1,e2,e3<br>• e1,e3,e4<br>• e1,e3,e5<br>• e1,e3,e6<br>• e1,e5,e6<br>• e3,e5,e6<br>• e1,e3,e5,e6<br>• e1,e2,e3,e5,e6<br>• e1,e3,e4,e5,e6 |
FIG.28

| | |
|---|---|
| 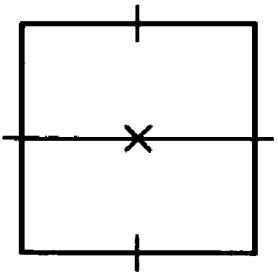<br>PATTERN 6 | · e2,e4<br>· e2,e5<br>· e2,e6<br>· e4,e5<br>· e4,e6<br>· e1,e2,e4<br>· e2,e3,e4<br>· e2,e4,e5<br>· e2,e4,e6<br>· e2,e5,e6<br>· e4,e5,e6<br>· e2,e4,e5,e6<br>· e1,e2,e4,e5,e6<br>· e2,e3,e4,e5,e6 |
| 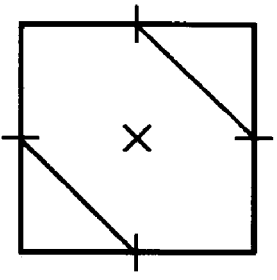<br>PATTERN 7 | · e1,e2,e3,e4 ※<br>· e1,e2,e3,e4,e5<br>· e1,e2,e3,e4,e5,e6 ※ |
| 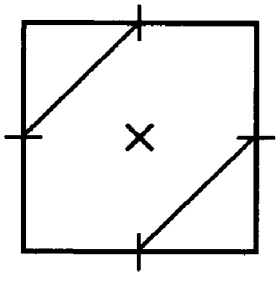<br>PATTERN 8 | · e1,e2,e3,e4 ※<br>· e1,e2,e3,e4,e6<br>· e1,e2,e3,e4,e5,e6 ※ |
FIG.29

EDGE DETECTING APPARATUS AND METHOD, AND IMAGE SIZE ENLARGING AND REDUCING APPARATUS AND METHOD

BACKGROUND OF THE INVENTION

1. Field of the Invention

This invention relates to an edge detecting apparatus and method for detecting an edge, which is located between pixels constituting an image, for use in, for example, processing for enlarging or reducing a size of the image represented by an image signal. This invention also relates to a profile judging apparatus and method for making a judgment as to a shape of a profile of values of pixels constituting an image. This invention further relates to an image size enlarging and reducing apparatus and method for enlarging and reducing a size of an image represented by an image signal. This invention still further relates to an image interpolation apparatus and method for interpolating a new pixel between pixels, which constitute an image, for use in processing for enlarging or reducing a size of the image represented by an image signal. This invention also relates to a computer program for causing a computer to execute the edge detecting method, the profile judging method, the image size enlarging and reducing method, or the image interpolation method. This invention further relates to a computer readable recording medium, on which the computer program has been recorded.

2. Description of the Related Art

Operations have heretofore been conducted, wherein an image signal, which has been obtained from a photoelectric readout of an image having been recorded on photographic film, or an image signal, which has been obtained from the imaging of an object with an imaging device, such as a digital camera or a portable telephone with camera, is subjected to processing for enlarging or reducing the size of the image represented by the image signal, such that the size of the image may be adapted to the size of a monitor utilized for reproducing the image from the image signal. In particular, services have heretofore been furnished wherein, at the time of sending of the image signal, which has been obtained from the imaging of the object with the portable telephone with camera, as electronic mail, the image signal is subjected to the processing for enlarging or reducing the size of the image represented by the image signal in accordance with the size of the liquid crystal monitor of the portable telephone to which the image signal is to be sent.

The image size enlargement or reduction processing on the image signal is performed with the processing, wherein a new pixel is interpolated between the pixels, which constitute the image represented by the image signal, in accordance with an enlargement scale factor. As techniques for interpolating the new pixel, various techniques, such as a linear interpolation technique, a nearest neighbor interpolation technique, a bilinear technique, and a bicubic technique, have heretofore been known.

Also, there has been proposed a technique, wherein a pixel (a pixel of interest), which is located at the position closest to the position of a new pixel, and adjacent pixels, which are adjacent to the pixel of interest, are selected, a difference value between the values of the adjacent pixels, which are located with the pixel of interest intervening therebetween, is calculated, a correction value is calculated in accordance with the difference value and a distance between the pixel of interest and the new pixel, and a pixel value of the new pixel is calculated in accordance with the pixel value of the pixel of interest, the difference value, and the correction value. (The technique described above is disclosed in, for example, U.S. Patent Laid-Open No. 20010787277.)

However, in cases where the image size enlargement or reduction processing on the image signal is performed with a single technique alone, the problems occur in that an edge area contained in the image is blurred or becomes shaggy. Therefore, a technique for detecting an edge component contained in an image and performing interpolating operations, in which different interpolating operation processes are utilized for the edge area and a non-edge area. (The technique described above is disclosed in, for example, Japanese Unexamined Patent Publication No. 2002-319020.)

In order for the edge to be detected from the image in the technique disclosed in Japanese Unexamined Patent Publication No. 2002-319020, or the like, a Sobel filter or a Laplacian filter is ordinarily utilized. Each of the Sobel filter and the Laplacian filter has an odd number of taps, e.g. three taps. With the filtering processing performed by use of the sobel filter or the Laplacian filter, a judgment is made as to whether a pixel of interest is or is not a pixel constituting an edge in an image, and the edge in the image is thus capable of being detected.

In cases where the image size enlargement or reduction processing is performed on an image, since a new pixel is to be interpolated between pixels, instead of a judgment being made as to whether an edge in an image is located at a pixel contained in the image, it is necessary that a judgment be made as to whether an edge in an image is or is not located between pixels. However, in cases where the detection of an edge is performed by use of the aforesaid filter having an odd number of the taps, a judgment is capable of being made merely as to whether a pixel of interest itself in an image is or is not a pixel constituting the edge in the image, and a judgment is not capable of being made as to whether an edge in the image is or is not located between pixels.

Also, with the aforesaid technique disclosed in Japanese Unexamined Patent Publication No. 2002-319020, the interpolating operations are performed, in which different interpolating operation processes are utilized for the edge area and the non-edge area. However, the known techniques described above are utilized as the interpolating operation processes, and therefore the problems still occur in that the edge area is blurred. For example, in cases where four pixels G1, G2, G3, and G4, which are adjacent in series to one another, have the shape of the profile as illustrated in FIG. 37A, a sharp edge is located between the pixel G2 and the pixel G3. Also, in cases where four pixels G1, G2, G3, and G4, which are adjacent in series to one another, have the shape of the profile as illustrated in FIG. 37B, an edge is located between the pixel G2 and the pixel G3. In the example illustrated in FIG. 37A or FIG. 37B, in cases where a pixel value of an interpolated pixel between the pixel G2 and the pixel G3 is calculated by use of, for example, the linear interpolation technique, a value lying on the straight line connecting the pixel G2 and the pixel G3, which are located in the vicinity of the interpolated pixel, is taken as the pixel value of the interpolated pixel. Therefore, regardless of the presence of the edge between the pixel G2 and the pixel G3, the variation in pixel value in the vicinity of the edge becomes smooth. As a result, the edge area in the image obtained from the image size enlargement or reduction processing becomes blurred.

Further, with the aforesaid various techniques, such as the linear interpolation technique, the nearest neighbor interpolation technique, the bilinear technique, and the bicubic technique, the pixel value of the new pixel is calculated by the utilization of the pixel values of the pixels, which are distributed in two-dimensional directions in the vicinity of the new pixel. Therefore, a long time is required to perform the interpolating operation.

Furthermore, with the aforesaid various techniques for the interpolation of the new pixel, in cases where an edge is located in the vicinity of the new pixel, the pixel value of the new pixel is calculated from the pixel value of a pixel, which is located on the edge, and the pixel value of a pixel, which is located at a position other than the edge. Therefore, the problems occur in that the edge area in the image obtained from the image size enlargement or reduction processing becomes blurred.

SUMMARY OF THE INVENTION

The primary object of the present invention is to provide an edge detecting apparatus, wherein an edge located between pixels constituting an image is capable of being detected.

Another object of the present invention is to provide an edge detecting method, wherein an edge located between pixels constituting an image is capable of being detected.

A further object of the present invention is to provide an profile judging apparatus, wherein a judgment is capable of being made as to a shape of a profile of pixel values of pixels constituting an image.

A still further object of the present invention is to provide an profile judging method, wherein a judgment is capable of being made as to a shape of a profile of pixel values of pixels constituting an image.

Another object of the present invention is to provide an image size enlarging and reducing apparatus, wherein an image size enlargement or reduction processing is capable of being performed quickly such that an edge area in an image may not be blurred.

A further object of the present invention is to provide an image size enlarging and reducing method, wherein an image size enlargement or reduction processing is capable of being performed quickly such that an edge area in an image may not be blurred.

A still further object of the present invention is to provide an image interpolation apparatus, wherein a new pixel is capable of being interpolated such that an edge area in an image may not be blurred.

Another object of the present invention is to provide an image interpolation method, wherein a new pixel is capable of being interpolated such that an edge area in an image may not be blurred.

A further object of the present invention is to provide a computer program for causing a computer to execute the edge detecting method, the profile judging method, the image size enlarging and reducing method, or the image interpolation method.

A still further object of the present invention is to provide a computer readable recording medium, on which the computer program has been recorded.

The present invention provides a first edge detecting apparatus, comprising:
  i) filtering means for performing filtering processing with a difference filter and on two pixels in an image, which pixels are adjacent to each other, and thereby obtaining a difference between pixel values of the two pixels, which are adjacent to each other, and
  ii) judgment means for making a judgment as to whether an absolute value of the thus obtained difference is or is not equal to at least a predetermined threshold value, the judgment means judging that, in cases where the absolute value of the difference has been judged to be equal to at least the predetermined threshold value, an edge is located between the two pixels, which are adjacent to each other.

The term "difference filter" as used herein embraces the filter for calculating a simple difference between the two pixels, which are adjacent to each other, and the filter capable of calculating a weighted difference. Specifically, a filter having an even number of taps, e.g. a filter having two taps with filter values of (−1, 1), may be employed as the difference filter.

The present invention also provides a second edge detecting apparatus, comprising:
  i) filtering means for:
    a) performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs, and
    b) performing filtering processing with a difference filter and on each of two primary difference pairs, each of the two primary difference pairs being constituted of two primary differences, which are adjacent to each other and are contained in the thus obtained three primary differences, and thereby obtaining a secondary difference between the two primary differences, which are adjacent to each other and constitute each of the two primary difference pairs, two secondary differences being obtained for the two primary difference pairs, and
  ii) detection means for making a detection as to whether an edge is or is not located between two middle pixels, which are among the four pixels that are adjacent in series to one another in the image, the detection being made in accordance with a relationship of positive and negative signs among the thus obtained three primary differences and the thus obtained two secondary differences.

The present invention further provides a third edge detecting apparatus, comprising:
  i) first filtering means for:
    a) performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs, and
    b) performing filtering processing with a difference filter and on each of two primary difference pairs, each of the two primary difference pairs being constituted of two primary differences, which are adjacent to each other and are contained in the thus obtained three primary differences, and thereby obtaining a secondary difference between the two primary differences, which are adjacent to each other and constitute each of the two primary difference pairs, two secondary differences being obtained for the two primary difference pairs,
  ii) second filtering means for performing filtering processing with a difference filter and on two middle pixels, which are among the four pixels that are adjacent in series to one another in the image, and thereby obtaining a difference between pixel values of the two middle pixels, which are among the four pixels that are adjacent in series to one another in the image, and iii) detection means for making a detection as to whether an edge is or is not located between the two middle pixels, which are among the four pixels that are adjacent in series to one another in the image, the detection being made in accordance with a relationship of positive and negative signs among the thus obtained three primary differences and the thus obtained two secondary differences, and in accordance with a result of a judgment having been made as to whether an absolute value of the thus obtained difference between the pixel values of the two middle pixels, which are among the four pixels that are adjacent in series to one another in the image, is or is not equal to at least a predetermined threshold value.

The present invention still further provides a first profile judging apparatus, comprising:

i) filtering means for:
  a) performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs, and
  b) performing filtering processing with a difference filter and on each of two primary difference pairs, each of the two primary difference pairs being constituted of two primary differences, which are adjacent to each other and are contained in the thus obtained three primary differences, and thereby obtaining a secondary difference between the two primary differences, which are adjacent to each other and constitute each of the two primary difference pairs, two secondary differences being obtained for the two primary difference pairs, and ii) judgment means for making a judgment as to a shape of a profile of pixel values in a region in the vicinity of the four pixels that are adjacent in series to one another in the image, the judgment being made in accordance with a relationship of positive and negative signs among the thus obtained three primary differences and the thus obtained two secondary differences.

The present invention also provides a second profile judging apparatus, comprising:

i) first filtering means for:
  a) performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs, and
  b) performing filtering processing with a difference filter and on each of two primary difference pairs, each of the two primary difference pairs being constituted of two primary differences, which are adjacent to each other and are contained in the thus obtained three primary differences, and thereby obtaining a secondary difference between the two primary differences, which are adjacent to each other and constitute each of the two primary difference pairs, two secondary differences being obtained for the two primary difference pairs, ii) second filtering means for performing filtering processing with a difference filter and on two middle pixels, which are among the four pixels that are adjacent in series to one another in the image, and thereby obtaining a difference between pixel values of the two middle pixels, which are among the four pixels that are adjacent in series to one another in the image, and iii) profile judging means for making a judgment as to a shape of a profile of pixel values in a region in the vicinity of the four pixels that are adjacent in series to one another in the image, the judgment being made in accordance with a relationship of positive and negative signs among the thus obtained three primary differences and the thus obtained two secondary differences, and in accordance with a result of a judgment having been made as to whether an absolute value of the thus obtained difference between the pixel values of the two middle pixels, which are among the four pixels that are adjacent in series to one another in the image, is or is not equal to at least a predetermined threshold value.

The present invention further provides a first edge detecting method, comprising the steps of:

i) performing filtering processing with a difference filter and on two pixels in an image, which pixels are adjacent to each other, a difference between pixel values of the two pixels, which are adjacent to each other, being obtained from the filtering processing, and ii) making a judgment as to whether an absolute value of the thus obtained difference is or is not equal to at least a predetermined threshold value, it being judged that, in cases where the absolute value of the difference has been judged to be equal to at least the predetermined threshold value, an edge is located between the two pixels, which are adjacent to each other.

The present invention still further provides a second edge detecting method, comprising the steps of:

i) performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs, ii) performing filtering processing with a difference filter and on each of two primary difference pairs, each of the two primary difference pairs being constituted of two primary differences, which are adjacent to each other and are contained in the thus obtained three primary differences, a secondary difference between the two primary differences, which are adjacent to each other and constitute each of the two primary difference pairs, being obtained from the filtering processing, two secondary differences being obtained for the two primary difference pairs, and iii) making a detection as to whether an edge is or is not located between two middle pixels, which are among the four pixels that are adjacent in series to one another in the image, the detection being made in accordance with a relationship of positive and negative signs among the thus obtained three primary differences and the thus obtained two secondary differences.

The present invention also provides a third edge detecting method, comprising the steps of:

i) performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs, ii) performing filtering processing with a difference filter and on each of two primary difference pairs, each of the two primary difference pairs being constituted of two primary differences, which are adjacent to each other and are contained in the thus obtained three primary differences, a secondary difference between the two primary differences, which are adjacent to each other and constitute each of the two primary difference pairs, being obtained from the filtering processing, two secondary differences being obtained for the two primary difference pairs, iii) performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing, and iv) making a detection as to whether an edge is or is not located between the two middle pixels, which are among the four pixels that are adjacent in series to one another in the image, the detection being made in accordance with a relationship of positive and negative signs among the thus obtained three primary differences and the thus obtained two secondary differences, and in accordance with a result of a judgment having been made as to whether an absolute value of the thus obtained difference between the pixel values of the two middle pixels, which are among the four pixels that are adjacent in series to one another in the image, is or is not equal to at least a predetermined threshold value.

The present invention further provides a first profile judging method, comprising the steps of:

i) performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs, ii) performing filtering processing with a difference filter and on each of two primary difference pairs, each of the two primary difference pairs being constituted of two primary differences, which are adjacent to each other and are contained in the thus obtained three primary differences, a secondary difference between the two primary differences, which are adjacent to each other and constitute each of the two primary difference pairs, being obtained from the filtering processing, two secondary differences being obtained for the two primary difference pairs, and iii) making a judgment as to a shape of a profile of pixel values in a region in the vicinity of the four pixels that are adjacent in series to one another in the image, the judgment being made in accordance with a relationship of positive and negative signs among the thus obtained three primary differences and the thus obtained two secondary differences.

The present invention still further provides a second profile judging method, comprising the steps of:

i) performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs, ii) performing filtering processing with a difference filter and on each of two primary difference pairs, each of the two primary difference pairs being constituted of two primary differences, which are adjacent to each other and are contained in the thus obtained three primary differences, a secondary difference between the two primary differences, which are adjacent to each other and constitute each of the two primary difference pairs, being obtained from the filtering processing, two secondary differences being obtained for the two primary difference pairs, iii) performing filtering processing with a difference filter and on two middle pixels, which are among the four pixels that are adjacent in series to one another in the image, a difference between pixel values of the two middle pixels, which are among the four pixels that are adjacent in series to one anotherin the image, being obtained from the filtering processing, and iv) making a judgment as to a shape of a profile of pixel values in a region in the vicinity of the four pixels that are adjacent in series to one another in the image, the judgment being made in accordance with a relationship of positive and negative signs among the thus obtained three primary differences and the thus obtained two secondary differences, and in accordance with a result of a judgment having been made as to whether an absolute value of the thus obtained difference between the pixel values of the two middle pixels, which are among the four pixels that are adjacent in series to one another in the image, is or is not equal to at least a predetermined threshold value.

The present invention also provides a computer program for causing a computer to execute the edge detecting method or the profile judging method in accordance with the present invention.

The present invention further provides a computer readable recording medium, on which the computer program has been recorded.

A skilled artisan would know that the computer readable recording medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of the present invention. Additionally, computer code/instructions include, but are not limited to, source, object, and executable code and can be in any language including higher level languages, assembly language, and machine language.

With the first edge detecting apparatus and method in accordance with the present invention, the filtering processing with the difference filter is performed on the two pixels in the image, which pixels are adjacent to each other, and the difference between the pixel values of the two pixels, which are adjacent to each other, is obtained from the filtering processing. Also, the judgment is made as to whether the absolute value of the thus obtained difference is or is not equal to at least the predetermined threshold value. In cases where the absolute value of the difference has been judged to be equal to at least the predetermined threshold value, it may be regarded that an edge is located between the two pixels, which are adjacent to each other. Therefore, with the first edge detecting apparatus and method in accordance with the present invention, wherein the judgment is made as to whether the absolute value of the thus obtained difference is or is not equal to at least the predetermined threshold value, instead of a detection being made as to whether an edge is or is not located at a pixel in the image, the detection is capable of being made as to whether an edge is or is not located between pixels in the image. Also, since it is sufficient for the difference described above to be calculated, the detection as to whether an edge is or is not located between the pixels in the image is capable of being made quickly with simple operation processing.

With the second edge detecting apparatus and method in accordance with the present invention, the filtering processing with the difference filter is performed on each of the three pixel pairs, each of the three pixel pairs being constituted of the two pixels, which are adjacent to each other and are contained in the four pixels that are adjacent in series to one another in the image, and the primary difference between the pixel values of the two pixels, which are adjacent to each other and constitute each of the three pixel pairs, is obtained from the filtering processing. In this manner, the three primary differences are obtained for the three pixel pairs. Also, the filtering processing with the difference filter is performed on each of the two primary difference pairs, each of the two primary difference pairs being constituted of the two primary differences, which are adjacent to each other and are contained in the thus obtained three primary differences, and the secondary difference between the two primary differences, which are adjacent to each other and constitute each of the two primary difference pairs, is obtained from the filtering processing. In this manner, the two secondary differences are obtained for the two primary difference pairs. In accordance with the relationship of positive and negative signs among the thus obtained three primary differences and the thus obtained two secondary differences, the profile of the pixel values of the four pixels that are adjacent in series to one another in the image is capable of being classified. Also, from the relationship of positive and negative signs among the thus obtained three primary differences and the thus obtained two secondary differences, a judgment is capable of being made as to whether an edge is or is not located between the two middle pixels, which are among the four pixels that are adjacent in series to one another in the image. Therefore, with the second edge detecting apparatus and method in accordance with the present invention, the detection is made as to whether an edge is or is not located between the two middle pixels, which are among the four pixels that are adjacent in series to one another in the image, the detection being made in accordance with the relationship of positive and negative signs among the thus obtained three primary differences and the thus obtained two secondary differences. In such cases, instead of a detection being made as to whether an edge is or is not located at a pixel in the image, the detection is capable of being made as to whether an edge is or is not located between pixels in the image. Also, since it is sufficient for the differences described above to be calculated, the detection as to whether an edge is or is not located between the pixels in the image is capable of being made quickly with simple operation processing.

With the third edge detecting apparatus and method in accordance with the present invention, the filtering processing with the difference filter is performed on each of the three pixel pairs, each of the three pixel pairs being constituted of the two pixels, which are adjacent to each other and are contained in four pixels that are adjacent in series to one another in an image, and the primary difference between the pixel values of the two pixels, which are adjacent to each other and constitute each of the three pixel pairs, is obtained from the filtering processing. In this manner, the three primary differences are obtained for the three pixel pairs. Also, the filtering processing with the difference filter is performed on each of the two primary difference pairs, each of the two primary difference pairs being constituted of the two primary differences, which are adjacent to each other and are contained in the thus obtained three primary differences, and the secondary difference between the two primary differences, which are adjacent to each other and constitute each of the two primary difference pairs, is obtained from the filtering processing. In this manner, the two secondary differences are obtained for the two primary difference pairs. Further, the filtering processing with the difference filter is performed on the two middle pixels, which are among the four pixels that are adjacent in series to one another in the image, and the difference between the pixel values of the two middle pixels, which are among the four pixels that are adjacent in series to one another in the image, is obtained from the filtering processing. In accordance with the relationship of positive and negative signs among the thus obtained three primary differences and the thus obtained two secondary differences, the profile of the pixel values of the four pixels that are adjacent in series to one another in the image is capable of being classified. Also, from the relationship of positive and negative signs among the thus obtained three primary differences and the thus obtained two secondary differences, a judgment is capable of being made as to whether an edge is or is not located between the two middle pixels, which are among the four pixels that are adjacent in series to one another in the image. Further, in cases where it has been judged that an edge is located between the two middle pixels, if the absolute value of the difference between the pixel values of the two middle pixels is small, a likelihood ratio of the presence of an edge between the two middle pixels will be low. However, if the absolute value of the difference between the pixel values of the two middle pixels is large, it may be regarded that a true edge is located between the two middle pixels. Therefore, with the third edge detecting apparatus and method in accordance with the present invention, the detection is made as to whether an edge is or is not located between the two middle pixels, which are among the four pixels that are adjacent in series to one another in the image, the detection being made in accordance with the relationship of positive and negative signs among the thus obtained three primary differences and the thus obtained two secondary differences, and in accordance with the result of the judgment having been made as to whether the absolute value of the thus obtained difference between the pixel values of the two middle pixels, which are among the four pixels that are adjacent in series to one another in the image, is or is not equal to at least the predetermined threshold value. In such cases, instead of a detection being made as to whether an edge is or is not located at a pixel in the image, the detection is capable of being made reliably as to whether an edge is or is not located between pixels in the image. Also, since it is sufficient for the differences described above to be calculated, the detection as to whether an edge is or is not located between the pixels in the image is capable of being made quickly with simple operation processing.

With the first profile judging apparatus and method in accordance with the present invention, the filtering processing with the difference filter is performed on each of the three pixel pairs, each of the three pixel pairs being constituted of the two pixels, which are adjacent to each other and are contained in the four pixels that are adjacent in series to one another in the image, and the primary difference between the pixel values of the two pixels, which are adjacent to each other and constitute each of the three pixel pairs, is obtained from the filtering processing. In this manner, the three primary differences are obtained for the three pixel pairs. Also, the filtering processing with the difference filter is performed on each of the two primary difference pairs, each of the two primary difference pairs being constituted of the two primary differences, which are adjacent to each other and are contained in the thus obtained three primary differences, and the secondary difference between the two primary differences, which are adjacent to each other and constitute each of the two primary difference pairs, is obtained from the filtering processing. In this manner, the two secondary differences are obtained for the two primary difference pairs. In accordance with the relationship of positive and negative signs among the thus obtained three primary differences and the thus obtained two secondary differences, the shape of the profile of the pixel values of the four pixels that are adjacent in series to one another in the image is capable of being classified. Also, from the relationship of positive and negative signs among the thus obtained three primary differences and the thus obtained two secondary differences, a judgment is capable of being made as to whether the shape of the profile of the pixel values of the four pixels that are adjacent in series to one another in the image takes a shape representing the presence of an edge or a shape representing the absence of an edge. Therefore, with the first profile judging apparatus and method, the judgment is made as to the shape of the profile of the pixel values in the region in the vicinity of the four pixels that are adjacent in series to one another in the image, the judgment being made in accordance with the relationship of positive and negative signs among the thus obtained three primary differences and the thus obtained two secondary differences. In such cases, the judgment is capable of being made as to, for example, whether an edge is or is not located in the vicinity of the four pixels that are adjacent in series to one another in the image.

With the second profile judging apparatus and method in accordance with the present invention, the filtering processing with the difference filter is performed on each of the three pixel pairs, each of the three pixel pairs being constituted of the two pixels, which are adjacent to each other and are contained in four pixels that are adjacent in series to one another in an image, and the primary difference between the pixel values of the two pixels, which are adjacent to each other and constitute each of the three pixel pairs, is obtained from the filtering processing. In this manner, the three primary differences are obtained for the three pixel pairs. Also, the filtering processing with the difference filter is performed on each of the two primary difference pairs, each of the two primary difference pairs being constituted of the two primary differences, which are adjacent to each other and are contained in the thus obtained three primary differences, and the secondary difference between the two primary differences, which are adjacent to each other and constitute each of the two primary difference pairs, is obtained from the filtering processing. In this manner, the two secondary differences are obtained for the two primary difference pairs. Further, the filtering processing with the difference filter is performed on the two middle pixels, which are among the four pixels that are adjacent in series to one another in the image, and the difference between the pixel values of the two middle pixels, which are among the four pixels that are adjacent in series to one another in the image, is obtained from the filtering processing. In accordance with the relationship of positive and negative signs among the thus obtained three primary differences and the thus obtained two secondary differences, the shape of the profile of the pixel values of the four pixels that are adjacent in series to one another in the image is capable of being classified. Also, from the relationship of positive and negative signs among the thus obtained three primary differences and the thus obtained two secondary differences, a judgment is capable of being made as to whether the shape of the profile of the pixel values of the four pixels that are adjacent in series to one another in the image takes a shape representing the presence of an edge or a shape representing the absence of an edge. Further, in cases where it has been judged that the shape of the profile of the pixel values of the four pixels that are adjacent in series to one another in the image takes a shape representing the presence of an edge, if the absolute value of the difference between the pixel values of the two middle pixels is small, the likelihood ratio of the presence of an edge between the two middle pixels will be low. However, if the absolute value of the difference between the pixel values of the two middle pixels is large, it may be regarded that a true edge is located between the two middle pixels, and that the shape of the profile of the pixel values of the four pixels that are adjacent in series to one another in the image represents the presence of the true edge. Therefore, with the second profile judging apparatus and method in accordance with the present invention, the judgment is made as to the shape of the profile of the pixel values in the region in the vicinity of the four pixels that are adjacent in series to one another in the image, the judgment being made in accordance with the relationship of positive and negative signs among the thus obtained three primary differences and the thus obtained two secondary differences, and in accordance with the result of the judgment having been made as to whether the absolute value of the thus obtained difference between the pixel values of the two middle pixels, which are among the four pixels that are adjacent in series to one another in the image, is or is not equal to at least the predetermined threshold value. In such cases, the judgment is capable of being made reliably as to, for example, whether an edge is or is not located in the vicinity of the four pixels that are adjacent in series to one another in the image.

The present invention also provides an image size enlarging and reducing apparatus, comprising:

i) filtering means for:
a) performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs, and
b) performing filtering processing with a difference filter and on each of two primary difference pairs, each of the two primary difference pairs being constituted of two primary differences, which are adjacent to each other and are contained in the thus obtained three primary differences, and thereby obtaining a secondary difference between the two primary differences, which are adjacent to each other and constitute each of the two primary difference pairs, two secondary differences being obtained for the two primary difference pairs, ii) detection means for making a detection as to whether an edge is or is not located between two middle pixels, which are among the four pixels that are adjacent in series to one another in the image, the detection being made in accordance with a relationship of positive and negative signs among the thus obtained three primary differences and the thus obtained two secondary differences, iii) boundary setting means for setting a predetermined boundary between the two middle pixels, which are among the four pixels that are adjacent in series to one another in the image, in cases where it has been detected that an edge is located between the two middle pixels, iv) judgment means for making a judgment as to whether a position of a new pixel to be interpolated between the two middle pixels, which are among the four pixels that are adjacent in series to one another in the image, is located on one side of the predetermined boundary or is located on the other side of the predetermined boundary, v) interpolating operation means for operating such that:

a) in cases where it has been judged that the position of the new pixel is located on the one side of the predetermined boundary, the interpolating operation means performs an interpolating operation by use of the pixel value of at least one pixel, which is located on the one side of the predetermined boundary in the image, in order to calculate a pixel value of the new pixel, b) in cases where it has been judged that the position of the new pixel is located on the other side of the predetermined boundary, the interpolating operation means performs an interpolating operation by use of the pixel value of at least one pixel, which is located on the other side of the predetermined boundary in the image, in order to calculate a pixel value of the new pixel, and c) in cases where it has been detected that an edge is not located between the two middle pixels, which are among the four pixels that are adjacent in series to one another in the image, the interpolating operation means performs a predetermined interpolating operation in order to calculate a pixel value of the new pixel, and vi) control means for controlling the filtering means, the detection means, the boundary setting means, the judgment means, and the interpolating operation means such that:

a) the filtering processing, the detection as to whether an edge is or is not located between the two middle pixels, which are among the four pixels that are adjacent in series to one another in the image, the setting of the predetermined boundary between the two middle pixels in cases where it has been detected that an edge is located between the two middle pixels, the judgment made as to the position of the new pixel in cases where it has been detected that an edge is located between the two middle pixels, the calculation, which is made to find the pixel value of the new pixel in cases where it has been detected that an edge is located between the two middle pixels, and the calculation, which is made to find the pixel value of the new pixel in cases where it has been detected that an edge is not located between the two middle pixels, are performed with respect to one direction in the image, an image, which has a size having been enlarged or reduced with respect to the one direction in the image, being thereby obtained, and b) the filtering processing, the detection as to whether an edge is or is not located between the two middle pixels, which are among the four pixels that are adjacent in series to one another in the image, the setting of the predetermined boundary between the two middle pixels in cases where it has been detected that an edge is located between the two middle pixels, the judgment made as to the position of the new pixel in cases where it has been detected that an edge is located between the two middle pixels, the calculation, which is made to find the pixel value of the new pixel in cases where it has been detected that an edge is located between the two middle pixels, and the calculation, which is made to find the pixel value of the new pixel in cases where it has been detected that an edge is not located between the two middle pixels, are thereafter performed with respect to the other direction in the image, an image, which has a size having been enlarged or reduced with respect to the other direction in the image, being thereby obtained, whereby the image, which has a size having been enlarged or reduced with respect to the one direction and the other direction in the image, is obtained.

The difference filter may be the filter for calculating a simple difference between the two pixels, which are adjacent to each other. Alternatively, the difference filter may be the filter capable of calculating a weighted difference. Specifically, a filter having an even number of taps, e.g. a filter having two taps with filter values of $(-1, 1)$, may be employed as the difference filter.

As the predetermined boundary, a line bisecting the distance between the two middle pixels may be employed.

The predetermined interpolating operation, which is performed in cases where it has been detected that an edge is not located between the two middle pixels, may be performed with one of various known techniques, such as the linear interpolation technique, the nearest neighbor interpolation technique, the bilinear technique, and the bicubic technique. In particular, the predetermined interpolating operation should preferably be performed with respect to a one-dimensional direction alone.

The image size enlarging and reducing apparatus in accordance with the present invention may be modified such that the filtering means further performs filtering processing with a difference filter and on two middle pixels, which are among the four pixels that are adjacent in series to one another in the image, and thereby obtains a difference between pixel values of the two middle pixels, which are among the four pixels that are adjacent in series to one another in the image, and the detection means makes the detection as to whether an edge is or is not located between the two middle pixels, which are among the four pixels that are adjacent in series to one another in the image, the detection being made in accordance with the relationship of positive and negative signs among the thus obtained three primary differences and the thus obtained two secondary differences, and in accordance with a result of a judgment having been made as to whether an absolute value of the thus obtained difference between the pixel values of the two middle pixels, which are among the four pixels that are adjacent in series to one another in the image, is or is not equal to at least a predetermined threshold value.

The present invention further provides an image size enlarging and reducing method, comprising the steps of:

i) performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs, ii) performing filtering processing with a difference filter and on each of two primary difference pairs, each of the two primary difference pairs being constituted of two primary differences, which are adjacent to each other and are contained in the thus obtained three primary differences, a secondary difference between the two primary differences, which are adjacent to each other and constitute each of the two primary difference pairs, being obtained from the filtering processing, two secondary differences being obtained for the two primary difference pairs, iii) making a detection as to whether an edge is or is not located between two middle pixels, which are among the four pixels that are adjacent in series to one another in the image, the detection being made in accordance with a relationship of positive and negative signs among the thus obtained three primary differences and the thus obtained two secondary differences, iv) setting a predetermined boundary between the two middle pixels, which are among the four pixels that are adjacent in series to one another in the image, in cases where it has been detected that an edge is located between the two middle pixels, v) making a judgment as to whether a position of a new pixel to be interpolated between the two middle pixels, which are among the four pixels that are adjacent in series to one another in the image, is located on one side of the predetermined boundary or is located on the other side of the predetermined boundary, vi) performing operation processing such that:
a) in cases where it has been judged that the position of the new pixel is located on the one side of the predetermined boundary, an interpolating operation is performed by use of the pixel value of at least one pixel, which is located on the one side of the predetermined boundary in the image, a pixel value of the new pixel being thereby calculated,
b) in cases where it has been judged that the position of the new pixel is located on the other side of the predetermined boundary, an interpolating operation is performed by use of the pixel value of at least one pixel, which is located on the other side of the predetermined boundary in the image, a pixel value of the new pixel being thereby calculated, and
c) in cases where it has been detected that an edge is not located between the two middle pixels, which are among the four pixels that are adjacent in series to one another in the image, a predetermined interpolating operation is performed, a pixel value of the new pixel being thereby calculated, and vii) making control such that:
a) the filtering processing, the detection as to whether an edge is or is not located between the two middle pixels, which are among the four pixels that are adjacent in series to one another in the image, the setting of the predetermined boundary between the two middle pixels in cases where it has been detected that an edge is located between the two middle pixels, the judgment made as to the position of the new pixel in cases where it has been detected that an edge is located between the two middle pixels, the calculation, which is made to find the pixel value of the new pixel in cases where it has been detected that an edge is located between the two middle pixels, and the calculation, which is made to find the pixel value of the new pixel in cases where it has been detected that an edge is not located between the two middle pixels, are performed with respect to one direction in the image, an image, which has a size having been enlarged or reduced with respect to the one direction in the image, being thereby obtained, and
b) the filtering processing, the detection as to whether an edge is or is not located between the two middle pixels, which are among the four pixels that are adjacent in series to one another in the image, the setting of the predetermined boundary between the two middle pixels in cases where it has been detected that an edge is located between the two middle pixels, the judgment made as to the position of the new pixel in cases where it has been detected that an edge is located between the two middle pixels, the calculation, which is made to find the pixel value of the new pixel in cases where it has been detected that an edge is located between the two middle pixels, and the calculation, which is made to find the pixel value of the new pixel in cases where it has been detected that an edge is not located between the two middle pixels, are thereafter performed with respect to the other direction in the image, an image, which has a size having been enlarged or reduced with respect to the other direction in the image, being thereby obtained, whereby the image, which has a size having been enlarged or reduced with respect to the one direction and the other direction in the image, is obtained.

The image size enlarging and reducing method in accordance with the present invention may be modified such that the method further comprises the step of: performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing, and the detection as to whether an edge is or is not located between the two middle pixels, which are among the four pixels that are adjacent in series to one another in the image, is made in accordance with the relationship of positive and negative signs among the thus obtained three primary differences and the thus obtained two secondary differences, and in accordance with a result of a judgment having been made as to whether an absolute value of the thus obtained difference between the pixel values of the two middle pixels, which are among the four pixels that are adjacent in series to one another in the image, is or is not equal to at least a predetermined threshold value.

The present invention still further provides a computer program for causing a computer to execute the image size enlarging and reducing method in accordance with the present invention.

The present invention also provides a computer readable recording medium, on which the computer program has been recorded.

With the image size enlarging and reducing apparatus and method in accordance with the present invention, with respect to the one direction in the image, the filtering processing with the difference filter is performed on each of the three pixel pairs, each of the three pixel pairs being constituted of the two pixels, which are adjacent to each other and are contained in the four pixels that are adjacent in series to one another in the image, and the primary difference between the pixel values of the two pixels, which are adjacent to each other and constitute each of the three pixel pairs, is obtained from the filtering processing. In this manner, the three primary differences are obtained for the three pixel pairs. Also, the filtering processing with the difference filter is performed on each of the two primary difference pairs, each of the two primary difference pairs being constituted of the two primary differences, which are adjacent to each other and are contained in the thus obtained three primary differences, and the secondary difference between the two primary differences, which are adjacent to each other and constitute each of the two primary difference pairs, is obtained from the filtering processing. In this manner, the two secondary differences are obtained for the two primary difference pairs. In accordance with the relationship of positive and negative signs among the thus obtained three primary differences and the thus obtained two secondary differences, the profile of the pixel values of the four pixels that are adjacent in series to one another in the image is capable of being classified. Also, from the relationship of positive and negative signs among the thus obtained three primary differences and the thus obtained two secondary differences, a judgment is capable of being made as to whether an edge is or is not located between the two middle pixels, which are among the four pixels that are adjacent in series to one another in the image. Therefore, with the image size enlarging and reducing apparatus and method in accordance with the present invention, the detection is made as to whether an edge is or is not located between the two middle pixels, which are among the four pixels that are adjacent in series to one another in the image, the detection being made in accordance with the relationship of positive and negative signs among the thus obtained three primary differences and the thus obtained two secondary differences. In such cases, instead of a detection being made as to whether an edge is or is not located at a pixel in the image, the detection is capable of being made as to whether an edge is or is not located between pixels in the image.

Also, with the image size enlarging and reducing apparatus and method in accordance with the present invention, in cases where it has been detected that an edge is located between the two middle pixels, which are among the four pixels that are adjacent in series to one another in the image, the predetermined boundary is set between the two middle pixels, and the judgment is made as to whether the position of the new pixel to be interpolated between the two middle pixels, which are among the four pixels that are adjacent in series to one another in the image, is located on the one side of the predetermined boundary or is located on the other side of the predetermined boundary. In cases where it has been judged that the position of the new pixel is located on the one side of the predetermined boundary, the interpolating operation is performed by use of the pixel value of at least one pixel, which is located on the one side of the predetermined boundary in the image, and the pixel value of the new pixel is thereby calculated. In cases where it has been judged that the position of the new pixel is located on the other side of the predetermined boundary, the interpolating operation is performed by use of the pixel value of at least one pixel, which is located on the other side of the predetermined boundary in the image, and the pixel value of the new pixel is thereby calculated. Therefore, the pixel value of the new pixel is not affected by the pixel values of the pixels, which are located on opposite sides of the new pixel, and reflects only the pixel value of the at least one pixel, which is located on the single side of the new pixel. Accordingly, with the image size enlarging and reducing apparatus and method in accordance with the present invention, the calculation of the pixel value of the new pixel is capable of being made such that less blurring of the edge may occur than in cases where, as illustrated in FIG. 37A or FIG. 37B, the pixel value of the new pixel is calculated by use of the pixel values of the pixels, which are located on opposite sides of the new pixel. In cases where it has been detected that an edge is not located between the two middle pixels, which are among the four pixels that are adjacent in series to one another in the image, the predetermined interpolating operation is performed, and the pixel value of the new pixel is thereby calculated.

Further, with the image size enlarging and reducing apparatus and method in accordance with the present invention, the calculation of the pixel value of the new pixel is made with respect to the one direction in the image, and the image, which has a size having been enlarged or reduced with respect to the one direction in the image, is thereby obtained. Furthermore, the calculation of the pixel value of the new pixel is made with respect to the other direction in the image, and the image, which has a size having been enlarged or reduced with respect to the other direction in the image, is thereby obtained. In this manner, the image, which has a size having been enlarged or reduced with respect to both the one direction and the other direction in the image, is obtained.

As described above, with the image size enlarging and reducing apparatus and method in accordance with the present invention, at the time of the detection made as to the location of an edge, it is sufficient for the differences described above to be calculated. Therefore, the detection as to whether an edge is or is not located between the pixels in the image is capable of being made quickly with simple operation processing. Also, since the calculation of the pixel value of the new pixel is made such that the blurring of the edge may be suppressed, the image, which has a size having been enlarged or reduced, is capable of being obtained such that the image may be free from the blurring of the edge.

Further, in cases where it has been judged that an edge is located between the two middle pixels, if the absolute value of the difference between the pixel values of the two middle pixels is small, the likelihood ratio of the presence of an edge between the two middle pixels will be low. However, if the absolute value of the difference between the pixel values of the two middle pixels is large, it may be regarded that a true edge is located between the two middle pixels. Therefore, with the modifications of the image size enlarging and reducing apparatus and method in accordance with the present invention, the detection is made as to whether an edge is or is not located between the two middle pixels, which are among the four pixels that are adjacent in series to one another in the image, the detection being made in accordance with the relationship of positive and negative signs among the thus obtained three primary differences and the thus obtained two secondary differences, and in accordance with the result of the judgment having been made as to whether the absolute value of the thus obtained difference between the pixel values of the two middle pixels, which are among the four pixels that are adjacent in series to one another in the image, is or is not equal to at least the predetermined threshold value. In such cases, instead of a detection being made as to whether an edge is or is not located at a pixel in the image, the detection is capable of being made reliably as to whether an edge is or is not located between pixels in the image.

Furthermore, with the image size enlarging and reducing apparatus and method in accordance with the present invention, in cases where it has been detected that an edge is located between the two middle pixels, the calculation of the pixel value of the new pixel is performed with respect to the one direction in the image, and the image, which has a size having been enlarged or reduced with respect to the one direction in the image, is thereby obtained. Thereafter, the calculation of the pixel value of the new pixel is performed with respect to the other direction in the image, and the image, which has a size having been enlarged or reduced with respect to the other direction in the image, is thereby obtained. Therefore, the calculations of the pixel values of the new pixels are capable of being performed more quickly than in cases where the calculations of the pixel values of the new pixels are performed with one time of operation processing, which is carried out in two-dimensional directions.

The present invention further provides an image interpolation apparatus for interpolating a new pixel between pixels in an image at the time of image size enlargement or reduction processing, the apparatus comprising:

i) judgment means for operating such that, in cases where it has been detected that an edge is located between pixels in the image, which pixels are located in the vicinity of the new pixel, the judgment means makes a judgment as to whether a position of the new pixel is located on one side of the edge or is located on the other side of the edge, and ii) interpolating operation means for operating such that:

a) in cases where it has been judged that the position of the new pixel is located on the one side of the edge, the interpolating operation means performs an interpolating operation by use of a pixel value of at least one pixel, which is located in the vicinity of the new pixel and on the one side of the edge in the image, in order to calculate a pixel value of the new pixel, and b) in cases where it has been judged that the position of the new pixel is located on the other side of the edge, the interpolating operation means performs an interpolating operation by use of a pixel value of at least one pixel, which is located in the vicinity of the new pixel and on the other side of the edge in the image, in order to calculate a pixel value of the new pixel.

In cases where it has been detected that an edge is not located between the pixels, between which the new pixel is to be interpolated, the pixel value of the new pixel to be interpolated may be calculated with one of various known techniques, such as the linear interpolation technique, the nearest neighbor interpolation technique, the bilinear technique, and the bicubic technique.

The image interpolation apparatus in accordance with the present invention may be modified such that the interpolating operation is an operation for:

representing a position of each of three pixels, which are located in the vicinity of the new pixel, by an x coordinate and a y coordinate, representing a pixel value of each of the three pixels, which are located in the vicinity of the new pixel, by a z coordinate, setting a plane, which passes through the z coordinates of the pixel values of the three pixels located in the vicinity of the new pixel, and taking a value of the z coordinate, which corresponds to the x and y coordinates of the new pixel, in the thus set plane as the pixel value of the new pixel.

The present invention still further provides an image interpolation method for interpolating a new pixel between pixels in an image at the time of image size enlargement or reduction processing, the method comprising the steps of:

i) operating such that, in cases where it has been detected that an edge is located between pixels in the image, which pixels are located in the vicinity of the new pixel, a judgment is made as to whether a position of the new pixel is located on one side of the edge or is located on the other side of the edge, and ii) performing an interpolating operation such that:

a) in cases where it has been judged that the position of the new pixel is located on the one side of the edge, the interpolating operation is performed by use of a pixel value of at least one pixel, which is located in the vicinity of the new pixel and on the one side of the edge in the image, a pixel value of the new pixel being calculated with the interpolating operation, and b) in cases where it has been judged that the position of the new pixel is located on the other side of the edge, the interpolating operation is performed by use of a pixel value of at least one pixel, which is located in the vicinity of the new pixel and on the other side of the edge in the image, a pixel value of the new pixel being calculated with the interpolating operation.

The image interpolation method in accordance with the present invention may be modified such that the interpolating operation is an operation for:

representing a position of each of three pixels, which are located in the vicinity of the new pixel, by an x coordinate and a y coordinate, representing a pixel value of each of the three pixels, which are located in the vicinity of the new pixel, by a z coordinate, setting a plane, which passes through the z coordinates of the pixel values of the three pixels located in the vicinity of the new pixel, and taking a value of the z coordinate, which corresponds to the x and y coordinates of the new pixel, in the thus set plane as the pixel value of the new pixel.

The present invention also provides a computer program for causing a computer to execute the image interpolation method in accordance with the present invention.

The present invention further provides a computer readable recording medium, on which the computer program has been recorded.

With the image interpolation apparatus and method in accordance with the present invention, in cases where it has been detected that an edge is located between pixels in the image, which pixels are located in the vicinity of the new pixel, the judgment is made as to whether the position of the new pixel is located on the one side of the edge or is located on the other side of the edge. In cases where it has been judged that the position of the new pixel is located on the one side of the edge, the interpolating operation is performed by use of the pixel value of the at least one pixel, which is located in the vicinity of the new pixel and on the one side of the edge in the image, and the pixel value of the new pixel is calculated with the interpolating operation. Also, in cases where it has been judged that the position of the new pixel is located on the other side of the edge, the interpolating operation is performed by use of the pixel value of the at least one pixel, which is located in the vicinity of the new pixel and on the other side of the edge in the image, and the pixel value of the new pixel is calculated with the interpolating operation. Therefore, the pixel value of the new pixel is not affected by the pixel values of the pixels, which are located on opposite sides of the new pixel, and reflects only the pixel value of the at least one pixel, which is located on the single side of the new pixel. Accordingly, with the image interpolation apparatus and method in accordance with the present invention, in cases where it has been detected that an edge is located between the pixels, between which the new pixel is to be interpolated, the calculation of the pixel value of the new pixel is capable of being made such that less blurring of the edge may occur than in cases where the pixel value of the new pixel is calculated by use of the pixel values of all pixels, which are located in the vicinity of the new pixel, regardless of the presence or absence of the edge. In this manner, the image, which has a size having been enlarged or reduced, is capable of being obtained such that the image may be free from the blurring of the edge.

The image interpolation apparatus and method in accordance with the present invention may be modified such that the interpolating operation is the operation for: representing the position of each of three pixels, which are located in the vicinity of the new pixel, by the x coordinate and the y coordinate, representing the pixel value of each of the three pixels, which are located in the vicinity of the new pixel, by the z coordinate, setting the plane, which passes through the z coordinates of the pixel values of the three pixels located in the vicinity of the new pixel, and taking the value of the z coordinate, which corresponds to the x and y coordinates of the new pixel, in the thus set plane as the pixel value of the new pixel. With the modifications of the image interpolation apparatus and method in accordance with the present invention, the pixel value of the new pixel is capable of being calculated with the simple operation.

BRIEF DESCRIPTION OF THE DRAWINGS

FIG. 3 is an explanatory view showing an example of a difference filter, FIG. 24 is an explanatory view showing pixel lines, each of which passes through two pixels among four middle pixels in an array of 16 pixels that are located in the vicinity of a pixel to be interpolated, FIG. 25 is an explanatory view showing how filtering processing is performed in a filtering section in the image size enlarging and reducing apparatus of FIG. 23, in which the embodiment of the image interpolation apparatus in accordance with the present invention is employed, FIG. 28 is a table showing different examples of edge patterns in accordance with locations of edges, FIG. 29 is a table showing further different examples of edge patterns in accordance with locations of edges.

DESCRIPTION OF THE PREFERRED EMBODIMENTS

The present invention will hereinbelow be described in further detail with reference to the accompanying drawings.

Figure 1:
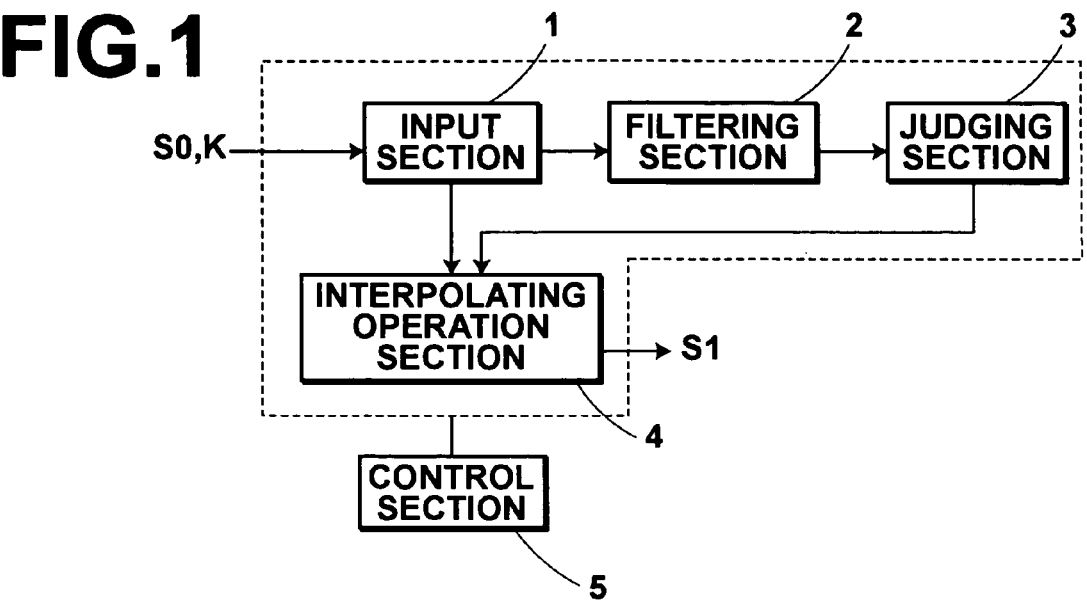
FIG. 1 is a block diagram showing an image size enlarging and reducing apparatus, in which a first embodiment of the edge detecting apparatus in accordance with the present invention is employed.

FIG. 1 is a block diagram showing an image size enlarging and reducing apparatus, in which a first embodiment of the edge detecting apparatus in accordance with the present invention is employed. As illustrated in FIG. 1, the image size enlarging and reducing apparatus, in which the first embodiment of the edge detecting apparatus in accordance with the present invention is employed, comprises an input section 1 for accepting inputs of an image signal S0 and information representing an enlargement scale factor K for the image signal S0. The image size enlarging and reducing apparatus also comprises a filtering section 2, a judging section 3, and an interpolating operation section 4 for calculating a pixel value of a pixel to be interpolated. The image size enlarging and reducing apparatus further comprises a control section 5 for controlling the operations of the input section 1, the filtering section 2, the judging section 3, and the interpolating operation section 4.

Figure 2:
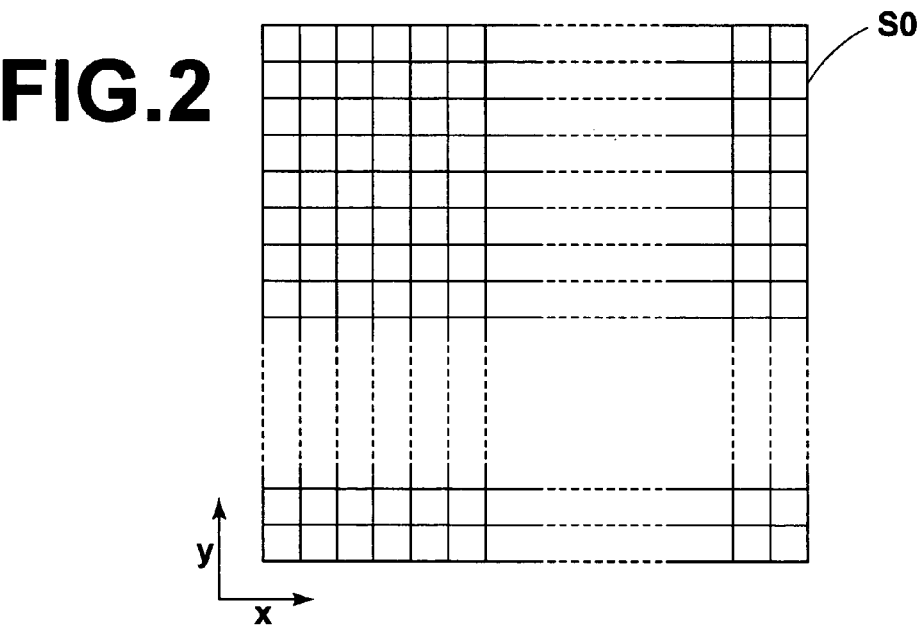
FIG. 2 is an explanatory view showing an array of pixels in an image, which is represented by an image signal.

As illustrated in FIG. 2, the image represented by the image signal S0 is constituted of pixels arrayed in two-dimensional directions. (The image represented by the image signal S0 will hereinbelow be also represented by S0.) In the image size enlarging and reducing apparatus of FIG. 1, in which the first embodiment of the edge detecting apparatus in accordance with the present invention is employed, (and in various other embodiments, which will be described later), an x direction and a y direction are defined as illustrated in FIG. 2.

With respect to each of rows of the pixels in the image S0, which rows extend in the x direction, and each of columns of the pixels in the image S0, which columns extend in the y direction, the filtering section 2 performs filtering processing with a difference filter and on two pixels, which are adjacent to each other and between which a pixel to be interpolated for image size enlargement processing is located. (The pixel to be interpolated for the image size enlargement processing will hereinbelow be referred to as the interpolated pixel P.) In this manner, a difference d0 between the pixel values of the two pixels, which are adjacent to each other, is calculated. FIG. 3 is an explanatory view showing an example of a difference filter. As illustrated in FIG. 3, in the image size enlarging and reducing apparatus of FIG. 1, in which the first embodiment of the edge detecting apparatus in accordance with the present invention is employed, the difference filter employed in the filtering section 2 is a filter having two taps with filter values of (−1, 1). However, the difference filter is not limited to the filter having the two taps with the filter values of (−1, 1). For example, a filter having filter values capable of calculating a weighted difference between the pixel values of the two pixels may be employed as the difference filter. Alternatively, a filter having an even number of taps more than two taps may be employed as the difference filter.

The judging section 3 makes a judgment as to whether the absolute value of the thus obtained difference d0 is or is not equal to at least a predetermined threshold value Th1. In cases where the absolute value of the difference d0 has been judged to be equal to at least the predetermined threshold value Th1, the judging section 3 judges that an edge is located between the two pixels, which are adjacent to each other and for which the difference d0 has been calculated. The judging section 3 feeds out the information, which represents the result of the judgment, into the interpolating operation section 4.

The interpolating operation section 4 calculates the pixel value of the interpolated pixel P in accordance with the result of the judgment having been made by the judging section 3. The operation for the calculation of the pixel value of the interpolated pixel P varies for the cases, where it has been judged that an edge is located between the two pixels, which are adjacent to each other and between which the interpolated pixel P is located, and the cases, where it has been judged that an edge is not located between the two pixels, which are adjacent to each other and between which the interpolated pixel P is located. Specifically, in cases where it has been judged that an edge is not located between the two pixels, which are adjacent to each other and between which the interpolated pixel P is located, the pixel value of the interpolated pixel P is calculated with a bicubic technique.

The bicubic technique is one of techniques for interpolating operations of the third order. With the bicubic technique, the pixel value of the interpolated pixel P is calculated by use of 16 pixels, which are located in the vicinity of the interpolated pixel P. The bicubic technique will hereinbelow be described in more detail.

Figure 4:
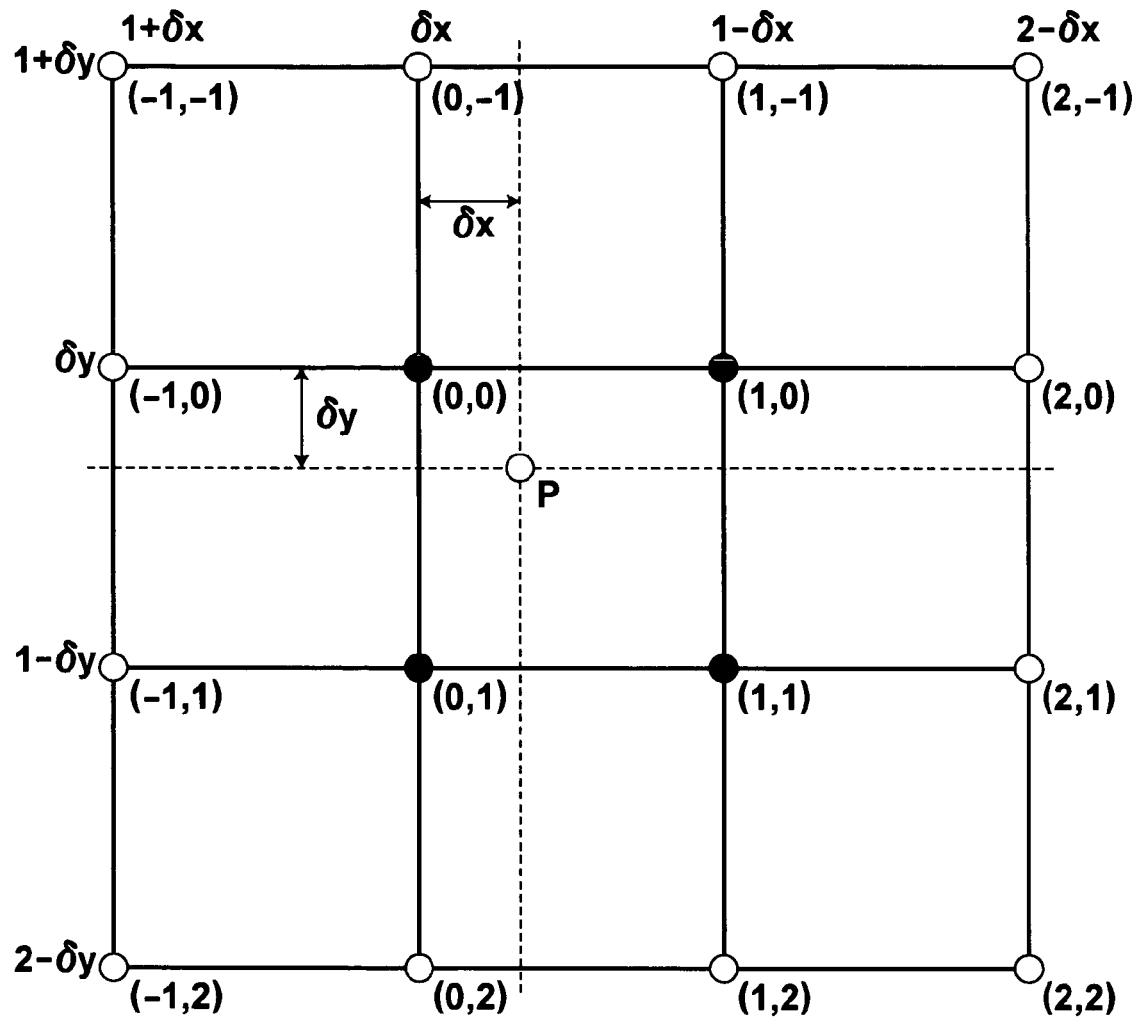
FIG. 4 is an explanatory view showing how a bicubic technique is performed.

FIG. 4 is an explanatory view showing how a bicubic technique is performed. As illustrated in FIG. 4, in cases where a point P represents the position of the interpolated pixel P, the pixels represented by the black dots in FIG. 4 are referred to as the primary neighbors, and the pixels represented by the white dots in FIG. 4 are referred to as the secondary neighbors. As for each of the primary neighbors and each of the secondary neighbors, a weight factor Wx with respect to a distance dx in the x direction is calculated with Formula (1) shown below. Also, a weight factor Wy with respect to a distance dy in the y direction is calculated with Formula (1) shown below. (In Formula (1), each of dx and dy is represented simply by d.) Further, a weight factor W (W=Wx×Wy) for the pixel is calculated.

$$W = \begin{cases} (d-1)(d^2-d-1) & \text{primary neighbors} \\ -(d-1)(d-2)^2 & \text{secondary neighbors} \end{cases} \quad (1)$$

For example, as for the pixel (−1, −1) (which is one of the secondary neighbors) in FIG. 4, the weight factor Wx, the weight factor Wy, and the weight factor W are calculated with Formulas (2), (3), and (4) shown below.

$$Wx = \delta x(\delta x-1)^2 \quad (2)$$

$$Wy = \delta y(\delta y-1)^2 \quad (3)$$

$$W = \delta x(\delta x-1)^2 \delta y(\delta y-1)^2 \quad (4)$$

Also, in cases where the weight factor for a pixel (i, j) is represented by W(i, j), and the pixel value of the pixel (i, j) is represented by f(i, j), a pixel value f′(P) of the interpolated pixel P is capable of being calculated with Formula (5) shown below.

$$f'(p) = \sum_{i=1}^{2} \sum_{j=-1}^{2} W(i,j) f(i,j) \quad (5)$$

In the image size enlarging and reducing apparatus of FIG. 1, in which the first embodiment of the edge detecting apparatus in accordance with the present invention is employed, (and in various other embodiments, which will be described later), the bicubic technique is applied to a one-dimensional direction alone, i.e. the x direction or the y direction alone, and the pixel value of the interpolated pixel P is thereby calculated.

Figure 5A:
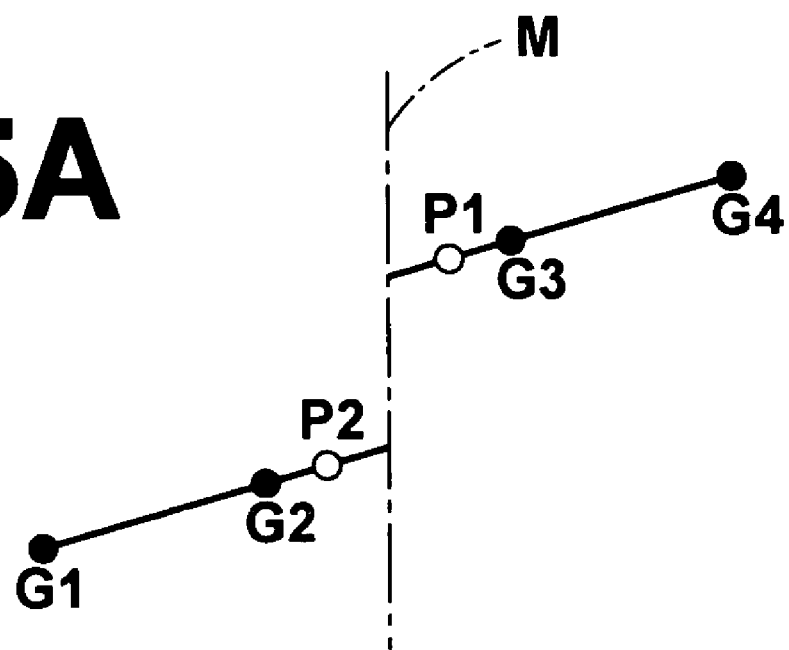
FIG. 5A is an explanatory view showing an example of how a pixel value of a pixel to be interpolated in an area, which has been judged as containing an edge, is calculated.
Figure 5B:
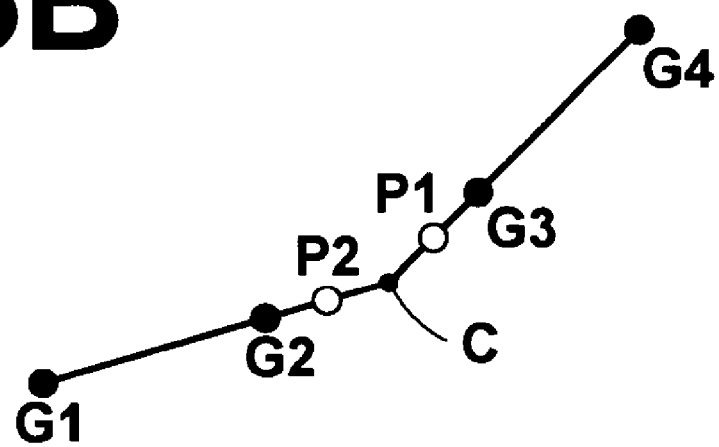
FIG. 5B is an explanatory view showing a different example of how a pixel value of a pixel to be interpolated in an area, which has been judged as containing an edge, is calculated.

In cases where it has been judged that an edge is located between the two pixels, which are adjacent to each other and between which the interpolated pixel P is located, the pixel value of the interpolated pixel P is calculated in the manner described below. FIG. 5A is an explanatory view showing an example of a profile of pixel values of pixels located in an area, which has been judged as containing an edge. FIG. 5B is an explanatory view showing a different example of a profile of pixel values of pixels located in an area, which has been judged as containing an edge. In each of FIG. 5A and FIG. 5B, the horizontal direction represents the direction in which the pixels are arrayed, and the vertical direction represents the direction representing the levels of the pixel values of the pixels. In cases where it has been judged that an edge is located between two pixels G2 and G3, which are adjacent to each other, the profile of the pixel values of four pixels G1, G2, G3, and G4, which are composed of the two pixels G2, G3, the pixel G1 adjacent to the pixel G2, and the pixel G4 adjacent to the pixel G3, and which are adjacent in series to one another, takes the shape illustrated in FIG. 5A or FIG. 5B.

In cases where the profile takes the step-like edge shape as illustrated in FIG. 5A, a median line M, which is indicated by the single-dot chained line and which bisects the distance between the pixels G2 and G3 in the pixel array direction, is set. In cases where the interpolated pixel P is located on the right side of the median line M (in this case, the interpolated pixel P is represented by P1), a value lying on the extension of the straight line, which connects the pixels G3 and G4, is taken as the pixel value of the interpolated pixel P1. Also, in cases where the interpolated pixel P is located on the left side of the median line M (in this case, the interpolated pixel P is represented by P2), a value lying on the extension of the straight line, which connects the pixels G1 and G2, is taken as the pixel value of the interpolated pixel P2.

In cases where the profile takes the edge shape as illustrated in FIG. 5B, an intersection point C of the extension of the straight line, which connects the pixels G1 and G2, and the extension of the straight line, which connects the pixels G3 and G4, is set. In cases where the interpolated pixel P1 is located on the right side of the intersection point C, a value lying on the extension of the straight line, which connects the pixels G3 and G4, is taken as the pixel value of the interpolated pixel P1. Also, in cases where the interpolated pixel P2 is located on the left side of the intersection point C, a value lying on the extension of the straight line, which connects the pixels G1 and G2, is taken as the pixel value of the interpolated pixel P2.

In the image size enlarging and reducing apparatus of FIG. 1, the pixel value of the interpolated pixel P is calculated by use of the pixel values of only the two pixels (i.e., the pixels G3 and G4, or the pixels G1 and G2). Alternatively, the pixel value of the interpolated pixel P may be calculated by use of the pixel values of at least three pixels. In such cases, it may often occur that the at least three pixels cannot be connected by a straight line. Therefore, in such cases, the at least three pixels may be connected by a curved line defined by an arbitrary function, such as a spline curved line, and a value lying on the extension of the curved line may be taken as the pixel value of the interpolated pixel P.

The operation processing performed in cases where it has been judged that an edge is located between the two pixels, which are adjacent to each other and between which the interpolated pixel P is located, will hereinbelow be referred to as the first interpolating operation. Also, the operation processing performed in cases where it has been judged that an edge is not located between the two pixels, which are adjacent to each other and between which the interpolated pixel P is located, will hereinbelow be referred to as the second interpolating operation.

How the processing is performed in the image size enlarging and reducing apparatus of FIG. 1, in which the first embodiment of the edge detecting apparatus in accordance with the present invention is employed, will be described hereinbelow.

Figure 6:
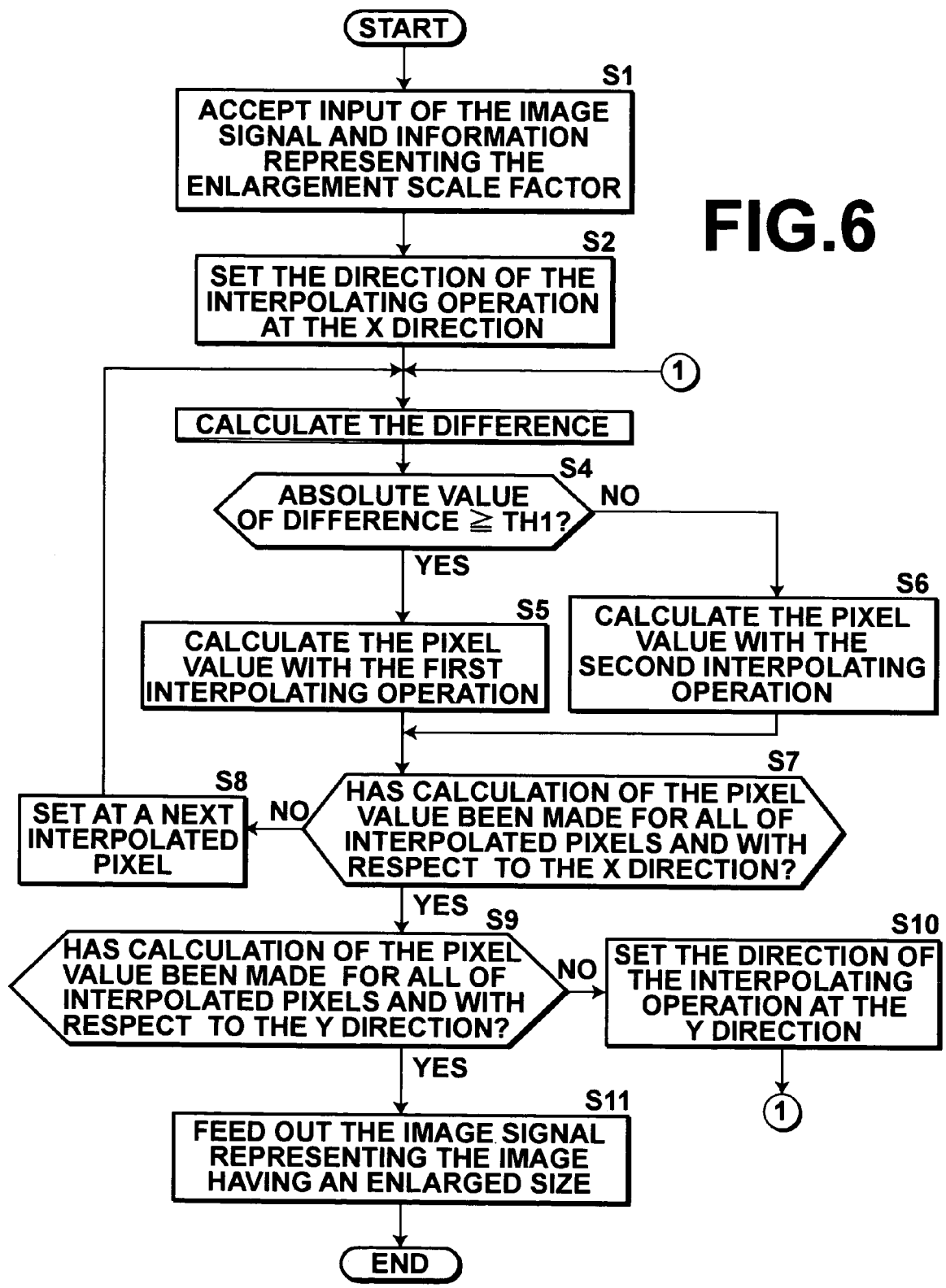
FIG. 6 is a flow chart showing how processing is performed in the image size enlarging and reducing apparatus of FIG. 1, in which the first embodiment of the edge detecting apparatus in accordance with the present invention is employed.

FIG. 6 is a flow chart showing how processing is performed in the image size enlarging and reducing apparatus of FIG. 1, in which the first embodiment of the edge detecting apparatus in accordance with the present invention is employed. In this embodiment, it is assumed that the interpolated pixel P is located between the pixels in the image S0. Firstly, in a step S1, the input section 1 accepts the image signal S0, which is to be subjected to the image size enlargement processing, and the information representing the enlargement scale factor K for the image signal S0. Also, in a step S2, the direction of the interpolating operation is set at the x direction. Thereafter, in a step S3, with respect to a first interpolated pixel P in accordance with the enlargement scale factor K (for example, a pixel located in an upper left area of an image represented by an image signal S1 obtained from the image size enlargement processing), the filtering section 2 performs the filtering processing with the difference filter and on the two pixels, which are adjacent to each other and between which the interpolated pixel P is located. The filtering section 2 thus calculates the difference d0. (The image represented by the image signal S1 will hereinbelow be also represented by S1.)

Also, in a step S4, the judging section 3 makes a judgment as to whether the absolute value of the difference d0 is or is not equal to at least the threshold value Th1. In cases where it has been judged in the step S4 that the absolute value of the difference d0 is equal to at least the threshold value Th1, in a step S5, it is regarded that an edge is located between the two pixels, which are adjacent to each other and for which the difference d0 has been calculated, and the interpolating operation section 4 calculates the pixel value of the interpolated pixel P with the first interpolating operation described above. In cases where it has been judged in the step S4 that the absolute value of the difference d0 is not equal to at least the threshold value Th1, in a step S6, it is regarded that an edge is not located between the two pixels, which are adjacent to each other and for which the difference d0 has been calculated, and the interpolating operation section 4 calculates the pixel value of the interpolated pixel P with the second interpolating operation described above.

Further, in a step S7, the control section 5 makes a judgment as to whether the calculation of the pixel value of the interpolated pixel P has been or has not been made with respect to all of interpolated pixels P, P, . . . and with respect to the x direction. In cases where it has been judged in the step S7 that the calculation of the pixel value of the interpolated pixel P has not been made with respect to all of interpolated pixels P, P, . . . and with respect to the x direction, in a step S8, the interpolated pixel P to be subjected to the calculation of the pixel value is set at a next interpolated pixel P. Also, the processing reverts to the step S3.

In cases where it has been judged in the step S7 that the calculation of the pixel value of the interpolated pixel P has been made with respect to all of interpolated pixels P, P, . . . and with respect to the x direction, in a step S9, a judgment is made as to whether the calculation of the pixel value of the interpolated pixel P has been or has not been made with respect to all of interpolated pixels P, P, . . . and with respect to the y direction. In cases where it has been judged in the step S9 that the calculation of the pixel value of the interpolated pixel P has not been made with respect to all of interpolated pixels P, P, . . . and with respect to the y direction, in a step S10, the direction of the interpolating operation is set at the y direction. Also, the processing reverts to the step S3. In cases where it has been judged in the step S9 that the calculation of the pixel value of the interpolated pixel P has been made with respect to all of interpolated pixels P, P, . . . and with respect to the y direction, in a step S11, the image signal S1, which represents the image S1 containing the interpolated pixels P, P, . . . and having an enlarged size, is fed out. At this stage, the processing is finished.

As described above, in the image size enlarging and reducing apparatus of FIG. 1, in which the first embodiment of the edge detecting apparatus in accordance with the present invention is employed, in cases where the absolute value of the difference d0 between the pixel values of the two pixels, which are adjacent to each other in the image, has been judged to be equal to at least the threshold value Th1, it is regarded that an edge is located between the two pixels, which are adjacent to each other. Therefore, instead of a detection being made as to whether an edge is or is not located at a pixel in the image S0, the detection is capable of being made as to whether an edge is or is not located between the pixels in the image S0. Also, since it is sufficient for the difference d0 to be calculated, the detection as to whether an edge is or is not located between the pixels in the image is capable of being made quickly with simple operation processing.

An image size enlarging and reducing apparatus, in which a second embodiment of the edge detecting apparatus in accordance with the present invention is employed, will be described hereinbelow.

Figure 7:
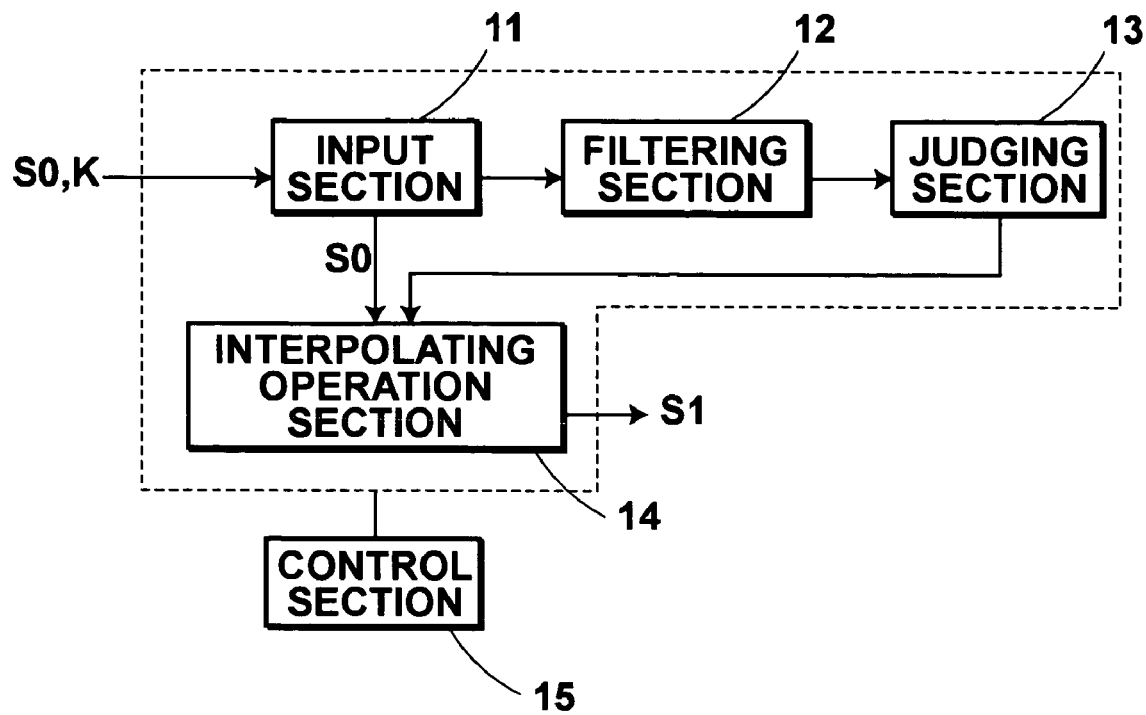
FIG. 7 is a block diagram showing an image size enlarging and reducing apparatus, in which a second embodiment of the edge detecting apparatus in accordance with the present invention is employed.

FIG. 7 is a block diagram showing an image size enlarging and reducing apparatus, in which a second embodiment of the edge detecting apparatus in accordance with the present invention is employed. As illustrated in FIG. 7, the image size enlarging and reducing apparatus, in which the second embodiment of the edge detecting apparatus in accordance with the present invention is employed, comprises an input section 11 for accepting the inputs of the image signal S0 and the information representing the enlargement scale factor K for the image signal S0. The image size enlarging and reducing apparatus also comprises a filtering section 12, a judging section 13, and an interpolating operation section 14 for calculating the pixel value of the interpolated pixel P. The image size enlarging and reducing apparatus further comprises a control section 15 for controlling the operations of the input section 11, the filtering section 12, the judging section 13, and the interpolating operation section 14.

Figure 8:
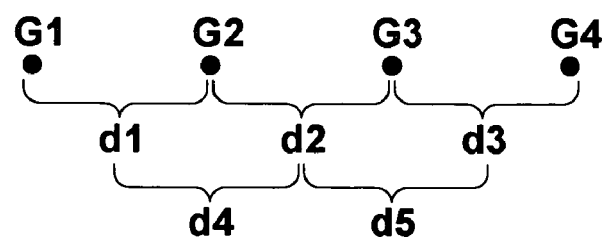
FIG. 8 is an explanatory view showing how filtering processing is performed in a filtering section in the image size enlarging and reducing apparatus of FIG. 7, in which the second embodiment of the edge detecting apparatus in accordance with the present invention is employed.

The filtering section 12 performs filtering processing in the manner described below. FIG. 8 is an explanatory view showing how the filtering processing is performed in the filtering section 12 in the image size enlarging and reducing apparatus of FIG. 7, in which the second embodiment of the edge detecting apparatus in accordance with the present invention is employed. Specifically, with respect to each of rows of the pixels in the image S0, which rows extend in the x direction, and each of columns of the pixels in the image S0, which columns extend in the y direction, the filtering section 12 performs the filtering processing with the difference filter, which is illustrated in FIG. 3. More specifically, as illustrated in FIG. 8, the four pixels G1, G2, G3, and G4, which are adjacent in series to one another, are composed of the two pixels G2 and G3, which are adjacent to each other and between which the interpolated pixel P is located, the pixel G1 adjacent to the pixel G2, and the pixel G4 adjacent to the pixel G3. With respect to the four pixels G1, G2, G3, and G4, which are adjacent in series to one another, the filtering section 12 performs the filtering processing with the difference filter and on each of three pixel pairs, each of the three pixel pairs being constituted of the two pixels, which are adjacent to each other, i.e. on each of a pixel pair of G1 and G2, a pixel pair of G2 and G3, and a pixel pair of G3 and G4. The filtering section 12 thereby obtains the difference between the pixel values of the pixel pair of G1 and G2 as a primary difference d1. The filtering section 12 also obtains the difference between the pixel values of the pixel pair of G2 and G3 as a primary difference d2. The filtering section 12 further obtains the difference between the pixel values of the pixel pair of G3 and G4 as a primary difference d3.

Thereafter, the filtering section 12 performs the filtering processing with the difference filter and on each of two primary difference pairs, each of the two primary difference pairs being constituted of the two primary differences, which are adjacent to each other and are contained in the thus obtained three primary differences d1, d2, and d3, i.e. on each of the primary difference pair of d1 and d2 and the primary difference pair of d2 and d3. The filtering section 12 thereby obtains the difference between the primary difference pair of d1 and d2 as a secondary difference d4. The filtering section 12 also obtains the difference between the primary difference pair of d2 and d3 as a secondary difference d5.

The judging section 13 makes a judgment as to whether an edge is or is not located between the two pixels G2 and G3, which are adjacent to each other. The judgment is made in accordance with a relationship of positive and negative signs among the thus obtained three primary differences d1, d2, d3 and the thus obtained two secondary differences d4, d5. The information representing the result of the judgment is fed into the interpolating operation section 14.

Figure 9:
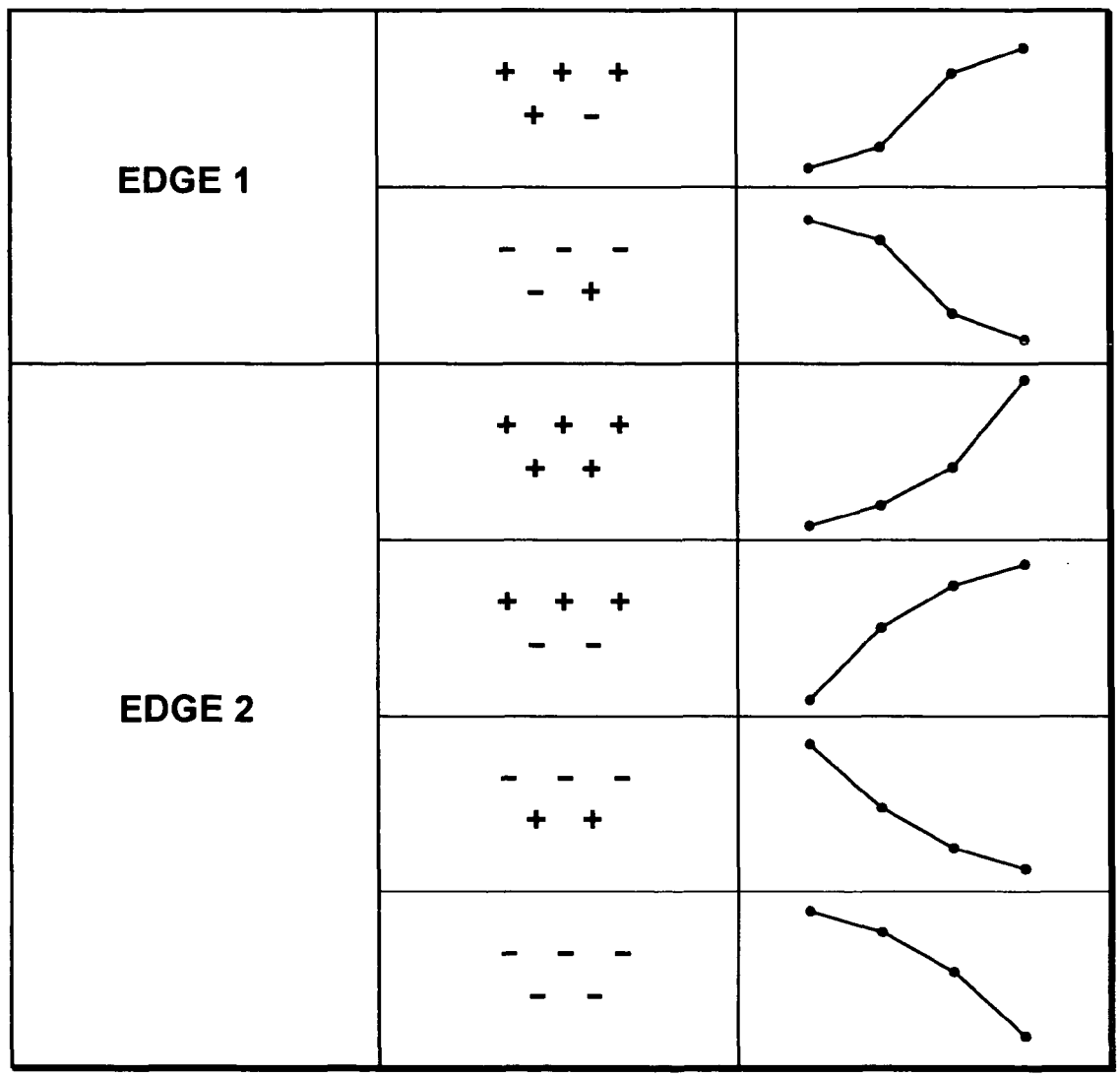
FIG. 9 is a table showing examples of relationships of positive and negative signs among primary differences d1, d2, d3 and secondary differences d4, d5, and corresponding shapes of profiles of pixel values of four pixels that are adjacent in series to one another.
Figure 10:
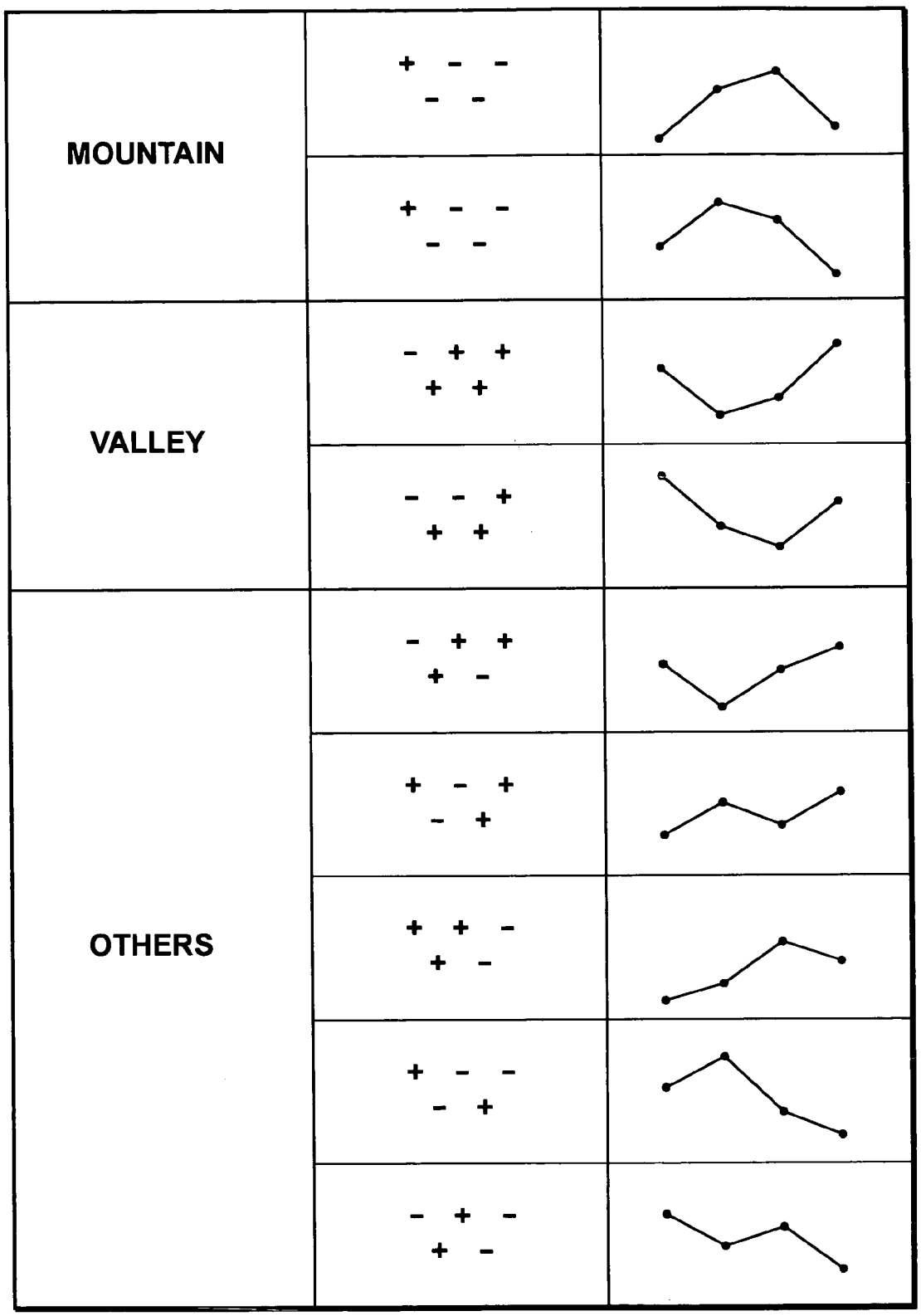
FIG. 10 is a table showing different examples of relationships of positive and negative signs among primary differences d1, d2, d3 and secondary differences d4, d5, and corresponding shapes of profiles of pixel values of four pixels that are adjacent in series to one another.
Figure 11:
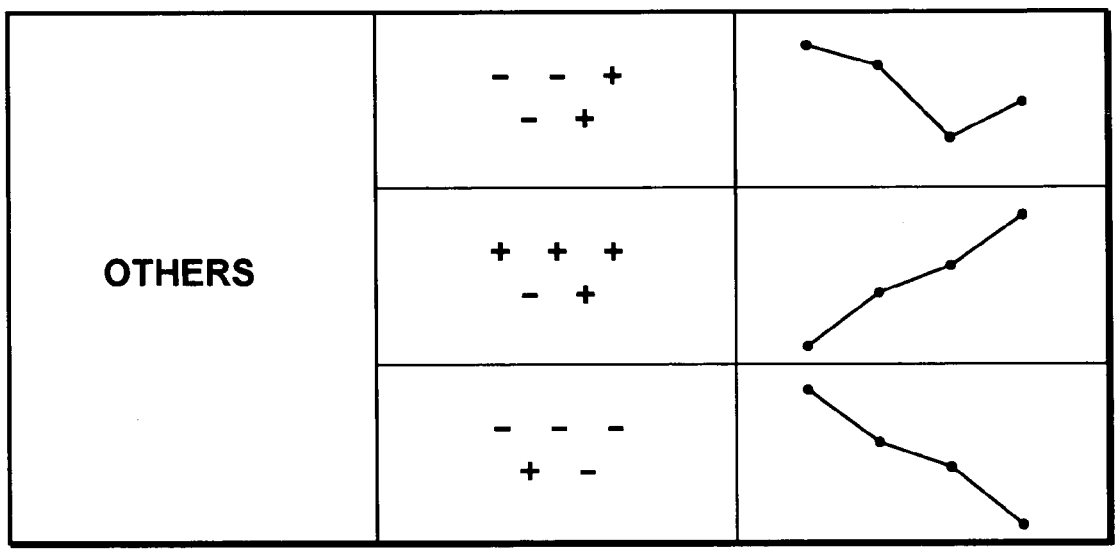
FIG. 11 is a table showing further different examples of relationships of positive and negative signs among primary differences d1, d2, d3 and secondary differences d4, d5, and corresponding shapes of profiles of pixel values of four pixels that are adjacent in series to one another.

FIG. 9, FIG. 10, and FIG. 11 are tables showing examples of relationships of positive and negative signs among the primary differences d1, d2, d3 and the secondary differences d4, d5, which have been obtained with respect to the four pixels that are adjacent in series to one another, and corresponding shapes of profiles of the pixel values of the four pixels that are adjacent in series to one another. As the combinations of the positive and negative signs of the primary differences d1, d2, d3 and the secondary differences d4, d5, which have been obtained with respect to the four pixels that are adjacent in series to one another, there are 18 kinds of combinations in total. As illustrated in FIG. 9, as the combinations of the positive and negative signs of the primary differences d1, d2, d3 and the secondary differences d4, d5, which combinations are obtained in cases where an edge is located between the two pixels G2 and G3 adjacent to each other, there are two kinds of combinations, i.e. the combination "edge 1" and the combination "edge 2." The combination "edge 1" corresponds to the profile illustrated in FIG. 5A in the image size enlarging and reducing apparatus of FIG. 1, in which the aforesaid first embodiment of the edge detecting apparatus in accordance with the present invention is employed. The combination "edge 1" is classified into two kinds of profiles, i.e. a rightward ascending edge profile in which (d1, d2, d3, d4, d5)=(+, +, +, +, −), and a leftward ascending edge profile in which (d1, d2, d3, d4, d5)=(−, −, −, −, +). The combination "edge 2" corresponds to the profile illustrated in FIG. 5B in the image size enlarging and reducing apparatus of FIG. 1, in which the aforesaid first embodiment of the edge detecting apparatus in accordance with the present invention is employed. The combination "edge 2" is classified into four kinds of profiles, i.e. a downward convex, rightward ascending edge profile in which (d1, d2, d3, d4, d5)=(+, +, +, +, +), an upward convex, rightward ascending edge profile in which (d1, d2, d3, d4, d5)=(+, +, +, −, −), a downward convex, leftward ascending edge profile in which (d1, d2, d3, d4, d5)=(−, −, −, +, +), and an upward convex, leftward ascending edge profile in which (d1, d2, d3, d4, d5)=(−, −, −,-).

The judging section 13 stores the information representing the tables illustrated in FIG. 9, FIG. 10, and FIG. 11. In cases where the relationship of positive and negative signs among the primary differences d1, d2, d3 and the secondary differences d4, d5, which have been obtained with respect to the four pixels that are adjacent in series to one another, coincides with the relationship of "edge 1" or the relationship of "edge 2" illustrated in FIG. 9, the judging section 13 judges that an edge is located between the two pixels G2 and G3 that are adjacent to each other. Also, in cases where the relationship of positive and negative signs among the primary differences d1, d2, d3 and the secondary differences d4, d5, which have been obtained with respect to the four pixels that are adjacent in series to one another, coincides with the relationship of "mountain," the relationship of "valley," or the relationship of "others" illustrated in FIG. 10 or FIG. 11, the judging section 13 judges that an edge is not located between the two pixels G2 and G3 that are adjacent to each other.

In the same manner as that for the interpolating operation section 4 in the image size enlarging and reducing apparatus of FIG. 1, in which the aforesaid first embodiment of the edge detecting apparatus in accordance with the present invention is employed, in cases where it has been judged that an edge is located between the two pixels, which are adjacent to each other and between which the interpolated pixel P is located, the interpolating operation section 14 performs the first interpolating operation and thereby calculates the pixel value of the interpolated pixel P. Also, in cases where it has been judged that an edge is not located between the two pixels, which are adjacent to each other and between which the interpolated pixel P is located, the interpolating operation section 14 performs the second interpolating operation and thereby calculates the pixel value of the interpolated pixel P.

How the processing is performed in the image size enlarging and reducing apparatus of FIG. 7, in which the second embodiment of the edge detecting apparatus in accordance with the present invention is employed, will be described hereinbelow.

Figure 12:
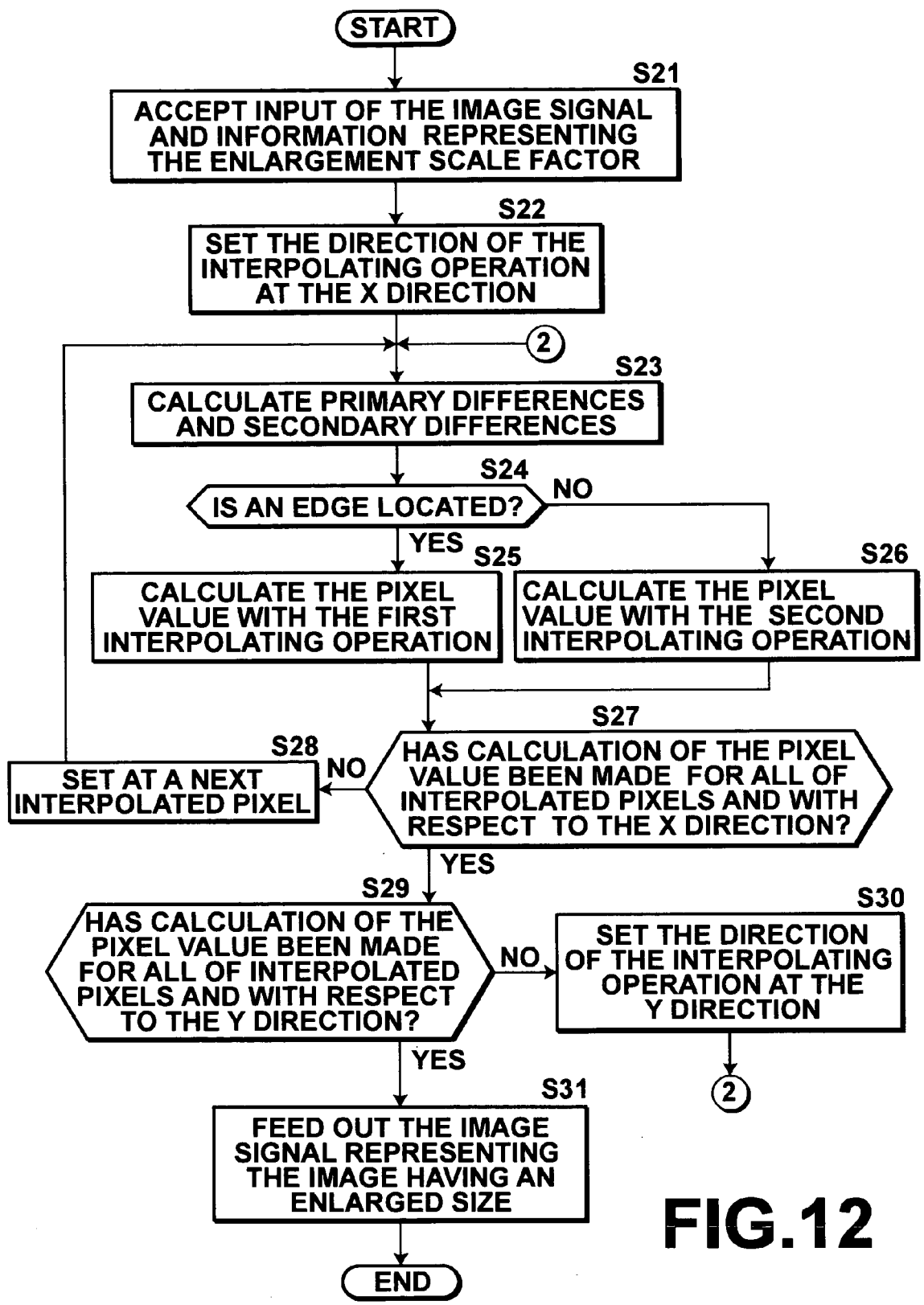
FIG. 12 is a flow chart showing how processing is performed in the image size enlarging and reducing apparatus of FIG. 7, in which the second embodiment of the edge detecting apparatus in accordance with the present invention is employed.

FIG. 12 is a flow chart showing how processing is performed in the image size enlarging and reducing apparatus of FIG. 7, in which the second embodiment of the edge detecting apparatus in accordance with the present invention is employed. In the image size enlarging and reducing apparatus of FIG. 7, in which the second embodiment of the edge detecting apparatus in accordance with the present invention is employed, as in the image size enlarging and reducing apparatus of FIG. 1, in which the first embodiment of the edge detecting apparatus in accordance with the present invention is employed, it is assumed that the interpolated pixel P is located between the pixels in the image S0. Firstly, in a step S21, the input section 11 accepts the image signal S0, which is to be subjected to the image size enlargement processing, and the information representing the enlargement scale factor K for the image signal S0. Also, in a step S22, the direction of the interpolating operation is set at the x direction. Thereafter, in a step S23, with respect to a first interpolated pixel P in accordance with the enlargement scale factor K (for example, a pixel located in an upper left area of an image S1 obtained from the image size enlargement processing), the filtering section 12 calculates the primary differences d1, d2, d3 and the secondary differences d4, d5 from the four pixels G1, G2, G3, and G4 that are adjacent in series to one another and contain the two pixels G2 and G3 between which the interpolated pixel P is located.

Also, in a step S24, the judging section 13 makes a judgment as to whether an edge is or is not located between the two pixels G2 and G3, which are adjacent to each other and between which the interpolated pixel P is located. The judgment is made in accordance with the relationship of positive and negative signs among the primary differences d1, d2, d3 and the secondary differences d4, d5. In cases where it has been judged in the step S24 that an edge is located between the two pixels G2 and G3, in a step S25, the interpolating operation section 14 calculates the pixel value of the interpolated pixel P with the first interpolating operation described above in accordance with the result of the judgment having been made by the judging section 13. In cases where it has been judged in the step S24 that an edge is not located between the two pixels G2 and G3, in a step S26, the interpolating operation section 14 calculates the pixel value of the interpolated pixel P with the second interpolating operation described above in accordance with the result of the judgment having been made by the judging section 13.

Further, in a step S27, the control section 15 makes a judgment as to whether the calculation of the pixel value of the interpolated pixel P has been or has not been made with respect to all of interpolated pixels P, P, . . . and with respect to the x direction. In cases where it has been judged in the step S27 that the calculation of the pixel value of the interpolated pixel P has not been made with respect to all of interpolated pixels P, P, . . . and with respect to the x direction, in a step S28, the interpolated pixel P to be subjected to the calculation of the pixel value is set at a next interpolated pixel P. Also, the processing reverts to the step S23.

In cases where it has been judged in the step S27 that the calculation of the pixel value of the interpolated pixel P has been made with respect to all of interpolated pixels P, P, . . . and with respect to the x direction, in a step S29, a judgment is made as to whether the calculation of the pixel value of the interpolated pixel P has been or has not been made with respect to all of interpolated pixels P, P, . . . and with respect to the y direction. In cases where it has been judged in the step S29 that the calculation of the pixel value of the interpolated pixel P has not been made with respect to all of interpolated pixels P, P, . . . and with respect to the y direction, in a step S30, the direction of the interpolating operation is set at the y direction. Also, the processing reverts to the step S23. In cases where it has been judged in the step S29 that the calculation of the pixel value of the interpolated pixel P has been made with respect to all of interpolated pixels P, P, . . . and with respect to the y direction, in a step S31, the image signal S1, which represents the image S1 containing the interpolated pixels P, P, . . . and having an enlarged size, is fed out. At this stage, the processing is finished.

As described above, in the image size enlarging and reducing apparatus of FIG. 7, in which the second embodiment of the edge detecting apparatus in accordance with the present invention is employed, the judgment is made as to whether an edge is or is not located between the two pixels G2 and G3, which are adjacent to each other and between which the interpolated pixel P is located. The judgment is made in accordance with the relationship of positive and negative signs among the primary differences d1, d2, d3 and the secondary differences d4, d5. Therefore, instead of a detection being made as to whether an edge is or is not located at a pixel in the image S0, the detection is capable of being made as to whether an edge is or is not located between the pixels in the image S0. Also, since it is sufficient for the primary differences d1, d2, d3 and the secondary differences d4, d5 to be calculated, the detection as to whether an edge is or is not located between the pixels in the image is capable of being made quickly with simple operation processing.

An image size enlarging and reducing apparatus, in which a third embodiment of the edge detecting apparatus in accordance with the present invention is employed, will be described hereinbelow.

Figure 13:
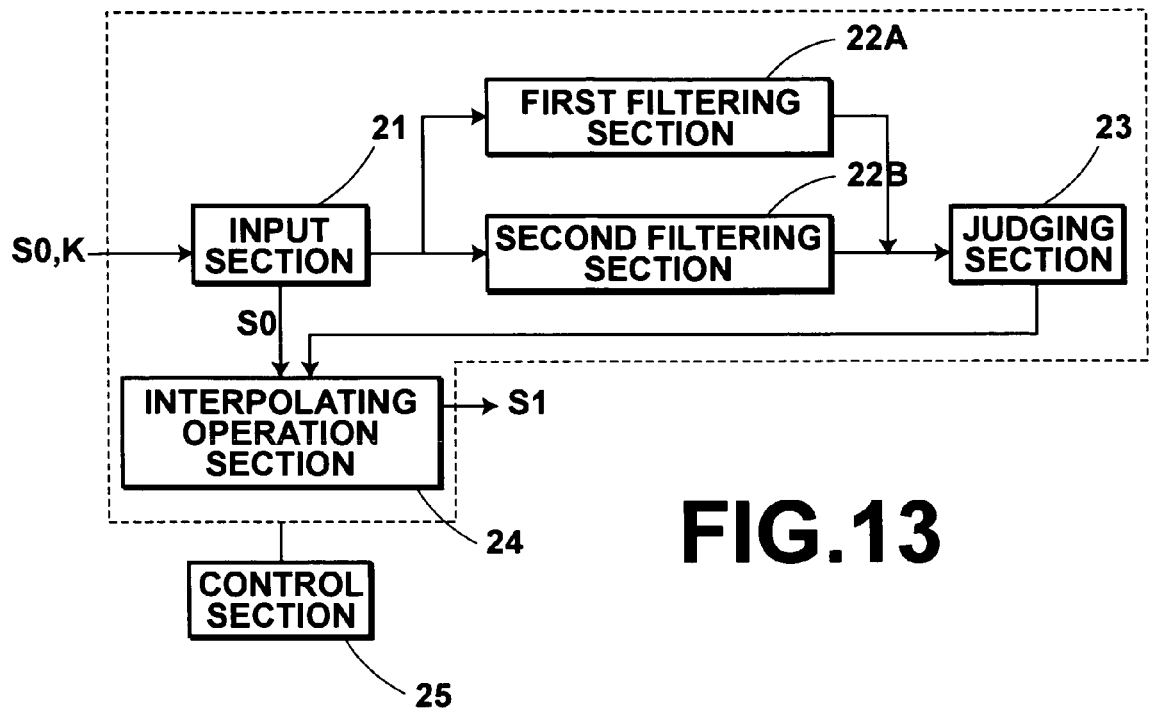
FIG. 13 is a block diagram showing an image size enlarging and reducing apparatus, in which a third embodiment of the edge detecting apparatus in accordance with the present invention is employed.

FIG. 13 is a block diagram showing an image size enlarging and reducing apparatus, in which a third embodiment of the edge detecting apparatus in accordance with the present invention is employed. As illustrated in FIG. 13, the image size enlarging and reducing apparatus, in which the third embodiment of the edge detecting apparatus in accordance with the present invention is employed, comprises an input section 21 for accepting the inputs of the image signal S0 and the information representing the enlargement scale factor K for the image signal S0. The image size enlarging and reducing apparatus also comprises a first filtering section 22A, a second filtering section 22B, a judging section 23, and an interpolating operation section 24 for calculating the pixel value of the interpolated pixel P. The image size enlarging and reducing apparatus further comprises a control section 25 for controlling the operations of the input section 21, the first filtering section 22A, the second filtering section 22B, the judging section 23, and the interpolating operation section 24.

In the same manner as that for the filtering section 12 in the image size enlarging and reducing apparatus of FIG. 7, in which the second embodiment of the edge detecting apparatus in accordance with the present invention is employed, the first filtering section 22A performs the filtering processing with respect to the four pixels G1, G2, G3, and G4, which are adjacent in series to one another. The four pixels G1, G2, G3, and G4, which are adjacent in series to one another, are composed of the two pixels G2 and G3, which are adjacent to each other and between which the interpolated pixel P is located, the pixel G1 adjacent to the pixel G2, and the pixel G4 adjacent to the pixel G3. In this manner, the first filtering section 22A calculates the primary differences d1, d2, d3 and the secondary differences d4, d5.

In the same manner as that for the filtering section 2 in the image size enlarging and reducing apparatus of FIG. 1, in which the first embodiment of the edge detecting apparatus in accordance with the present invention is employed, the second filtering section 22B performs the filtering processing on the two middle pixels G2 and G3, which are among the four pixels G1, G2, G3, and G4 that are adjacent in series to one another in the image S0. The second filtering section 22B thus calculates the difference d0 (=d2) between the pixel values of the pixels G2 and G3.

In the same manner as that for the judging section 13 in the image size enlarging and reducing apparatus of FIG. 7, in which the second embodiment of the edge detecting apparatus in accordance with the present invention is employed, the judging section 23 makes a judgment (i.e., a first judgment) as to whether an edge is or is not located between the two pixels G2 and G3, which are adjacent to each other. The first judgment is made in accordance with the relationship of positive and negative signs among the primary differences d1, d2, d3 and the secondary differences d4, d5, which have been calculated by the first filtering section 22A. Specifically, in cases where the relationship of positive and negative signs among the primary differences d1, d2, d3 and the secondary differences d4, d5, which have been obtained with respect to the four pixels that are adjacent in series to one another, coincides with the relationship of "edge 1" or the relationship of "edge 2" illustrated in FIG. 9, the judging section 23 judges that an edge is located between the two pixels G2 and G3 that are adjacent to each other. Also, in cases where the relationship of positive and negative signs among the primary differences d1, d2, d3 and the secondary differences d4, d5, which have been obtained with respect to the four pixels that are adjacent in series to one another, coincides with the relationship of "mountain," the relationship of "valley," or the relationship of "others" illustrated in FIG. 10 or FIG. 11, the judging section 23 judges that an edge is not located between the two pixels G2 and G3 that are adjacent to each other.

Figure 14:
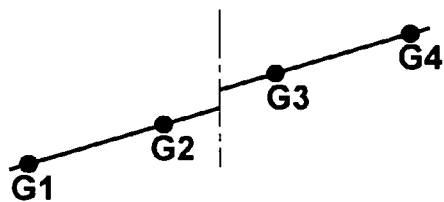
FIG. 14 is an explanatory view showing an example of a shape of a profile, in which a difference between pixel values of two pixels that are adjacent to each other is markedly small, and for which it is judged that an edge is located between the two pixels that are adjacent to each other.

Further, in cases where it has been judged that an edge is located between the two pixels G2 and G3 that are adjacent to each other, in the same manner as that for the judging section 3 in the image size enlarging and reducing apparatus of FIG. 1, in which the first embodiment of the edge detecting apparatus in accordance with the present invention is employed, the judging section 23 makes a judgment (i.e., a second judgment) as to whether the absolute value of the difference d0 is or is not equal to at least the threshold value Th1. In cases where it has been judged with the second judgment that the absolute value of the difference d0 is equal to at least the threshold value Th1, the judging section 23 judges that a true edge is located between the two pixels G2 and G3. In cases where it has been judged with the second judgment that the absolute value of the difference d0 is not equal to at least the threshold value Th1, the judging section 23 judges that an edge is not located between the two pixels G2 and G3. The second judgment is thus performed in order to prevent the problems from occurring in that, as illustrated in, for example, FIG. 14, in cases where the difference between the pixel values of the pixels G2 and G3 is markedly small and may be regarded as being noise, if it has been judged with the first judgment that an edge is located between the pixels G2 and G3, the interpolating operation section 24 will perform the first interpolating operation in accordance with the result of the first judgment, and noise will be enhanced. The judging section 23 feeds the information, which represents the results of the judgments, into the interpolating operation section 24.

In the same manner as that for the interpolating operation section 4 in the image size enlarging and reducing apparatus of FIG. 1, in which the aforesaid first embodiment of the edge detecting apparatus in accordance with the present invention is employed, in cases where it has been judged that an edge is located between the two pixels, which are adjacent to each other and between which the interpolated pixel P is located, the interpolating operation section 24 performs the first interpolating operation and thereby calculates the pixel value of the interpolated pixel P. Also, in cases where it has been judged that an edge is not located between the two pixels, which are adjacent to each other and between which the interpolated pixel P is located, the interpolating operation section 24 performs the second interpolating operation and thereby calculates the pixel value of the interpolated pixel P.

How the processing is performed in the image size enlarging and reducing apparatus of FIG. 13, in which the third embodiment of the edge detecting apparatus in accordance with the present invention is employed, will be described hereinbelow.

Figure 15:
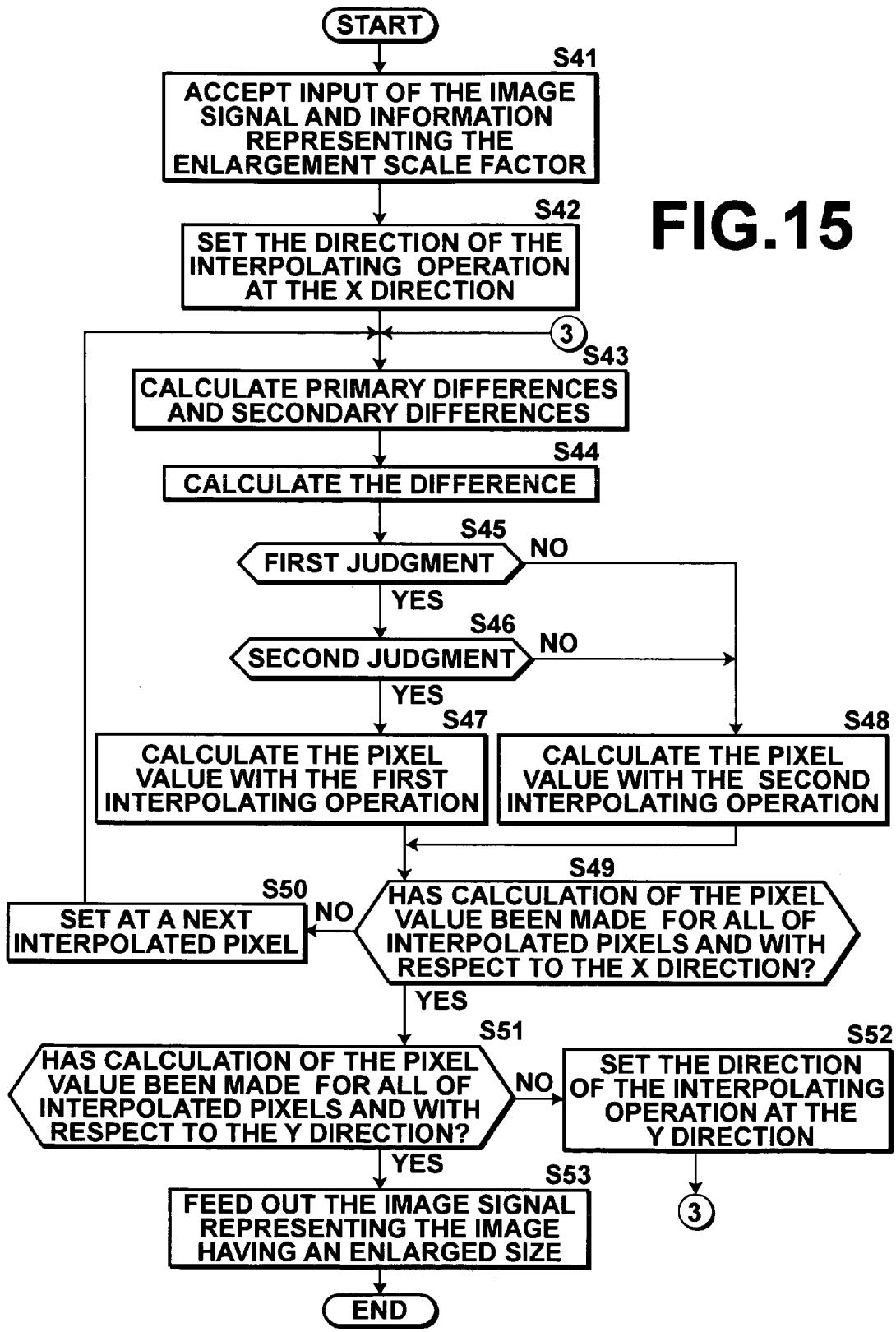
FIG. 15 is a flowchart showing how processing is performed in the image size enlarging and reducing apparatus of FIG. 13, in which the third embodiment of the edge detecting apparatus in accordance with the present invention is employed.

FIG. 15 is a flow chart showing how processing is performed in the image size enlarging and reducing apparatus of FIG. 13, in which the third embodiment of the edge detecting apparatus in accordance with the present invention is employed. In the image size enlarging and reducing apparatus of FIG. 13, in which the third embodiment of the edge detecting apparatus in accordance with the present invention is employed, as in the image size enlarging and reducing apparatus of FIG. 1, in which the first embodiment of the edge detecting apparatus in accordance with the present invention is employed, it is assumed that the interpolated pixel P is located between the pixels in the image S0. Firstly, in a step S41, the input section 21 accepts the image signal S0, which is to be subjected to the image size enlargement processing, and the information representing the enlargement scale factor K for the image signal S0. Also, in a step S42, the direction of the interpolating operation is set at the x direction. Thereafter, in a step S43, with respect to a first interpolated pixel P in accordance with the enlargement scale factor K (for example, a pixel located in an upper left area of an image S1 obtained from the image size enlargement processing), the first filtering section 22A calculates the primary differences d1, d2, d3 and the secondary differences d4, d5 from the four pixels G1, G2, G3, and G4 that are adjacent in series to one another and contain the two pixels G2 and G3 between which the interpolated pixel P is located. Further, in a step S44, the second filtering section 22B performs the filtering processing with the difference filter and on the pixels G2 and G3 and thereby calculates the difference d0.

Also, in a step S45, the judging section 23 makes the judgment (i.e., the first judgment) as to whether an edge is or is not located between the two pixels G2 and G3, which are adjacent to each other and between which the interpolated pixel P is located. The first judgment is made in accordance with the relationship of positive and negative signs among the primary differences d1, d2, d3 and the secondary differences d4, d5. In cases where it has been judged with the first judgment in the step S45 that an edge is located between the two pixels G2 and G3, in a step S46, the judging section 23 makes the judgment (i.e., the second judgment) as to whether the absolute value of the difference d0 is or is not equal to at least the threshold value Th1.

In cases where it has been judged with the second judgment in the step S46 that the absolute value of the difference d0 is equal to at least the threshold value Th1, in a step S47, the interpolating operation section 24 calculates the pixel value of the interpolated pixel P with the first interpolating operation described above in accordance with the results of the judgments having been made by the judging section 23. In cases where it has been judged in the step S45 that an edge is not located between the two pixels G2 and G3, and in cases where it has been judged in the step S46 that the absolute value of the difference d0 is not equal to at least the threshold value Th1, in a step S48, the interpolating operation section 24 calculates the pixel value of the interpolated pixel P with the second interpolating operation described above in accordance with the results of the judgments having been made by the judging section 23.

Further, in a step S49, the control section 25 makes a judgment as to whether the calculation of the pixel value of the interpolated pixel P has been or has not been made with respect to all of interpolated pixels P, P, . . . and with respect to the x direction. In cases where it has been judged in the step S49 that the calculation of the pixel value of the interpolated pixel P has not been made with respect to all of interpolated pixels P, P, . . . and with respect to the x direction, in a step S50, the interpolated pixel P to be subjected to the calculation of the pixel value is set at a next interpolated pixel P. Also, the processing reverts to the step S43.

In cases where it has been judged in the step S49 that the calculation of the pixel value of the interpolated pixel P has been made with respect to all of interpolated pixels P, P, . . . and with respect to the x direction, in a step S51, a judgment is made as to whether the calculation of the pixel value of the interpolated pixel P has been or has not been made with respect to all of interpolated pixels P, P, . . . and with respect to the y direction. In cases where it has been judged in the step S51 that the calculation of the pixel value of the interpolated pixel P has not been made with respect to all of interpolated pixels P, P, . . . and with respect to the y direction, in a step S52, the direction of the interpolating operation is set at the y direction. Also, the processing reverts to the step S43. In cases where it has been judged in the step S51 that the calculation of the pixel value of the interpolated pixel P has been made with respect to all of interpolated pixels P, P, . . . and with respect to the y direction, in a step S53, the image signal S1, which represents the image S1 containing the interpolated pixels P, P, . . . and having an enlarged size, is fed out. At this stage, the processing is finished.

As described above, in the image size enlarging and reducing apparatus of FIG. 13, in which the third embodiment of the edge detecting apparatus in accordance with the present invention is employed, the first judgment is made as to whether an edge is or is not located between the two pixels G2 and G3, which are adjacent to each other and between which the interpolated pixel P is located. The first judgment is made in accordance with the relationship of positive and negative signs among the primary differences d1, d2, d3 and the secondary differences d4, d5. In cases where it has been judged with the first judgment that an edge is located between the two pixels G2 and G3, the second judgment is made as to whether the absolute value of the difference d0 is or is not equal to at least the threshold value Th1. In cases where it has been judged with the second judgment that the absolute value of the difference d0 is equal to at least the threshold value Th1, it is regarded that a true edge is located between the two pixels G2 and G3. Therefore, instead of a detection being made as to whether an edge is or is not located at a pixel in the image S0, the detection is capable of being made reliably as to whether an edge is or is not located between the pixels in the image S0. Also, since it is sufficient for the difference d0, the primary differences d1, d2, d3, and the secondary differences d4, d5 to be calculated, the detection as to whether an edge is or is not located between the pixels in the image is capable of being made quickly with simple operation processing.

A first embodiment of the profile judging apparatus in accordance with the present invention will be described hereinbelow.

Figure 16:
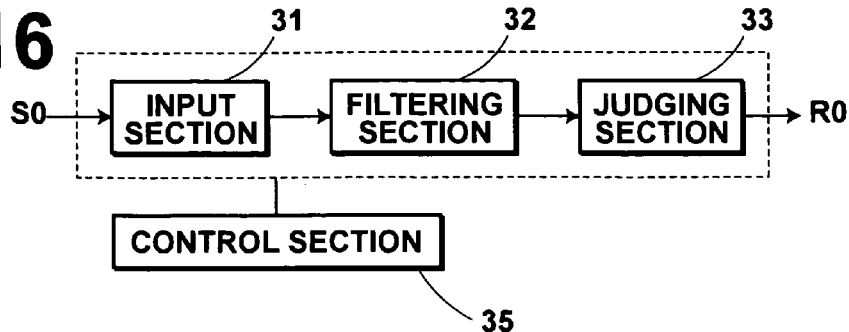
FIG. 16 is a block diagram showing a first embodiment of the profile judging apparatus in accordance with the present invention.

FIG. 16 is a block diagram showing a first embodiment of the profile judging apparatus in accordance with the present invention. As illustrated in FIG. 16, the first embodiment of the profile judging apparatus in accordance with the present invention comprises an input section 31 for accepting the input of the image signal S0. The profile judging apparatus also comprises a filtering section 32, and a judging section 33. The profile judging apparatus further comprises a control section 35 for controlling the operations of the input section 31, the filtering section 32, and the judging section 33.

In the same manner as that for the filtering section 12 in the image size enlarging and reducing apparatus of FIG. 7, in which the second embodiment of the edge detecting apparatus in accordance with the present invention is employed, the filtering section 32 performs the filtering processing with respect to the four pixels G1, G2, G3, and G4, which are adjacent in series to one another. The four pixels G1, G2, G3, and G4, which are adjacent in series to one another, are composed of the two pixels G2 and G3, which are adjacent to each other and between which the interpolated pixel P is located, the pixel G1 adjacent to the pixel G2, and the pixel G4 adjacent to the pixel G3. In this manner, the filtering section 32 calculates the primary differences d1, d2, d3 and the secondary differences d4, d5.

In accordance with the relationship of positive and negative signs among the primary differences d1, d2, d3 and the secondary differences d4, d5, the judging section 33 makes reference to the tables illustrated in FIG. 9, FIG. 10, and FIG. 11 and makes a judgment as to whether the shape of the profile of the pixel values of the four pixels G1, G2, G3, and G4 that are adjacent in series to one another coincides with the profile shape of "edge 1," the profile shape of "edge 2," the profile shape of "mountain," the profile shape of "valley," or the profile shape of "others." The judging section 33 feeds out information R0 representing the result of the judgment.

The judgment result information R0 may be stored on a recording medium such that it may be clear which judgment result information R0 corresponds to which pixel position in the image S0. Also, when the image size enlargement or reduction processing is to be performed on the image S0, reference may be made to the judgment result information R0. Further, in the same manner as that for the image size enlarging and reducing apparatus of FIG. 1, in which the first embodiment of the edge detecting apparatus in accordance with the present invention is employed, different interpolating operations may be performed for an area, which has been judged as containing an edge, and an area, which has been judged as not containing an edge.

How the processing is performed in the first embodiment of the profile judging apparatus in accordance with the present invention will be described hereinbelow.

Figure 17:
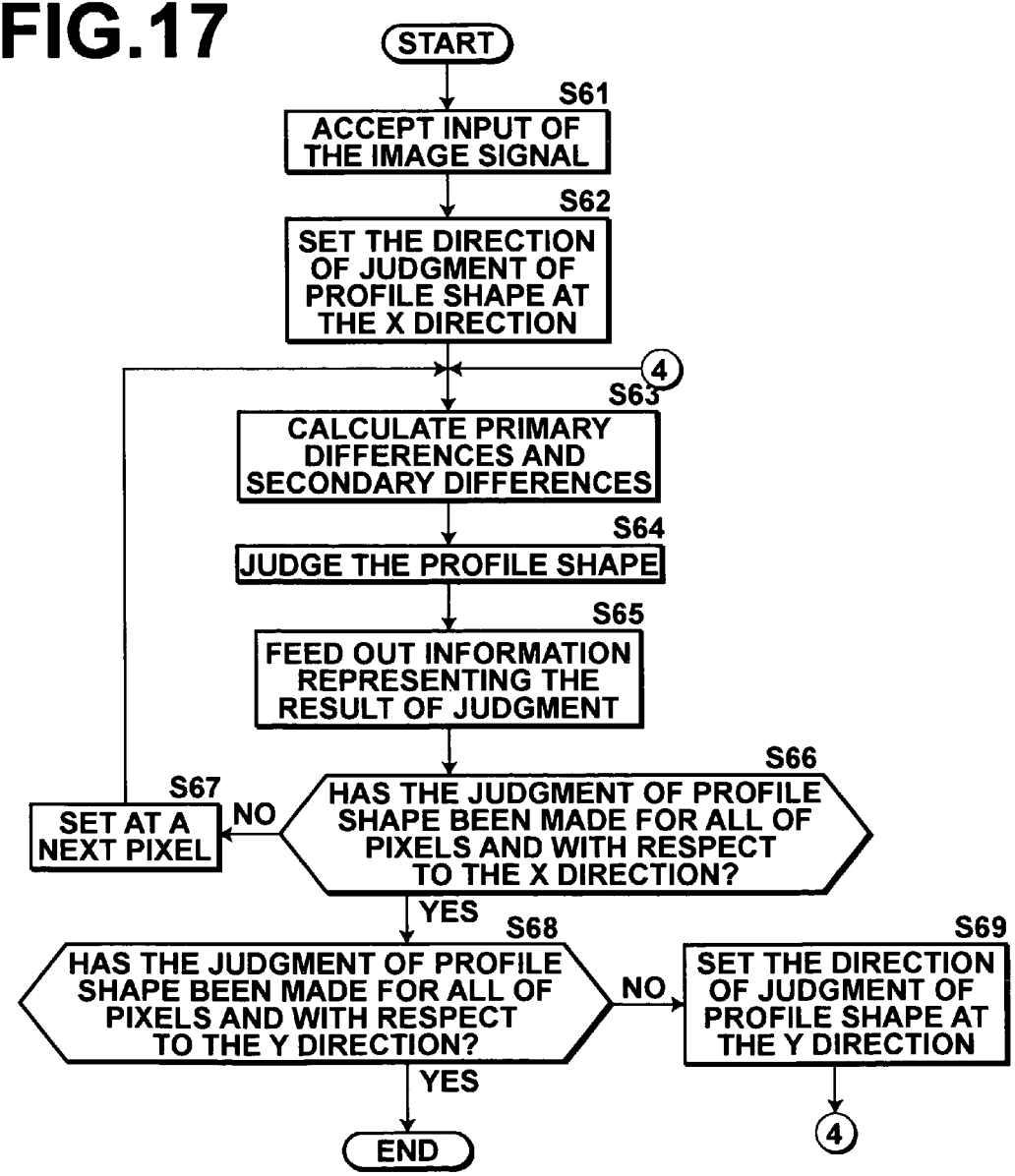
FIG. 17 is a flow chart showing how processing is performed in the first embodiment of the profile judging apparatus in accordance with the present invention.

FIG. 17 is a flowchart showing how processing is performed in the first embodiment of the profile judging apparatus in accordance with the present invention. Firstly, in a step S61, the input section 31 accepts the image signal S0. Also, in a step S62, the direction of the judgment of the shape of the profile is set at the x direction. Thereafter, in a step S63, with respect to a first pixel to be subjected to the judgment of the shape of the profile (for example, a pixel located in an upper left area of the image S0), the filtering section 32 calculates the primary differences d1, d2, d3 and the secondary differences d4, d5 from the four pixels G1, G2, G3, and G4 that are adjacent in series to one another and contain the pixel to be subjected to the judgment of the shape of the profile. Further, in a step S64, in accordance with the relationship of positive and negative signs among the primary differences d1, d2, d3 and the secondary differences d4, d5, the judging section 33 makes reference to the tables illustrated in FIG. 9, FIG. 10, and FIG. 11 and makes a judgment as to whether the shape of the profile of the pixel values of the four pixels G1, G2, G3, and G4 that are adjacent in series to one another coincides with the profile shape of "edge 1," the profile shape of "edge 2," the profile shape of "mountain," the profile shape of "valley," or the profile shape of "others." Furthermore, in a step S65, the judging section 33 feeds out the information R0 representing the result of the judgment.

Further, in a step S66, the control section 35 makes a judgment as to whether the judgment of the shape of the profile has been or has not been made with respect to all pixels and with respect to the x direction. In cases where it has been judged in the step S66 that the judgment of the shape of the profile has not been made with respect to all pixels and with respect to the x direction, in a step S67, the pixel to be subjected to the judgment of the shape of the profile is set at a next pixel. Also, the processing reverts to the step S63.

In cases where it has been judged in the step S66 that the judgment of the shape of the profile has been made with respect to all pixels and with respect to the x direction, in a step S68, a judgment is made as to whether the judgment of the shape of the profile has been or has not been made with respect to all pixels and with respect to the y direction. In cases where it has been judged in the step S68 that the judgment of the shape of the profile has not been made with respect to all pixels and with respect to the y direction, in a step S69, the direction of the judgment of the shape of the profile is set at the y direction. Also, the processing reverts to the step S63. In cases where it has been judged in the step S68 that the judgment of the shape of the profile has been made with respect to all pixels and with respect to the y direction, the processing is finished.

As described above, in the first embodiment of the profile judging apparatus in accordance with the present invention, the judgment of the shape of the profile of the pixel values of the four pixels G1, G2, G3, and G4 that are adjacent in series to one another is made in accordance with the relationship of positive and negative signs among the primary differences d1, d2, d3 and the secondary differences d4, d5. Therefore, the judgment is capable of being made as to, for example, whether an edge is or is not located in the vicinity of the four pixels that are adjacent in series to one another in the image S0.

A second embodiment of the profile judging apparatus in accordance with the present invention will be described hereinbelow.

Figure 18:
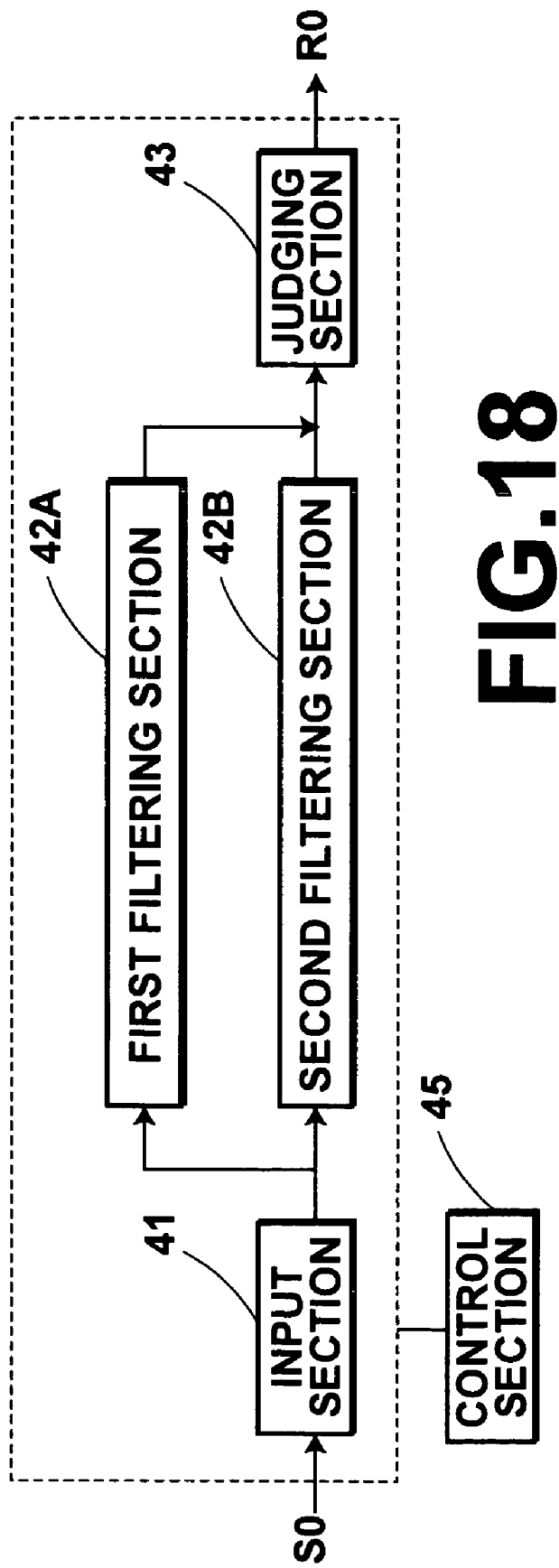
FIG. 18 is a block diagram showing a second embodiment of the profile judging apparatus in accordance with the present invention.

FIG. 18 is a block diagram showing a second embodiment of the profile judging apparatus in accordance with the present invention. As illustrated in FIG. 18, the second embodiment of the profile judging apparatus in accordance with the present invention comprises an input section 41 for accepting the input of the image signal S0. The profile judging apparatus also comprises a first filtering section 42A, a second filtering section 42B, and a judging section 43. The profile judging apparatus further comprises a control section 45 for controlling the operations of the input section 41, the first filtering section 42A, the second filtering section 42B, and the judging section 43.

In the same manner as that for the filtering section 12 in the image size enlarging and reducing apparatus of FIG. 7, in which the second embodiment of the edge detecting apparatus in accordance with the present invention is employed, the first filtering section 42A performs the filtering processing with respect to the four pixels G1, G2, G3, and G4, which are adjacent in series to one another. The four pixels G1, G2, G3, and G4, which are adjacent in series to one another, are composed of the two pixels G2 and G3, which are adjacent to each other and between which the interpolated pixel P is located, the pixel G1 adjacent to the pixel G2, and the pixel G4 adjacent to the pixel G3. In this manner, the first filtering section 42A calculates the primary differences d1, d2, d3 and the secondary differences d4, d 5.

In the same manner as that for the filtering section 2 in the image size enlarging and reducing apparatus of FIG. 1, in which the first embodiment of the edge detecting apparatus in accordance with the present invention is employed, the second filtering section 42B performs the filtering processing on the two middle pixels G2 and G3, which are among the four pixels G1, G2, G3, and G4 that are adjacent in series to one another in the image S0. The second filtering section 42B thus calculates the difference d0 between the pixel values of the pixels G2 and G3.

In accordance with the relationship of positive and negative signs among the primary differences d1, d2, d3 and the secondary differences d4, d5, the judging section 43 makes reference to the tables illustrated in FIG. 9, FIG. 10, and FIG. 11 and makes a judgment (i.e., a third judgment) as to whether the shape of the profile of the pixel values of the four pixels G1, G2, G3, and G4 that are adjacent in series to one another coincides with the profile shape of "edge 1," the profile shape of "edge 2," the profile shape of "mountain," the profile shape of "valley," or the profile shape of "others." Further, in cases where it has been judged with the third judgment that the shape of the profile of the pixel values of the four pixels G1, G2, G3, and G4 that are adjacent in series to one another coincides with the profile shape of "edge 1" or the profile shape of "edge 2," in the same manner as that for the judging section 3 in the image size enlarging and reducing apparatus of FIG. 1, in which the first embodiment of the edge detecting apparatus in accordance with the present invention is employed, the judging section 43 makes a judgment (i.e., a fourth judgment) as to whether the absolute value of the difference d0 is or is not equal to at least the threshold value Th1. In cases where it has been judged with the fourth judgment that the absolute value of the difference d0 is equal to at least the threshold value Th1, since it is regarded that a true edge is located between the two pixels G2 and G3, the judging section 43 judges that the result of the third judgment is correct and that the shape of the profile of the pixel values of the four pixels G1, G2, G3, and G4, which are adjacent in series to one another, coincides with the profile shape of "edge 1" or the profile shape of "edge 2" and thus represents the presence of an edge. In cases where it has been judged with the fourth judgment that the absolute value of the difference d0 is not equal to at least the threshold value Th1, since it is regarded that an edge is not located between the two pixels G2 and G3, the judging section 43 judges that the shape of the profile of the pixel values of the four pixels G1, G2, G3, and G4, which are adjacent in series to one another, is a profile shape other than "edge 1" and "edge 2."

The judgment result information R0 may be stored on a recording medium such that it may be clear which judgment result information R0 corresponds to which pixel position in the image S0. Also, when the image size enlargement or reduction processing is to be performed on the image S0, reference may be made to the judgment result information R0. Further, in the same manner as that for the image size enlarging and reducing apparatus of FIG. 1, in which the first embodiment of the edge detecting apparatus in accordance with the present invention is employed, different interpolating operations may be performed for an area, which has been judged as containing an edge, and an area, which has been judged as not containing an edge.

How the processing is performed in the second embodiment of the profile judging apparatus in accordance with the present invention will be described hereinbelow.

Figure 19:
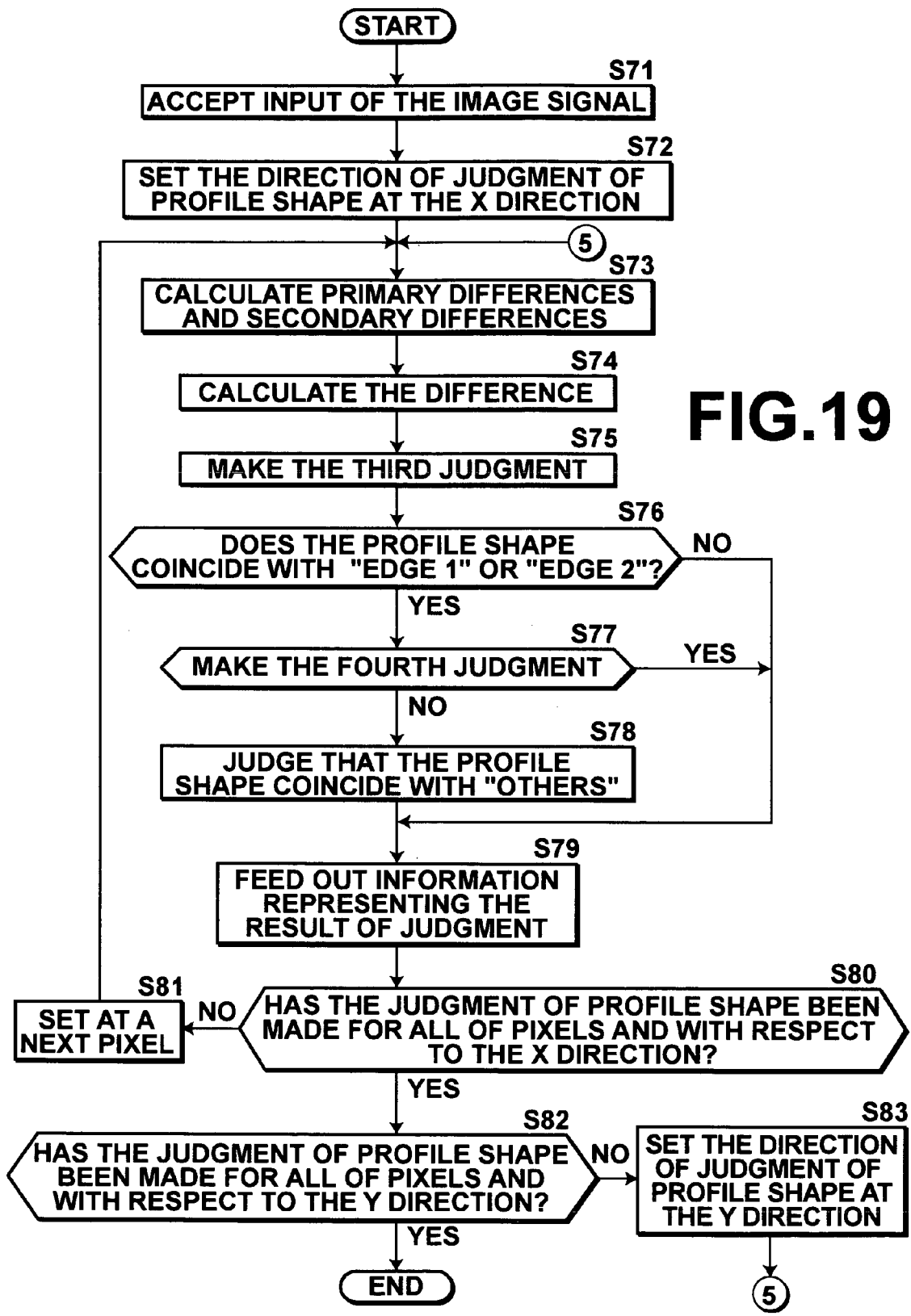
FIG. 19 is a flow chart showing how processing is performed in the second embodiment of the profile judging apparatus in accordance with the present invention.

FIG. 19 is a flowchart showing how processing is performed in the second embodiment of the profile judging apparatus in accordance with the present invention. Firstly, in a step S71, the input section 41 accepts the image signal S0. Also, in a step S72, the direction of the judgment of the shape of the profile is set at the x direction. Thereafter, in a step S73, with respect to a first pixel to be subjected to the judgment of the shape of the profile (for example, a pixel located in an upper left area of the image S0), the first filtering section 42A calculates the primary differences d1, d2, d3 and the secondary differences d4, d5 from the four pixels G1, G2, G3, and G4 that are adjacent in series to one another and contain the pixel to be subjected to the judgment of the shape of the profile. Further, in a step S74, the second filtering section 42B performs the filtering processing on the pixels G2 and G3 and thus calculates the difference d0 between the pixel values of the pixels G2 and G3.

Furthermore, in a step S75, in accordance with the relationship of positive and negative signs among the primary differences d1, d2, d3 and the secondary differences d4, d5, the judging section 43 makes reference to the tables illustrated in FIG. 9, FIG. 10, and FIG. 11 and makes the judgment (i.e., the third judgment) as to whether the shape of the profile of the pixel values of the four pixels G1, G2, G3, and G4 that are adjacent in series to one another coincides with the profile shape of "edge 1," the profile shape of "edge 2," the profile shape of "mountain," the profile shape of "valley," or the profile shape of "others." Also, in a step S76, the judging section 43 makes a judgment as to whether it has been or has not been judged with the third judgment that the shape of the profile of the pixel values of the four pixels G1, G2, G3, and G4 that are adjacent in series to one another coincides with the profile shape of "edge 1" or the profile shape of "edge 2." In cases where it has been judged with the third judgment that the shape of the profile of the pixel values of the four pixels G1, G2, G3, and G4 that are adjacent in series to one another coincides with the profile shape of "edge 1" or the profile shape of "edge 2," in a step S77, the judging section 43 makes the judgment (i.e., the fourth judgment) as to whether the absolute value of the difference d0 is or is not equal to at least the threshold value Th1.

In cases where it has been judged with the fourth judgment that the absolute value of the difference d0 is not equal to at least the threshold value Th1, since it is regarded that an edge is not located between the two pixels G2 and G3, in a step S78, the judging section 43 judges that the shape of the profile of the pixel values of the four pixels G1, G2, G3, and G4, which are adjacent in series to one another, is a profile shape other than "edge 1" and "edge 2." In cases where it has been judged with the fourth judgment that the absolute value of the difference d0 is equal to at least the threshold value Th1, since it is regarded that a true edge is located between the two pixels G2 and G3, in a step S79, the judging section 43 judges that the result of the third judgment is correct, and the judging section 43 feeds out the information R0 representing the result of the judgment. In cases where it has been judged with the third judgment in the step S76 that the shape of the profile of the pixel values of the four pixels G1, G2, G3, and G4 that are adjacent in series to one another does not coincide with the profile shape of "edge 1" and the profile shape of "edge 2," the processing proceeds to the step S79, and the judgment result information R0 is fed out.

Further, in a step S80, the control section 45 makes a judgment as to whether the judgment of the shape of the profile has been or has not been made with respect to all pixels and with respect to the x direction. In cases where it has been judged in the step S80 that the judgment of the shape of the profile has not been made with respect to all pixels and with respect to the x direction, in a step S81, the pixel to be subjected to the judgment of the shape of the profile is set at a next pixel. Also, the processing reverts to the step S73.

In cases where it has been judged in the step S80 that the judgment of the shape of the profile has been made with respect to all pixels and with respect to the x direction, in a step S82, a judgment is made as to whether the judgment of the shape of the profile has been or has not been made with respect to all pixels and with respect to the y direction. In cases where it has been judged in the step S82 that the judgment of the shape of the profile has not been made with respect to all pixels and with respect to the y direction, in a step S83, the direction of the judgment of the shape of the profile is set at the y direction. Also, the processing reverts to the step S73. In cases where it has been judged in the step S82 that the judgment of the shape of the profile has been made with respect to all pixels and with respect to the y direction, the processing is finished.

As described above, in the second embodiment of the profile judging apparatus in accordance with the present invention, the judgment (i.e., the third judgment) of the shape of the profile of the pixel values of the four pixels G1, G2, G3, and G4 that are adjacent in series to one another is made in accordance with the relationship of positive and negative signs among the primary differences d1, d2, d3 and the secondary differences d4, d5. Also, in cases where the profile shape has been judged as being a profile shape representing the presence of an edge, the judgment (i.e., the fourth judgment) is made as to whether the absolute value of the difference d0 between the pixel values of the two pixels G2 and G3, which are adjacent to each other, is or is not equal to at least the threshold value Th1. In cases where it has been judged with the fourth judgment that the absolute value of the difference d0 is not equal to at least the threshold value Th1, it is regarded that an edge is not located between the two pixels G2 and G3. Therefore, the judgment is capable of being made accurately as to, for example, whether an edge is or is not located in the vicinity of the four pixels that are adjacent in series to one another in the image S0.

In each of the image size enlarging and reducing apparatus of FIG. 7, in which the second embodiment of the edge detecting apparatus in accordance with the present invention is employed, and the image size enlarging and reducing apparatus of FIG. 13, in which the third embodiment of the edge detecting apparatus in accordance with the present invention is employed, in cases where the relationship of positive and negative signs among the primary differences d1, d2, d3 and the secondary differences d4, d5, which have been obtained with respect to the four pixels that are adjacent in series to one another, coincides with the relationship of "mountain," the relationship of "valley," or the relationship of "others" illustrated in FIG. 10 or FIG. 11, it is judged that an edge is not located between the two pixels G2 and G3 that are adjacent to each other, and the pixel value of the interpolated pixel P is calculated with the second interpolating operation. Alternatively, different interpolating operations may be employed for the cases where the relationship of positive and negative signs among the primary differences d1, d2, d3 and the secondary differences d4, d5 coincides with the relationship of "mountain" or the relationship of "valley" and for the cases where the relationship of positive and negative signs among the primary differences d1, d2, d3 and the secondary differences d4, d5 coincides with the relationship of "others," and the pixel value of the interpolated pixel P may thereby be calculated.

An embodiment of the image size enlarging and reducing apparatus in accordance with the present invention will be described hereinbelow.

Figure 20:
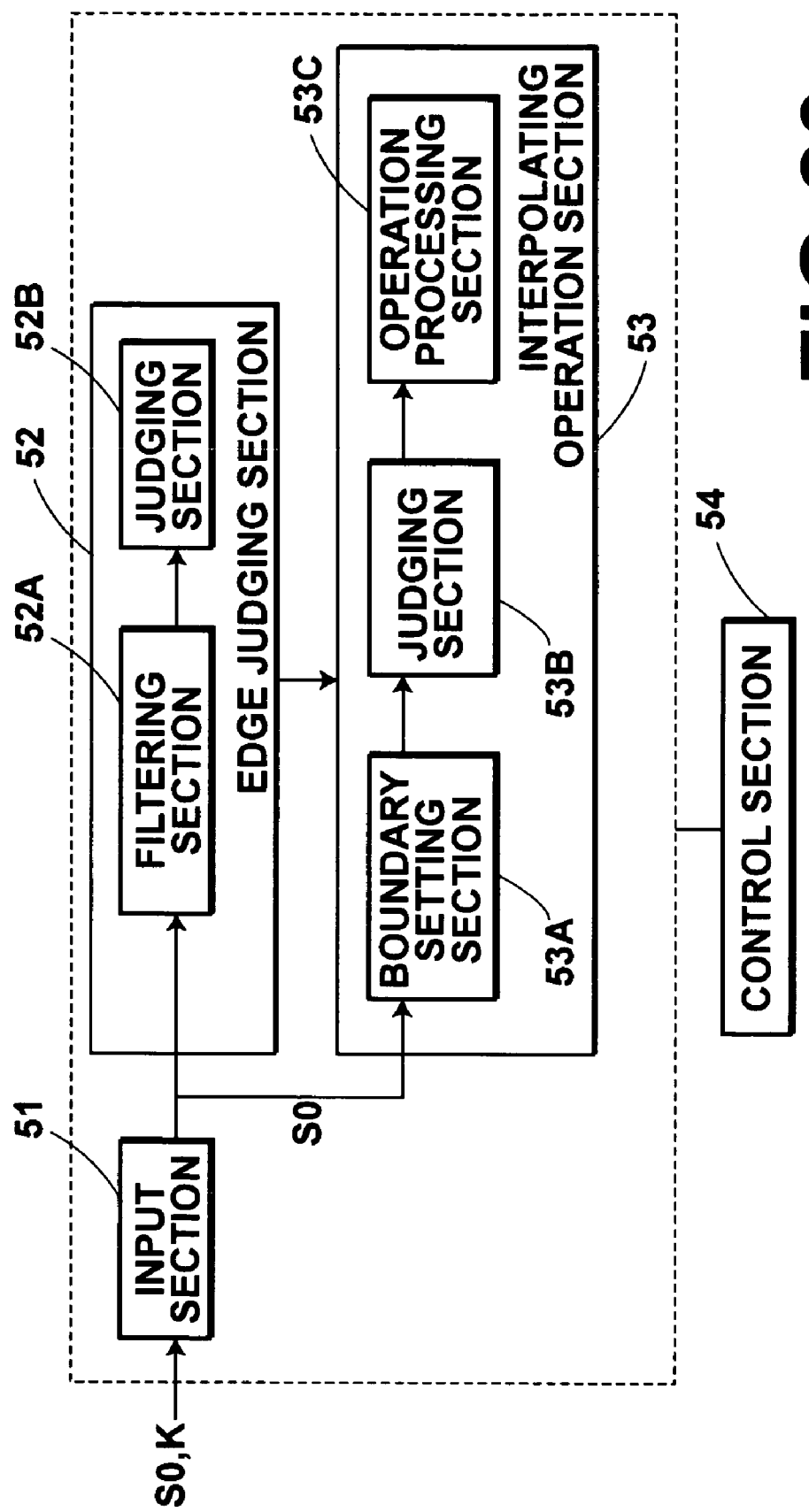
FIG. 20 is a block diagram showing an embodiment of the image size enlarging and reducing apparatus in accordance with the present invention.

FIG. 20 is a block diagram showing an embodiment of the image size enlarging and reducing apparatus in accordance with the present invention. As illustrated in FIG. 20, the embodiment of the image size enlarging and reducing apparatus in accordance with the present invention comprises an input section 51 for accepting the inputs of the image signal S0 and the information representing the enlargement scale factor K for the image signal S0. The image size enlarging and reducing apparatus also comprises an edge judging section 52, and an interpolating operation section 53 for calculating the pixel value of the interpolated pixel P. The image size enlarging and reducing apparatus further comprises a control section 54 for controlling the operations of the input section 51, the edge judging section 52, and the interpolating operation section 53.

The edge judging section 52 is provided with a filtering section 52A and a judging section 52B.

In the same manner as that for the filtering section 12 in the image size enlarging and reducing apparatus of FIG. 7, in which the second embodiment of the edge detecting apparatus in accordance with the present invention is employed, the filtering section 52A performs the filtering processing with respect to the four pixels G1, G2, G3, and G4, which are adjacent in series to one another. In this manner, the filtering section 52A calculates the primary differences d1, d2, d3 and the secondary differences d4, d5. Also, the filtering section 52A performs the filtering processing on the two middle pixels G2 and G3, which are among the four pixels G1, G2, G3, and G4 that are adjacent in series to one another in the image S0. The filtering section 52A thus calculates the difference d0 (=d2) between the pixel values of the pixels G2 and G3. Alternatively, the primary difference d2 described above may be directly utilized as the difference d0.

In the same manner as that for the judging section 13 in the image size enlarging and reducing apparatus of FIG. 7, in which the second embodiment of the edge detecting apparatus in accordance with the present invention is employed, the judging section 52B makes the judgment (i.e., the first judgment) as to whether an edge is or is not located between the two pixels G2 and G3, which are adjacent to each other. The first judgment is made in accordance with the relationship of positive and negative signs among the primary differences d1, d2, d3 and the secondary differences d4, d5. Specifically, in cases where the relationship of positive and negative signs among the primary differences d1, d2, d3 and the secondary differences d4, d5, which have been obtained with respect to the four pixels that are adjacent in series to one another, coincides with the relationship of "edge 1" or the relationship of "edge 2" illustrated in FIG. 9, the judging section 52B judges that an edge is located between the two pixels G2 and G3 that are adjacent to each other. Also, in cases where the relationship of positive and negative signs among the primary differences d1, d2, d3 and the secondary differences d4, d5, which have been obtained with respect to the four pixels that are adjacent in series to one another, coincides with the relationship of "mountain," the relationship of "valley," or the relationship of "others" illustrated in FIG. 10 or FIG. 11, the judging section 52B judges that an edge is not located between the two pixels G2 and G3 that are adjacent to each other.

Further, in cases where it has been judged with the first judgment that an edge is located between the two pixels G2 and G3 that are adjacent to each other, in the same manner as that for the judging section 3 in the image size enlarging and reducing apparatus of FIG. 1, in which the first embodiment of the edge detecting apparatus in accordance with the present invention is employed, the judging section 52B makes the judgment (i.e., the second judgment) as to whether the absolute value of the difference d0 is or is not equal to at least the threshold value Th1. In cases where it has been judged with the second judgment that the absolute value of the difference d0 is equal to at least the threshold value Th1, the judging section 52B judges that a true edge is located between the two pixels G2 and G3. In cases where it has been judged with the second judgment that the absolute value of the difference d0 is not equal to at least the threshold value Th1, the judging section 52B judges that an edge is not located between the two pixels G2 and G3.

The interpolating operation section 53 is provided with a boundary setting section 53A, a judging section 53B, and an operation processing section 53C. In accordance with the result of the judgment having been made by the edge judging section 52, the operation processing section 53C performs different interpolating operations for the cases where it has been judged that an edge is located between the two pixels, which are adjacent to each other and between which the interpolated pixel P is located, and the cases where it has been judged that an edge is not located between the two pixels, which are adjacent to each other and between which the interpolated pixel P is located. The operation processing section 53C thus calculates the pixel value of the interpolated pixel P. Specifically, in the same manner as that for the interpolating operation section 4 in the image size enlarging and reducing apparatus of FIG. 1, in which the aforesaid first embodiment of the edge detecting apparatus in accordance with the present invention is employed, in cases where it has been judged that an edge is not located between the two pixels, which are adjacent to each other and between which the interpolated pixel P is located, the operation processing section 53C performs the bicubic technique and thereby calculates the pixel value of the interpolated pixel P.

Also, in the same manner as that for the interpolating operation section 4 in the image size enlarging and reducing apparatus of FIG. 1, in which the aforesaid first embodiment of the edge detecting apparatus in accordance with the present invention is employed, in cases where it has been judged that an edge is located between the two pixels, which are adjacent to each other and between which the interpolated pixel P is located, the operation processing section 53C calculates the pixel value of the interpolated pixel P in the manner illustrated in FIG. 5A or FIG. 5B.

Specifically, in cases where the profile takes the step-like edge shape as illustrated in FIG. 5A, the boundary setting section 53A sets the median line M, which is indicated by the single-dot chained line and which bisects the distance between the pixels G2 and G3 in the pixel array direction, as a boundary. Also, the judging section 53B makes a judgment as to whether the interpolated pixel P is located on the right side of the median line M or on the left side of the median line M. In cases where the interpolated pixel P is located on the right side of the median line M (in this case, the interpolated pixel P is represented by P1), the operation processing section 53C calculates a value lying on the extension of the straight line, which connects the pixels G3 and G4, as the pixel value of the interpolated pixel P1. Also, in cases where the interpolated pixel P is located on the left side of the median line M (in this case, the interpolated pixel P is represented by P2), the operation processing section 53C calculates a value lying on the extension of the straight line, which connects the pixels G1 and G2, as the pixel value of the interpolated pixel P2.

In cases where the profile takes the edge shape as illustrated in FIG. 5B, the boundary setting section 53A sets the intersection point C of the extension of the straight line, which connects the pixels G1 and G2, and the extension of the straight line, which connects the pixels G3 and G4, as the boundary. Also, the judging section 53B makes a judgment as to whether the interpolated pixel P is located on the right side of the intersection point C or on the left side of the intersection point C. In cases where the interpolated pixel P1 is located on the right side of the intersection point C, the operation processing section 53C calculates a value lying on the extension of the straight line, which connects the pixels G3 and G4, as the pixel value of the interpolated pixel P1. Also, in cases where the interpolated pixel P2 is located on the left side of the intersection point C, the operation processing section 53C calculates a value lying on the extension of the straight line, which connects the pixels G1 and G2, as the pixel value of the interpolated pixel P2.

In this embodiment of the image size enlarging and reducing apparatus in accordance with the present invention, the operation processing performed in cases where it has been judged that an edge is located between the two pixels, which are adjacent to each other and between which the interpolated pixel P is located, will hereinbelow be referred to as the first interpolating operation. Also, the operation processing performed in cases where it has been judged that an edge is not located between the two pixels, which are adjacent to each other and between which the interpolated pixel P is located, will hereinbelow be referred to as the second interpolating operation.

How the processing is performed in the embodiment of the image size enlarging and reducing apparatus in accordance with the present invention, which is shown in FIG. 20, will be described hereinbelow.

Figure 21:
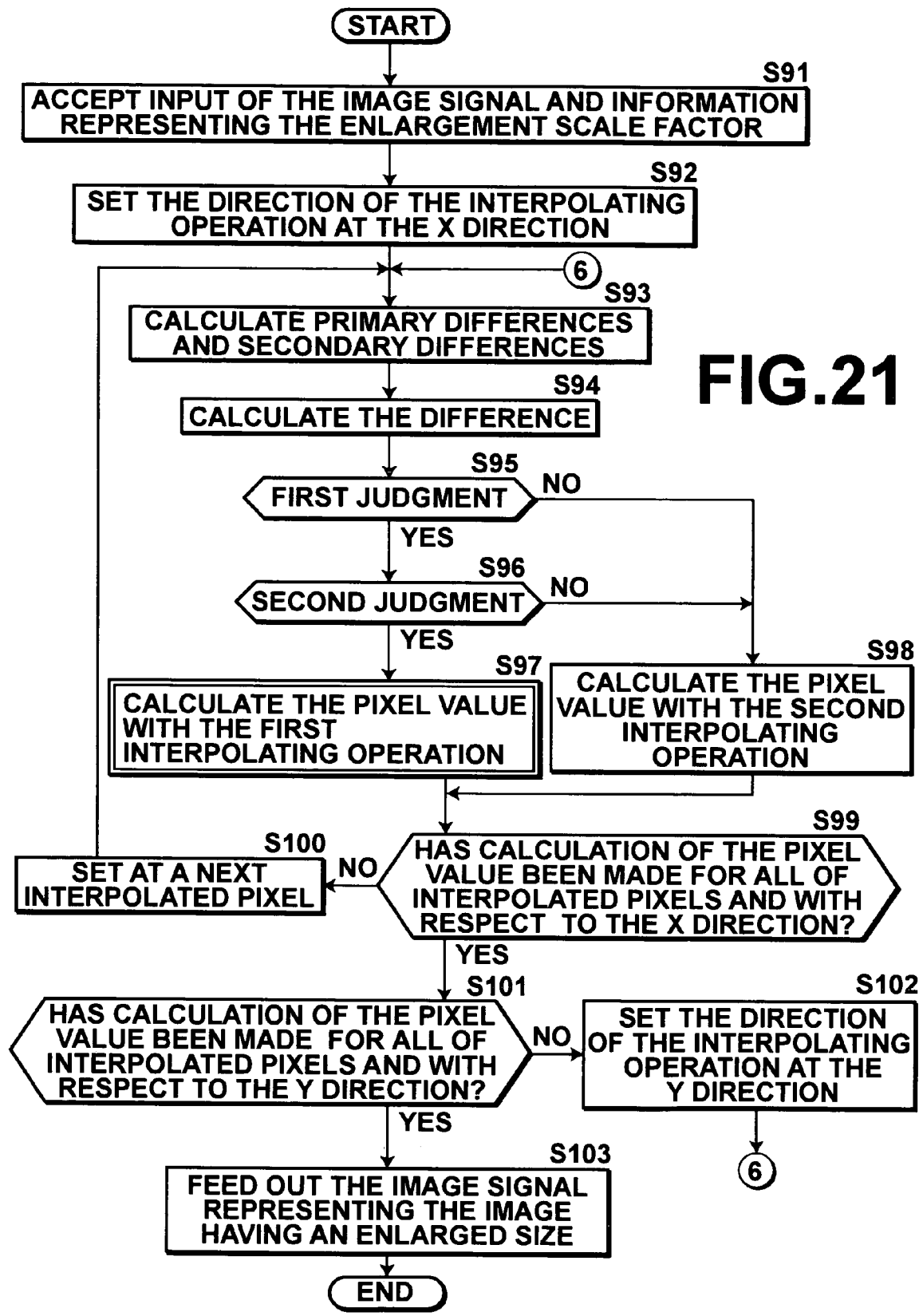
FIG. 21 is a flow chart showing how processing is performed in the embodiment of the image size enlarging and reducing apparatus in accordance with the present invention, which is shown in FIG. 20.

FIG. 21 is a flowchart showing how processing is performed in the embodiment of the image size enlarging and reducing apparatus in accordance with the present invention, which is shown in FIG. 20. In the image size enlarging and reducing apparatus of FIG. 20, it is assumed that the interpolated pixel P is located between the pixels in the image S0. Firstly, in a step S91, the input section 51 accepts the image signal S0, which is to be subjected to the image size enlargement processing, and the information representing the enlargement scale factor K for the image signal S0. Also, in a step S92, the direction of the interpolating operation is set at the x direction. Thereafter, in a step S93, with respect to a first interpolated pixel P in accordance with the enlargement scale factor K (for example, a pixel located in an upper left area of an image S1 obtained from the image size enlargement processing), the filtering section 52A of the edge judging section 52 calculates the primary differences d1, d2, d3 and the secondary differences d4, d5 from the four pixels G1, G2, G3, and G4 that are adjacent in series to one another and contain the two pixels G2 and G3 between which the interpolated pixel P is located. Further, in a step S94, the filtering section 52A performs the filtering processing with the difference filter and on the pixels G2 and G3 and thereby calculates the difference d0.

Also, in a step S95, the judging section 52B makes the judgment (i.e., the first judgment) as to whether an edge is or is not located between the two pixels G2 and G3, which are adjacent to each other and between which the interpolated pixel P is located. The first judgment is made in accordance with the relationship of positive and negative signs among the primary differences d1, d2, d3 and the secondary differences d4, d5. In cases where it has been judged with the first judgment in the step S95 that an edge is located between the two pixels G2 and G3, in a step S96, the judging section 52B makes the judgment (i.e., the second judgment) as to whether the absolute value of the difference d0 is or is not equal to at least the threshold value Th1.

In cases where it has been judged with the second judgment in the step S96 that the absolute value of the difference d0 is equal to at least the threshold value Th1, in a step S97, it is regarded that an edge is located between the two middle pixels G2 and G3, which are among the four pixels G1, G2, G3, and G4 that are adjacent in series to one another in the image S0, and the interpolating operation section 53 calculates the pixel value of the interpolated pixel P with the first interpolating operation described above. In cases where it has been judged in the step S95 that an edge is not located between the two pixels G2 and G3, and in cases where it has been judged in the step S96 that the absolute value of the difference d0 is not equal to at least the threshold value Th1, in a step S98, it is regarded that an edge is not located between the two middle pixels G2 and G3, and the interpolating operation section 53 calculates the pixel value of the interpolated pixel P with the second interpolating operation described above.

Figure 22:
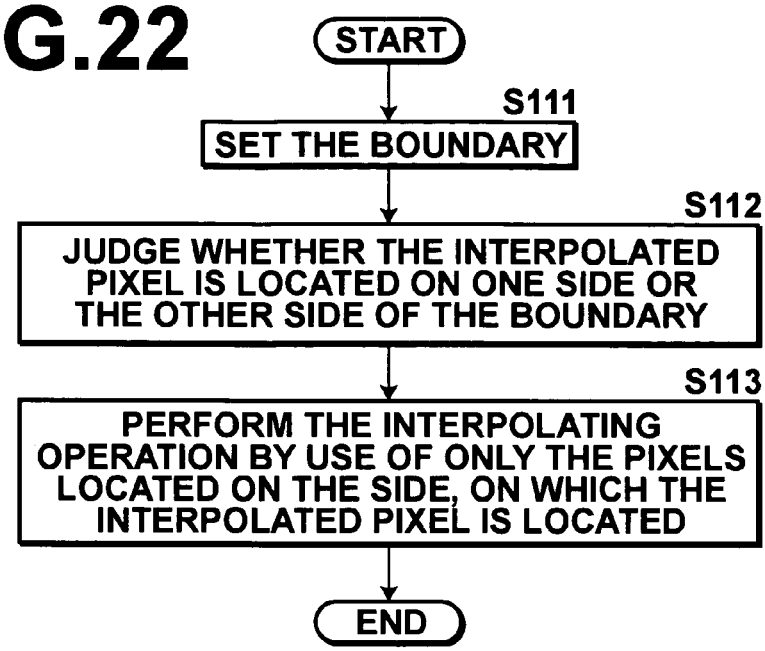
FIG. 22 is a flow chart showing how a first interpolating operation is performed.

FIG. 22 is a flow chart showing how a first interpolating operation is performed. Firstly, in a step S111, the boundary setting section 53A of the interpolating operation section 53 sets the median line M or the intersection point C as the boundary between the two middle pixels G2 and G3. Also, in a step S112, the judging section 53B makes a judgment as to whether the interpolated pixel P is located on one side of the boundary or on the other side of the boundary. Further, in a step S113, the operation processing section 53C performs the interpolating operation by use of only the pixels located on the one side of the boundary or on the other side of the boundary, on which side the interpolated pixel P is located. The operation processing section 53C thus calculates the pixel value of the interpolated pixel P.

Reverting to FIG. 21, in a step S99, the control section 54 makes a judgment as to whether the calculation of the pixel value of the interpolated pixel P has been or has not been made with respect to all of interpolated pixels P, P, . . . and with respect to the x direction. In cases where it has been judged in the step S99 that the calculation of the pixel value of the interpolated pixel P has not been made with respect to all of interpolated pixels P, P, . . . and with respect to the x direction, in a step S100, the interpolated pixel P to be subjected to the calculation of the pixel value is set at a next interpolated pixel P. Also, the processing reverts to the step S93.

In cases where it has been judged in the step S99 that the calculation of the pixel value of the interpolated pixel P has been made with respect to all of interpolated pixels P, P, . . . and with respect to the x direction, in a step S101, a judgment is made as to whether the calculation of the pixel value of the interpolated pixel P has been or has not been made with respect to all of interpolated pixels P, P, . . . and with respect to the y direction. In cases where it has been judged in the step S101 that the calculation of the pixel value of the interpolated pixel P has not been made with respect to all of interpolated pixels P, P, . . . and with respect to the y direction, in a step S102, the direction of the interpolating operation is set at the y direction. Also, the processing reverts to the step S93. In cases where it has been judged in the step S101 that the calculation of the pixel value of the interpolated pixel P has been made with respect to all of interpolated pixels P, P, . . . and with respect to the y direction, in a step S103, the image signal S1, which represents the image S1 containing the interpolated pixels P, P, . . . and having an enlarged size, is fed out. At this stage, the processing is finished.

As described above, in the image size enlarging and reducing apparatus of FIG. 20, since it is sufficient for the difference d0, the primary differences d1, d2, d3, and the secondary differences d4, d5 to be calculated at the time of the detection of the presence of an edge, the detection as to whether an edge is or is not located between the pixels in the image is capable of being made quickly with simple operation processing.

Figure 37A:
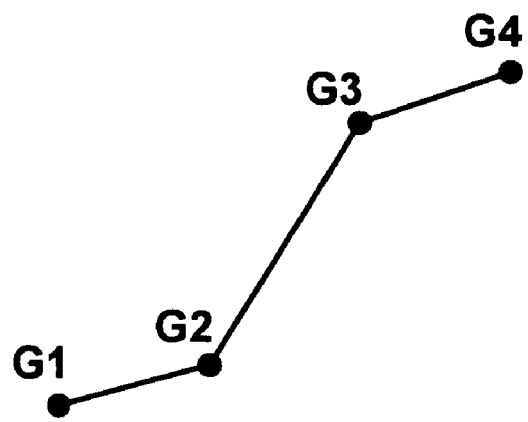
FIGS. 37A and 37B are explanatory views showing how a conventional interpolating operation is performed.
Figure 37B:
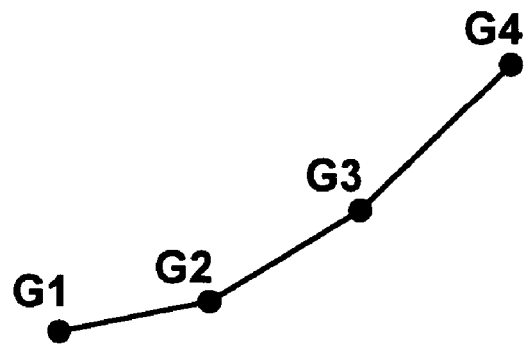

Also, in the image size enlarging and reducing apparatus of FIG. 20, in cases where it has been judged that an edge is located between the pixels in the image S0, as illustrated in FIG. 5A or FIG. 5B, a judgment is made as to whether the interpolated pixel P is located on the one side of the boundary or on the other side of the boundary. Further, the calculation of the pixel value of the interpolated pixel P is made by use of only the pixels located on the one side of the boundary or on the other side of the boundary, on which side the interpolated pixel P is located. Therefore, the pixel value of the interpolated pixel P is not affected by the pixel values of the pixels G2 and G3, which are located on opposite sides of the interpolated pixel P, and reflects only the pixel values of the pixels, which are located on the single side of the interpolated pixel P. Accordingly, with this embodiment of the image interpo-lation apparatus and method in accordance with the present invention, the calculation of the pixel value of the interpolated pixel P is capable of being made such that less blurring of the edge may occur than in cases where, as illustrated in FIG. 37A or FIG. 37B, the pixel value of the interpolated pixel P is calculated by use of the pixel values of the pixels G2 and G3, which are located on opposite sides of the interpolated pixel P. Accordingly, the image S1, which has a size having been enlarged or reduced, is capable of being obtained such that the image S1 may be free from the blurring of the edge.

Further, with this embodiment of the image size enlarging and reducing apparatus in accordance with the present invention, in cases where it has been detected that an edge is located between the pixels in the image S0, the calculation of the pixel value of the interpolated pixel P is performed with respect to one direction in the image S0, and the image, which has a size having been enlarged or reduced with respect to the one direction in the image S0, is thereby obtained. Thereafter, the calculation of the pixel value of the interpolated pixel P is performed with respect to the other direction in the image S0, and the image, which has a size having been enlarged or reduced with respect to the other direction in the image S0, is thereby obtained. Therefore, the calculations of the pixel values of the interpolated pixels P, P, . . . are capable of being performed more quickly than in cases where the calculations of the pixel values of the interpolated pixels P, P, . . . are performed with one time of operation processing, which is carried out in two-dimensional directions.

In this embodiment of the image size enlarging and reducing apparatus in accordance with the present invention, the filtering processing with the difference filter is performed on the pixels G1, G2, G3, and G4, and the primary differences d1, d2, d3 and the secondary differences d4, d5 are thereby calculated. Also, in accordance with the relationship of positive and negative signs among the primary differences d1, d2, d3 and the secondary differences d4, d5, and in accordance with the result of the judgment having been made as to whether the absolute value of the difference d0 is or is not equal to at least the threshold value Th1, a judgment is made as to whether an edge is or is not located between the pixels G2 and G3. Alternatively, the judgment as to whether an edge is or is not located between the pixels G2 and G3 may be made in accordance with only the relationship of positive and negative signs among the primary differences d1, d2, d3 and the secondary differences d4, d5.

An image size enlarging and reducing apparatus, in which an embodiment of the image interpolation apparatus in accordance with the present invention is employed, will be described hereinbelow.

Figure 23:
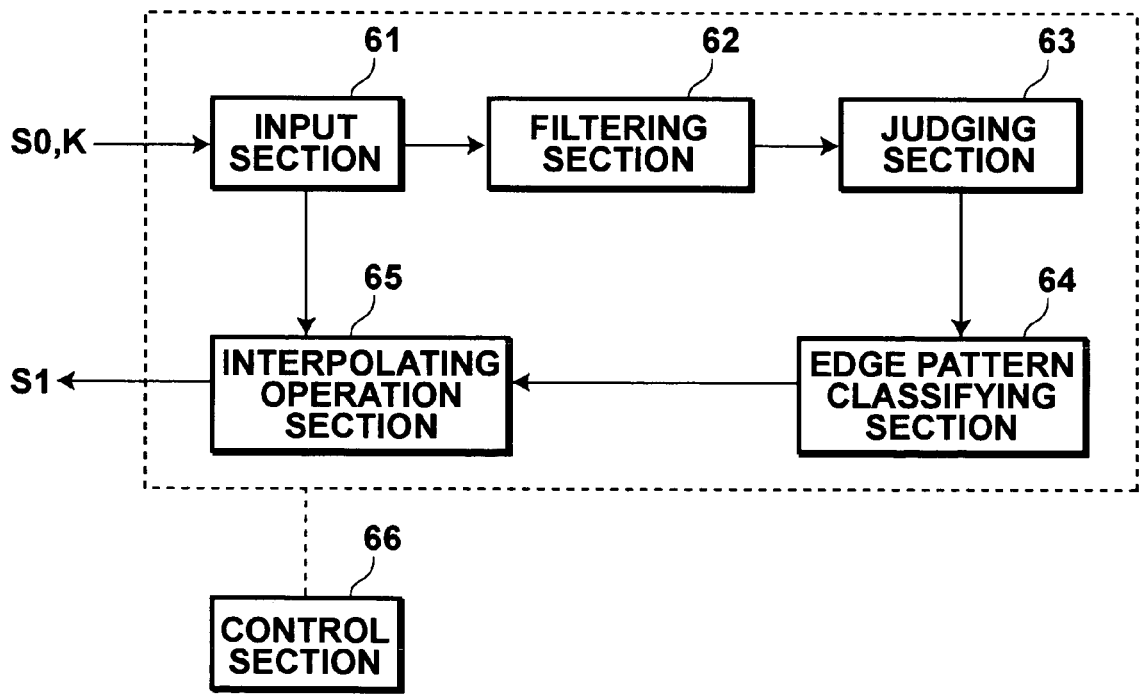
FIG. 23 is a block diagram showing an image size enlarging and reducing apparatus, in which an embodiment of the image interpolation apparatus in accordance with the present invention is employed.

FIG. 23 is a block diagram showing an image size enlarging and reducing apparatus, in which an embodiment of the image interpolation apparatus in accordance with the present invention is employed. As illustrated in FIG. 23, the image size enlarging and reducing apparatus, in which an embodiment of the image interpolation apparatus in accordance with the present invention is employed, comprises an input section 61 for accepting the inputs of the image signal S0 and the information representing the enlargement scale factor K for the image signal S0. The image size enlarging and reducing apparatus also comprises a filtering section 62 and a judging section 63. The image size enlarging and reducing apparatus further comprises an edge pattern classifying section 64. The image size enlarging and reducing apparatus still further comprises an interpolating operation section 65 for calculating the pixel value of the interpolated pixel P. The image size enlarging and reducing apparatus also comprises a control section 66 for controlling the operations of the input section

61, the filtering section 62, the judging section 63, the edge pattern classifying section 64, and the interpolating operation section 65.

With respect to an array of 16 pixels (=4×4 pixels) in the image S0, which pixels are located in the vicinity of a pixel to be interpolated for image size enlargement or reduction processing, the filtering section 62 sets six pixel lines, each of which passes through two pixels among four middle pixels (=2×2 middle pixels). (The pixel to be interpolated for the image size enlargement or reduction processing will hereinbelow be referred to as the interpolated pixel P.) FIG. 24 is an explanatory view showing pixel lines, each of which passes through two pixels among four middle pixels in an array of 16 pixels that are located in the vicinity of a pixel to be interpolated. As illustrated in FIG. 24, with respect to an array of 16 pixels P(i, j), where i=−1 to 2 and j=−1 to 2, which pixels are located in the vicinity of the interpolated pixel P, the filtering section 62 sets six pixel lines L1, L2, L3, L4, L5, and L6, each of which passes through two pixels among the four middle pixels P(0, 0), P(1, 0), P(1, 1), and P(0, 1) that are indicated by the black dots.

Specifically, the pixel line L1 is constituted of the pixels P(−1, 0), P(0, 0), P(1, 0), and P(2, 0) The pixel line L2 is constituted of the pixels P (1,−1), P(1, 0), P(1, 1), and P(1, 2). The pixel line L3 is constituted of the pixels P(−1, 1), P(0, 1), P(1, 1), and P(2, 1). The pixel line L4 is constituted of the pixels P(0, −1), P(0, 0), P(0, 1), and P(0, 2). The pixel line L5 is constituted of the pixels P(2, −1), P(1, 0), P(0, 1), and P(−1, 2). The pixel line L6 is constituted of the pixels P(−1, −1), P(0, 0), P(1, 1), and P(2, 2). Each of the pixel line L1 and the pixel line L3 is constituted of the four pixels, which stand side by side in the x direction. Each of the pixel line L2 and the pixel line L4 is constituted of the four pixels, which stand side by side in the y direction. The pixel line L5 is constituted of the four pixels, which stand side by side in the direction extending from the upper right point toward the lower left point. The pixel line L6 is constituted of the four pixels, which stand side by side in the direction extending from the upper left point toward the lower right point.

With respect to each of the pixel lines L1 to L6, the filtering section 62 performs the filtering processing with the difference filter and on each of three pixel pairs, each of the three pixel pairs being constituted of the two pixels, which are adjacent to each other. In this manner, three difference values are calculated. FIG. 25 is an explanatory view showing how the filtering processing is performed in the filtering section 62. The four pixels constituting each of the pixel lines L1 to L6 will hereinbelow be represented by P101, P102, P103, and P104. As illustrated in FIG. 25, with respect to the four pixels P101, P102, P103, and P104, which constitute each of the pixel lines L1 to L6, the filtering section 62 performs the filtering processing with the difference filter, which is illustrated in FIG. 3, and on each of the three pixel pairs, each of the three pixel pairs being constituted of the two pixels, which are adjacent to each other, i.e. on each of a pixel pair of P101 and P102, a pixel pair of P102 and P103, and a pixel pair of P103 and P104. The filtering section 62 thereby obtains a difference d11 between the pixel values of the pixel pair of P101 and P102. The filtering section 62 also obtains a difference d12 between the pixel values of the pixel pair of P102 and P103. The filtering section 62 further obtains a difference d13 between the pixel values of the pixel pair of P103 and P104.

With respect to each of the pixel lines L1 to L6, the judging section 63 makes a judgment (i.e., a fifth judgment) as to whether the absolute value |d12| of the difference d12 between the middle pixel pair of P102 and P103 is or is not equal to at least a predetermined threshold value Th22. In cases where it has been judged with the fifth judgment that the absolute value |d12| of the difference d12 between the middle pixel pair of P102 and P103 is equal to at least the predetermined threshold value Th22, the judging section 63 judges that an edge is located between the pixels P102 and P103. The judging section 63 also feeds the information, which represents the result of the judgment, into the edge pattern classifying section 64.

In cases where it has been judged with the fifth judgment that the absolute value |d12| of the difference d12 between the middle pixel pair of P102 and P103 is not equal to at least the predetermined threshold value Th22, with respect to each of the pixel lines L1 to L6, the judging section 63 makes a judgment (i.e., a sixth judgment) as to whether or not the absolute value |d12| of the difference d12 between the middle pixel pair of P102 and P103 is equal to at least a predetermined threshold value Th3, which is smaller than the threshold value Th2, and at the same time the absolute value |d12| of the difference d12 is the maximum value among the absolute values |d11| to |d13| of the differences d11 to d13. In cases where it has been judged with the sixth judgment that the absolute value |d12| of the difference d12 between the middle pixel pair of P102 and P103, is equal to at least the predetermined threshold value Th3, and at the same time the absolute value |d12| of the difference d12 is the maximum value among the absolute values |d11| to |d13| of the differences d11 to d13, the judging section 63 judges that an edge is located between the pixels P102 and P103. The judging section 63 also feeds the information, which represents the result of the judgment, into the edge pattern classifying section 64. In cases where it has been judged with the sixth judgment that the absolute value |d12| of the difference d12 between the middle pixel pair of P102 and P103 is not equal to at least the predetermined threshold value Th3, and that the absolute value |d12| of the difference d12 is not the maximum value among the absolute values |d11| to |d13| of the differences d11 to d13, the judging section 63 judges that an edge is not located between the pixels P102 and P103. The judging section 63 also feeds the information, which represents the result of the judgment, into the edge pattern classifying section 64.

Figures 26, 27:
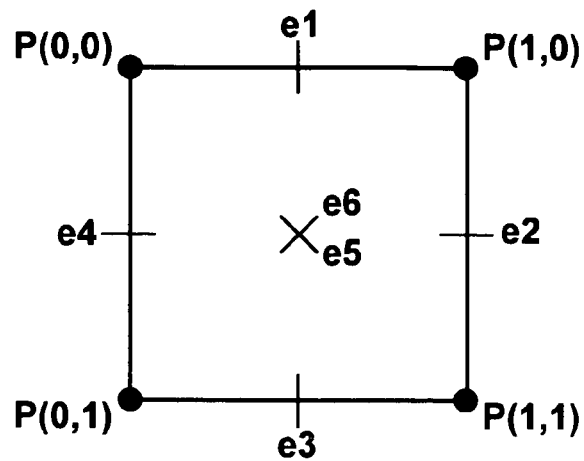
FIG. 26 is an explanatory view showing a location of an edge between pixels.
FIG. 27 is a table showing examples of edge patterns in accordance with locations of edges.

In accordance with the results of the judgments having been made by the judging section 63, the edge pattern classifying section 64 makes a judgment as to between which pixels among the pixels P(0, 0), P(1, 0), P(1, 1), and P(0, 1) an edge is located. Specifically, as illustrated in FIG. 26, the edge pattern classifying section 64 makes a judgment as to whether an edge is or is not located in an area e1 between the pixels P(0, 0) and P(1, 0), an area e2 between the pixels P(1, 0) and P(1, 1), an area e3 between the pixels P(1, 1) and P(0, 1), an area e4 between the pixels P(0, 1) and P(0, 0), an area e5 between the pixels P(1, 0) and P(0, 1), and an area e6 between the pixels P(0, 0) and P(1, 1).

In cases where it has been judged that an edge is located on the pixel line L1, the edge pattern classifying section 64 judges that the edge is located in the area e1. In cases where it has been judged that an edge is located on the pixel line L2, the edge pattern classifying section 64 judges that the edge is located in the area e2. In cases where it has been judged that an edge is located on the pixel line L3, the edge pattern classifying section 64 judges that the edge is located in the area e3. In cases where it has been judged that an edge is located on the pixel line L4, the edge pattern classifying section 64 judges that the edge is located in the area e4. In cases where it has been judged that an edge is located on the pixel line L5, the edge pattern classifying section 64 judges that the edge is located in the area e5. Also, in cases where it has been judged that an edge is located on the pixel line L6, the edge pattern classifying section 64 judges that the edge is located in the area e6.

Further, the edge pattern classifying section 64 classifies edge patterns in accordance with the straight line connecting the median points between the pixels, between which it has been judged that an edge is located. FIG. 27, FIG. 28, and FIG. 29 are tables showing various examples of edge patterns in accordance with locations of edges. As illustrated in FIG. 27, FIG. 28, and FIG. 29, the edge patterns are classified into nine kinds of edge patterns, i.e. a pattern 0 to a pattern 8.

In cases where it has been judged that an edge is located in the area e1, the area e2, the area e3, and the area e4, and in cases where it has been judged that an edge is located in the area e1, the area e2, the area e3, and the area e4, the area e5, and the area e6, it is not capable of being found directly whether the edge pattern is to be classified as the pattern 7 or the pattern 8. Therefore, in cases where it has been judged that an edge is located in the area e1, the area e2, the area e3, and the area e4, and in cases where it has been judged that an edge is located in the area e1, the area e2, the area e3, and the area e4, the area e5, and the area e6, the edge pattern classifying section 64 calculates the absolute value |d11| of the difference d11 between the pixel values of the pixel P(0, 0) and the pixel P(1, 1), and the absolute value |d12| of the difference d12 between the pixel values of the pixel P(0, 1) and the pixel P(1, 0). In cases where |d11|<|d12|, the edge pattern classifying section 64 classifies the edge pattern as the pattern 7. In cases where |d11|□|d12|, the edge pattern classifying section 64 classifies the edge pattern as the pattern 8.

Furthermore, the edge pattern classifying section 64 feeds the information, which represents the result of the classification of the edge pattern, into the interpolating operation section 65.

The interpolating operation section 65 makes reference to the information, which represents the result of the classification of the edge pattern having been performed by the edge pattern classifying section 64. Also, the interpolating operation section 65 performs different interpolating operations for the cases where it has been judged that an edge is located within the area surrounded by the four pixels, which are adjacent to the interpolated pixel P, and the cases where it has been judged that an edge is not located within the area surrounded by the four pixels, which are adjacent to the interpolated pixel P. The interpolating operation section 65 thus calculates the pixel value of the interpolated pixel P. Specifically, in cases where it has been judged that an edge is not located within the area surrounded by the four pixels, which are adjacent to the interpolated pixel P, the interpolating operation section 65 performs the bicubic technique and thus calculates the pixel value of the interpolated pixel P.

In cases where it has been judged that an edge is located within the area surrounded by the four pixels, which are adjacent to the interpolated pixel P, the interpolating operation section 65 calculates the pixel value of the interpolated pixel P in accordance with the edge pattern within the area surrounded by the four pixels, which are other than the aforesaid four pixels that are adjacent to the interpolated pixel P. Specifically, the interpolating operation section 65 detects the edge pattern within the region surrounded by the 16 pixels (=4×4 pixels), which are located in the vicinity of the interpolated pixel P, by making reference to the edge pattern within the area surrounded by the four pixels P(-1, -1), P(0, -1), P(0, 0), and P(-1, 0), the edge pattern within the area surrounded by the four pixels P(0, -1), P(1,-1), P(1, 0), and P(0, 0), the edge pattern within the area surrounded by the four pixels P(1,-1), P(2, -1), P(2, 0), and P(1, 0), the edge pattern within the area surrounded by the four pixels P(-1, 0), P(0, 0), P(0, 1), and P(-1, 1), the edge pattern within the area surrounded by the four pixels P(1, 0), P(2,0), P(2, 1), and P(1, 1), the edge pattern within the area surrounded by the four pixels P(-1, 1), P(0, 1), P(0, 2), and P(-1, 2), the edge pattern within the area surrounded by the four pixels P(0, 1), P(1, 1), P(1, 2), and P(0, 2), and the edge pattern within the area surrounded by the four pixels P(1, 1), P(2, 1), P(2, 2), and P(1, 2).

Figure 30:
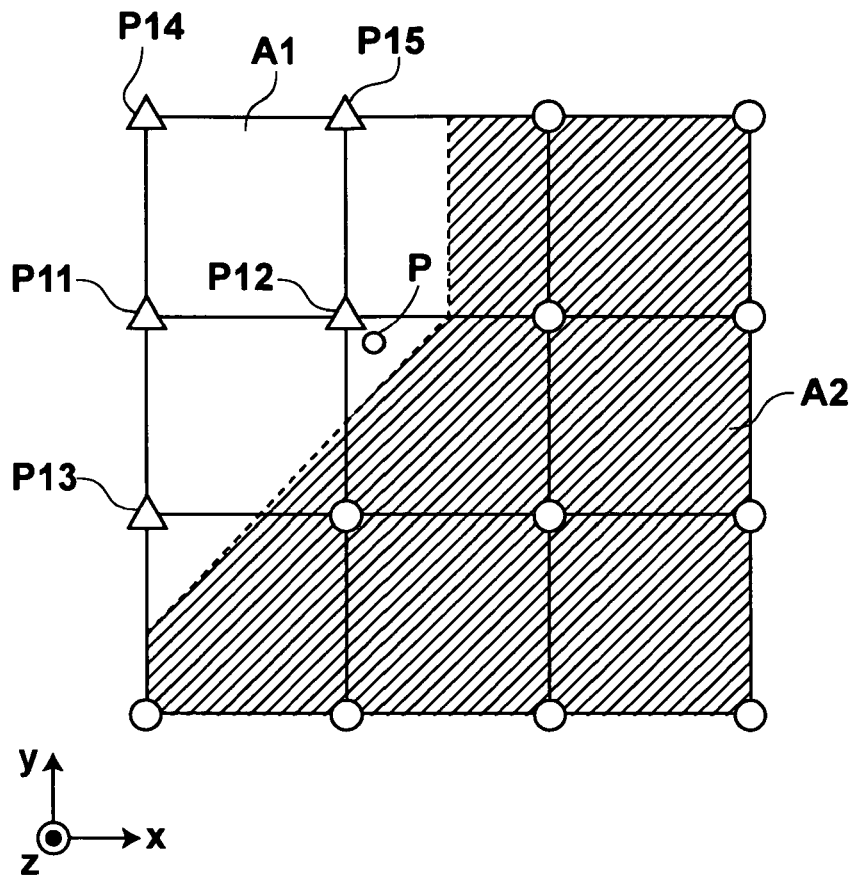
FIG. 30 is an explanatory view showing an example of an edge pattern in an array of 16 pixels.

The edge pattern within the region surrounded by the 16 pixels, which are located in the vicinity of the interpolated pixel P, takes the pattern indicated by the broken line in FIG. 30 in cases where the edge pattern within the area surrounded by the four pixels, which are adjacent to the interpolated pixel P, coincides with the pattern 4, the edge pattern within the area surrounded by the four pixels P(-1, -1), P(0, -1), P(0, 0), and P(-1, 0) coincides with the pattern 0, the edge pattern within the area surrounded by the four pixels P(0, -1), P(1,-1), P(1, 0), and P(0, 0) coincides with the pattern 5, the edge pattern within the area surrounded by the four pixels P(1,-1), P(2, -1), P(2, 0), and P(1, 0) coincides with the pattern 0, the edge pattern within the area surrounded by the four pixels P(-1, 0), P(0, 0), P(0, 1), and P(-1, 1) coincides with the pattern 2, the edge pattern within the area surrounded by the four pixels P(1, 0), P(2, 0), P(2, 1), and P(1, 1) coincides with the pattern 0, the edge pattern within the area surrounded by the four pixels P(-1, 1), P(0, 1), P(0, 2), and P(-1, 2) coincides with the pattern 4, the edge pattern within the area surrounded by the four pixels P(0, 1), P(1, 1), P(1, 2), and P(0, 2) coincides with the pattern 0, and the edge pattern within the area surrounded by the four pixels P(1, 1), P(2, 1), P(2, 2), and P(1, 2) coincides with the pattern 0. As illustrated in FIG. 30, the region surrounded by the 16 pixels is divided by the edge into two subregions A1 and A2. In FIG. 30, the subregion A2 is hatched.

The interpolating operation section 65 selects the pixels, which are to be utilized for the interpolating operation, in accordance with the edge pattern within the region surrounded by the 16 pixels and in accordance with whether the interpolated pixel P is located on one side of the edge or on the other side of the edge. For example, as illustrated in FIG. 30, in cases where the interpolated pixel P is located on the side of the subregion A1, the interpolating operation section 65 calculates the pixel value of the interpolated pixel P by use of only the pixels P11, P12, P13, P14, and P15 (indicated by "Δ" in FIG. 30), which are located on the side of the subregion A1. Also, in cases where the interpolated pixel P is located on the side of the subregion A2, the interpolating operation section 65 calculates the pixel value of the interpolated pixel P by use of only the pixels (indicated by "o" in FIG. 30), which are located on the side of the subregion A2.

Figure 31:
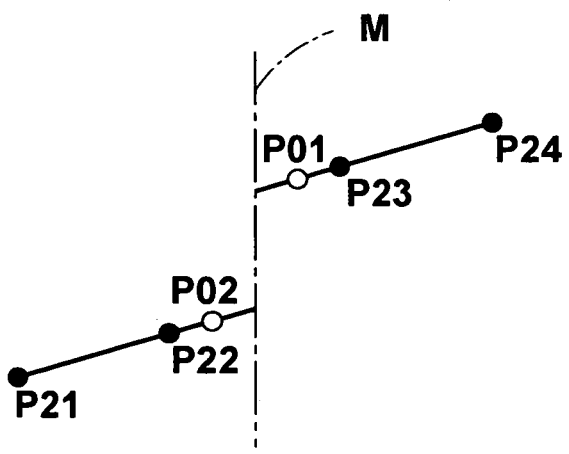
FIG. 31 is an explanatory view showing an example of how a pixel value of a pixel to be interpolated is calculated with a one-dimensional interpolating operation.

FIG. 31 shows a profile of the pixel values obtained in cases where an edge is located between the two middle pixels among the four pixels, which are arrayed in series. In FIG. 31, the horizontal direction represents the direction in which the pixels are arrayed, and the vertical direction represents the direction representing the levels of the pixel values of the pixels. As illustrated in FIG. 31, it is herein assumed that an edge has been judged as being located between two middle pixels P22 and P23 among four pixels P21, P22, P23, and P24, which are adjacent in series to one another.

In such cases, the median line M, which is indicated by the single-dot chained line and which bisects the distance between the pixels P22 and P23 in the pixel array direction, is set. In cases where the interpolated pixel P is located on the right side of the median line M (in this case, the interpolated pixel P is represented by P01), a value lying on the extension of the straight line, which connects the pixels P23 and P24, is taken as the pixel value of the interpolated pixel P01. Also, in cases where the interpolated pixel P is located on the left side of the median line M (in this case, the interpolated pixel P is represented by P02), a value lying on the extension of the straight line, which connects the pixels P21 and P22, is taken as the pixel value of the interpolated pixel P02.

Figure 32:
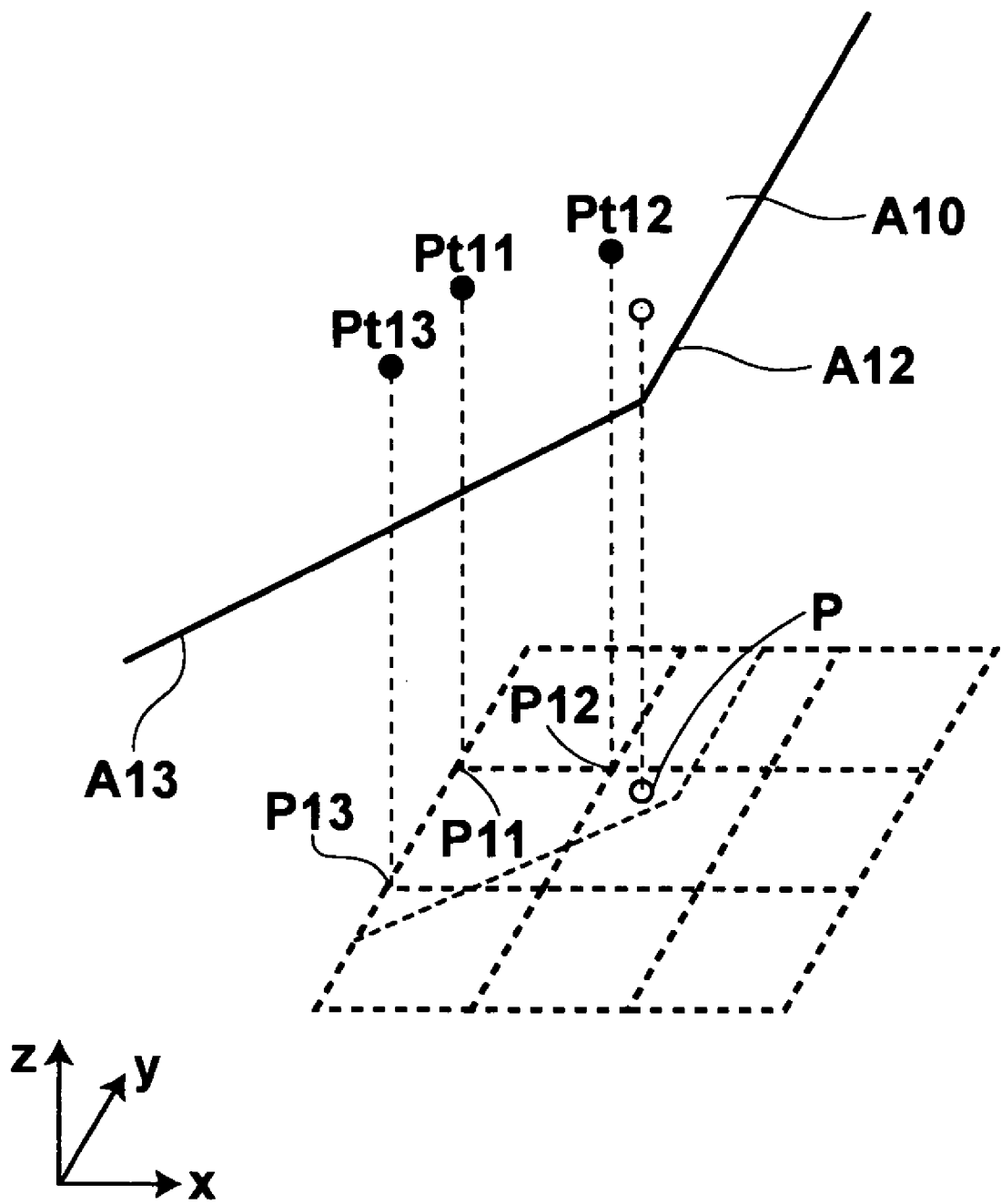
FIG. 32 is an explanatory view showing an example of how a pixel value of a pixel to be interpolated is calculated with a two-dimensional interpolating operation.

In the image size enlarging and reducing apparatus of FIG. 23, in which the embodiment of the image interpolation apparatus in accordance with the present invention is employed, the interpolating operation described above is applied to two-dimensional directions, and the pixel value of the interpolated pixel P is thus calculated, Specifically, as illustrated in FIG. 32, a pixel position is represented by the x coordinate and the y coordinate. Also, a pixel value is represented by the z coordinate. In the three-dimensional space having the x, y, and z coordinate axes, a plane A10, which passes through the z coordinates of the pixel values Pt11, Pt12, and Pt13 of the three pixels P11, P12, and P13 (shown in FIG. 30), respectively, which are located on the side of the subregion A1, is set. In the plane A10, a side A12 and a side A13 correspond to the position of the edge. Further, a value of the z coordinate, which corresponds to the x and y coordinates of the interpolated pixel P, in the plane A10 is taken as the pixel value of the interpolated pixel P.

The technique for calculating the pixel value of the interpolated pixel P is not limited to the technique described above. For example, an interpolating operation may be employed, wherein a comparatively large weight factor is given to a pixel, which is located at a position close to the interpolated pixel P, and a comparatively small weight factor is given to a pixel, which is located at a position remote from the interpolated pixel P. Specifically, a weight factor W11 for the pixel P11, a weight factor W12 for the pixel P12, a weight factor W13 for the pixel P13, a weight factor W14 for the pixel P14, and a weight factor W15 for the pixel P15 may be set such that the weight factor W12 for the pixel P12, which is located at the position closest to the interpolated pixel P, may be largest. Also, the operation processing with Formula (6) shown below may be performed on the pixel values Pt11, Pt12, Pt13, Pt14, and Pt15 of the pixels P11, P12, P13, P14, and P15, respectively. In this manner, the pixel value (herein represented by Pt) of the interpolated pixel P may be calculated.

$$Pt = \sum_{i=1}^{5} W1i \cdot Pt1i \qquad (6)$$

$$\text{where } \sum_{i=1}^{5} W1i = 1$$

The operation processing performed in cases where it has been judged that an edge is located between the two pixels will hereinbelow be referred to as the third interpolating operation. Also, the operation processing performed in cases where it has been judged that an edge is not located between the two pixels will hereinbelow be referred to as the fourth interpolating operation.

How the processing is performed in the image size enlarging and reducing apparatus of FIG. 23, in which the embodiment of the image interpolation apparatus in accordance with the present invention is employed, will be described hereinbelow.

Figure 33:
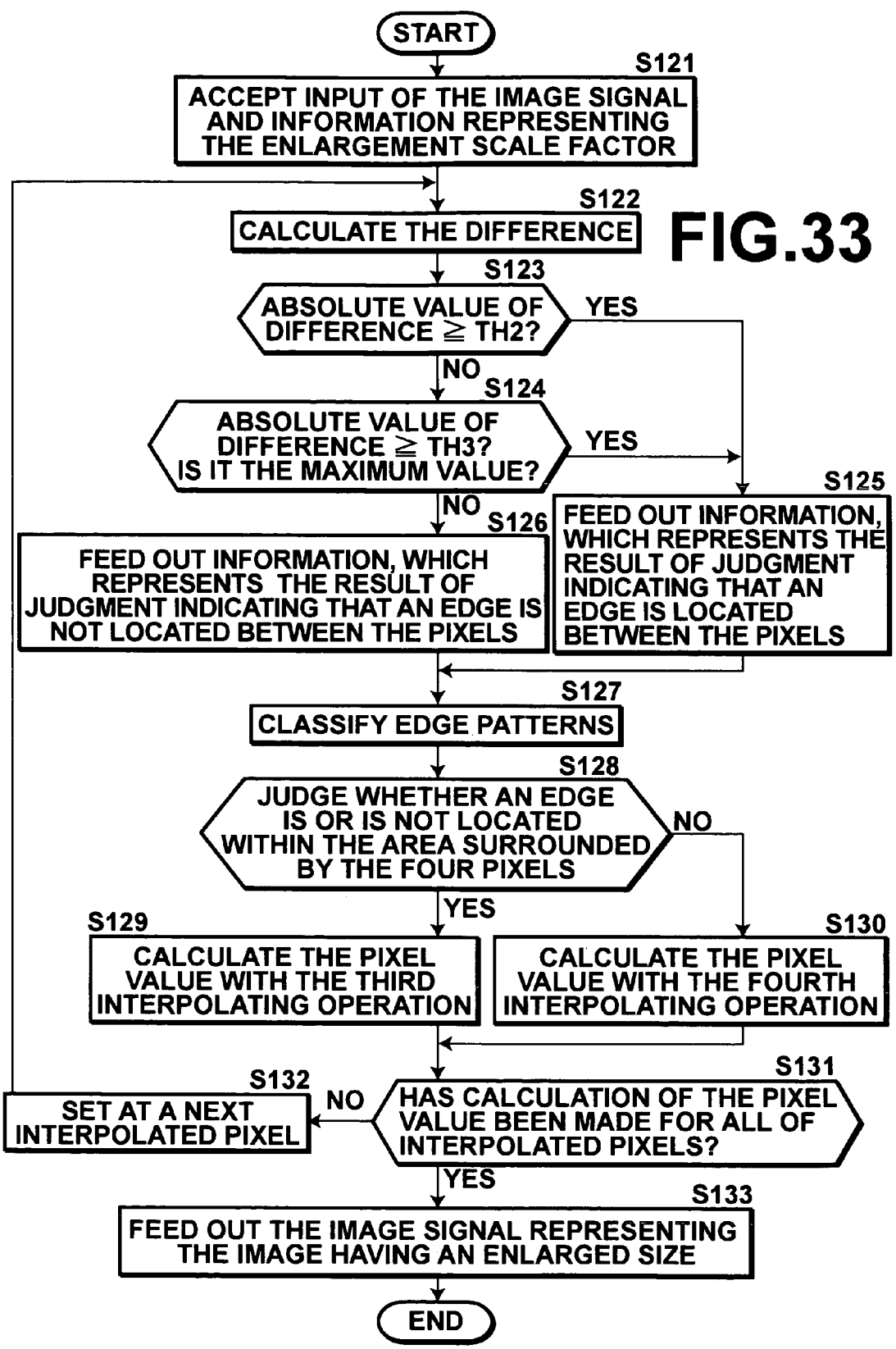
FIG. 33 is a flowchart showing how processing is performed in the image size enlarging and reducing apparatus of FIG. 23, in which the embodiment of the image interpolation apparatus in accordance with the present invention is employed.

FIG. 33 is a flow chart showing how processing is performed in the image size enlarging and reducing apparatus of FIG. 23, in which the embodiment of the image interpolation apparatus in accordance with the present invention is employed. In this embodiment, it is assumed that the interpolated pixel P is located between the pixels in the image S0. Firstly, in a step S121, the input section 61 accepts the image signal S0, which is to be subjected to the image size enlargement processing, and the information representing the enlargement scale factor K for the image signal S0. Also, in a step S122, with respect to a first interpolated pixel P in accordance with the enlargement scale factor K (for example, a pixel located in an upper left area of the image S1 represented by the image signal S1 obtained from the image size enlargement processing), the filtering section 62 sets the pixel lines L1 to L6 for the 16 pixels, which are located in the vicinity of the interpolated pixel P. Also, with respect to each of the pixel lines L1 to L6, the filtering section 62 performs the filtering processing with the difference filter and on each of the three pixel pairs, each of the three pixel pairs being constituted of the two pixels, which are adjacent to each other. The filtering section 62 thus calculates the three differences d11, d12, and d13 for each of the pixel lines L1 to L6.

Thereafter, in a step S123, with respect to each of the pixel lines L1 to L6, the judging section 63 makes the judgment (i.e., the fifth judgment) as to whether the absolute value |d12| of the difference d12 between the middle pixel pair of P102 and P103 is or is not equal to at least the predetermined threshold value Th22. In cases where it has been judged with the fifth judgment in the step S123 that the absolute value |d12| of the difference d12 between the middle pixel pair of P102 and P103 is not equal to at least the predetermined threshold value Th22, in a step S124, the judging section 63 makes the judgment (i.e., the sixth judgment) as to whether or not the absolute value |d12| of the difference d12 between the middle pixel pair of P102 and P103 is equal to at least the predetermined threshold value Th3, which is smaller than the threshold value Th2, and at the same time the absolute value |d12| of the difference d12 is the maximum value among the absolute values |d11| to |d13| of the differences d11 to d13.

In cases where it has been judged with the fifth judgment in the step S123 that the absolute value |d12| of the difference d12 between the middle pixel pair of P102 and P103 is equal to at least the predetermined threshold value Th2, and in cases where it has been judged with the sixth judgment in the step S124 that the absolute value |d12| of the difference d12 between the middle pixel pair of P102 and P103 is equal to at least the predetermined threshold value Th3, which is smaller than the threshold value Th2, and at the same time the absolute value |d12| of the difference d12 is the maximum value among the absolute values |d11| to |d13| of the differences d11 to d13, in a step S125, the judging section 63 judges that an edge is located between the two middle pixels P102 and P103 on each of the pixel lines L1 to L6. The judging section 63 also feeds the information, which represents the result of the judgment indicating that an edge is located between the pixels, into the edge pattern classifying section 64. In cases where it has been judged with the sixth judgment in the step S124 that the absolute value |d12| of the difference d12 between the middle pixel pair of P102 and P103 is not equal to at least the predetermined threshold value Th3, which is smaller than the threshold value Th2, and the absolute value |d12| of the difference d12 is not the maximum value among the absolute values |d11| to |d13| of the differences d11 to d13, in a step S126, the judging section 63 feeds the information, which represents the result of the judgment indicating that an edge is not located between the pixels, into the edge pattern classifying section 64.

In a step S127, the edge pattern classifying section 64 receives the information, which represents the results of the judgments having been made by the judging section 63, and classifies the edge patterns in accordance with the results of the judgments. Also, the edge pattern classifying section 64 feeds the information, which represents the result of the classification of the edge pattern, into the interpolating operation section 65.

In a step S128, in accordance with the result of the classification of the edge pattern having been performed by the edge pattern classifying section 64, the interpolating operation section 65 makes a judgment as to whether the edge pattern coincides or does not coincide with the pattern 0 shown in FIG. 27, and thus makes a judgment as to whether an edge is or is not located within the area surrounded by the four pixels, which are adjacent to the interpolated pixel P. In cases where it has been judged in the step S128 that an edge is located within the area surrounded by the four pixels, which are adjacent to the interpolated pixel P, in a step S129, the interpolating operation section 65 performs the third interpolating operation described above and thus calculates the pixel value of the interpolated pixel P. In cases where it has been judged in the step S128 that an edge is not located within the area surrounded by the four pixels, which are adjacent to the interpolated pixel P, in a step S130, the interpolating operation section 65 performs the fourth interpolating operation described above and thus calculates the pixel value of the interpolated pixel P.

Further, in a step S131, the control section 66 makes a judgment as to whether the calculation of the pixel value of the interpolated pixel P has been or has not been made with respect to all of interpolated pixels P, P, . . . In cases where it has been judged in the step S131 that the calculation of the pixel value of the interpolated pixel P has not been made with respect to all of interpolated pixels P, P, . . . , in a step S132, the interpolated pixel P to be subjected to the calculation of the pixel value is set at a next interpolated pixel P. Also, the processing reverts to the step S122.

In cases where it has been judged in the step S131 that the calculation of the pixel value of the interpolated pixel P has been made with respect to all of interpolated pixels P, P, . . . , in a step S133, the image signal S1, which represents the image S1 containing the interpolated pixels P, P, . . . and having an enlarged size, is fed out. At this stage, the processing is finished.

As described above, in the image size enlarging and reducing apparatus of FIG. 23, in which the embodiment of the image interpolation apparatus in accordance with the present invention is employed, in cases where it has been judged that an edge is located between the pixels located in the vicinity of the interpolated pixel P, the calculation of the pixel value of the interpolated pixel P is made by use of only the pixels located on one side of the edge or on the other side of the edge, on which side the interpolated pixel P is located. Therefore, the pixel value of the interpolated pixel P is not affected by the pixel values of the pixels that are located in the subregion on the side of the edge, which side is opposite to the side containing the interpolated pixel P. The pixel value of the interpolated pixel P thus reflects only the pixel values of the pixels that are located on the side of the edge, on which side the interpolated pixel P is located. Accordingly, with the image size enlarging and reducing apparatus of FIG. 23, in which the embodiment of the image interpolation apparatus in accordance with the present invention is employed, the calculation of the pixel value of the interpolated pixel P is capable of being made such that the blurring of the edge may be suppressed. Accordingly, the image S1, which has a size having been enlarged or reduced, is capable of being obtained such that the image S1 may be free from the blurring of the edge.

Also, in the image size enlarging and reducing apparatus of FIG. 23, in which the embodiment of the image interpolation apparatus in accordance with the present invention is employed, the pixel lines L1 to L6, each of which is constituted of the four pixels that are arrayed in series, are set with respect to the array of the 16 pixels (=4×4 pixels), which are located in the vicinity of the interpolated pixel P. Further, with respect to each of the pixel lines L1 to L6, the judgment is made as to whether an edge is located between the two middle pixels. In cases where it has been judged with the fifth judgment that the absolute value of the difference between the pixel values of the two middle pixels is equal to at least the threshold value Th2, it is regarded that an edge is located between the two middle pixels. Therefore, instead of a detection being made as to whether an edge is or is not located at a pixel in the image S0, the detection is capable of being made as to whether an edge is or is not located between the pixels in the image S0. Also, since it is sufficient for the differences to be calculated, the detection as to whether an edge is or is not located between the pixels in the image is capable of being made quickly with simple operation processing.

Further, in cases where it has been judged with the fifth judgment that an edge is not located between the two middle pixels, the judgment (i.e., the sixth judgment) is made as to whether or not the absolute value of the difference between the two middle pixels is equal to at least the predetermined threshold value Th3, which is smaller than the threshold value Th2, and at the same time the absolute value of the difference between the two middle pixels is the maximum value among the absolute values of the differences among the four pixels, which are arrayed in series. In cases where it has been judged with the sixth judgment that the absolute value of the difference between the two middle pixels is equal to at least the predetermined threshold value Th3, which is smaller than the threshold value Th2, and at the same time the absolute value of the difference between the two middle pixels is the maximum value among the absolute values of the differences among the four pixels, which are arrayed in series, it is regarded that an edge is located between the two middle pixels. Therefore, the problems are capable of being prevented from occurring in that a true edge is judged as being not an edge. Accordingly, an edge located between the pixels is capable of being detected accurately.

Furthermore, in the image size enlarging and reducing apparatus of FIG. 23, in which the embodiment of the image interpolation apparatus in accordance with the present invention is employed, in accordance with the results of the aforesaid judgments having been made as to whether an edge is or is not located between the two middle pixels among the four pixels, which are arrayed in series, the judgment is made as to whether an edge is or is not located within the area surrounded by the four pixels (=2×2 pixels), which are located in the vicinity of the interpolated pixel P. Therefore, an edge, which is located between the four pixels (=2×2 pixels) adjacent to one another in the image, is capable of being detected accurately.

Also, in the image size enlarging and reducing apparatus of FIG. 23, in which the embodiment of the image interpolation apparatus in accordance with the present invention is employed, in cases where it has been judged that an edge is located within the area surrounded by the four pixels (=2×2 pixels), which are located in the vicinity of the interpolated pixel P, the edge pattern within the area surrounded by the four pixels is classified in accordance with the position, at which an edge has been detected. Therefore, the pattern of the edge is capable of being classified accurately.

Figure 34:
FIG. 34 is a view showing a sample image.
Figure 35:
FIG. 35 is a view showing a result of detection of edges with a Laplacian filter.
Figure 36:
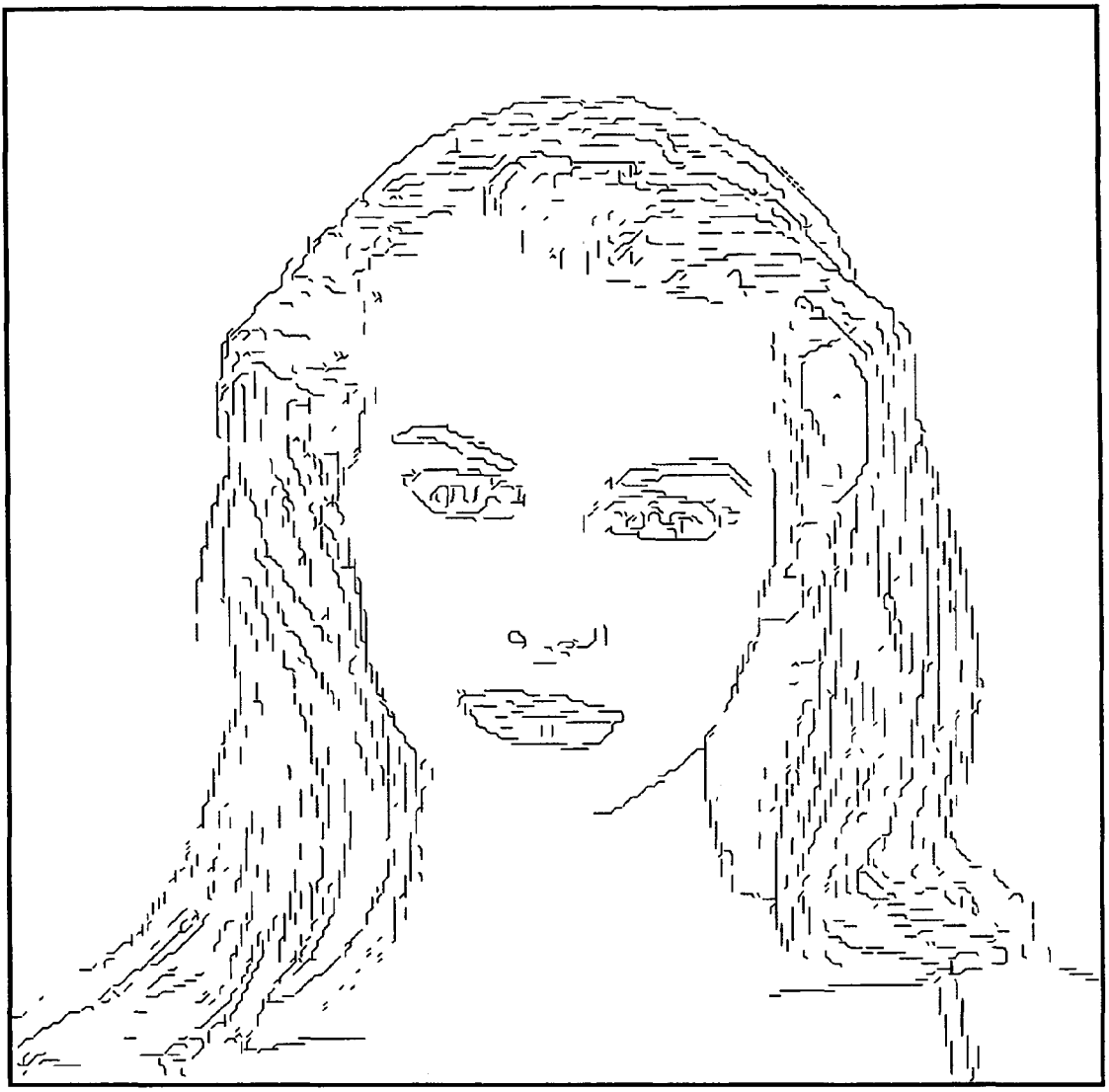
FIG. 36 is a view showing a result of detection of edges with the technique in accordance with the present invention.

FIG. 34 is a view showing a sample image. FIG. 35 is a view showing a result of detection of edges with a Laplacian filter. FIG. 36 is a view showing a result of detection of edges with the technique in accordance with the present invention. With the Laplacian filter, a judgment is made as to whether a pixel of interest constitutes or does not constitute en edge. Therefore, as for the sample image illustrated in FIG. 34, in cases where the edge detection is performed by use of the conventional Laplacian filter, as illustrated in FIG. 35, edges representing a face contour are capable of being detected, but the detected lines become markedly thick. However, in cases where the edge detection is performed with the image size enlarging and reducing apparatus of FIG. 23, in which the embodiment of the image interpolation apparatus in accordance with the present invention is employed, it is possible to detect what edge extending in what orientation is located between the pixels. Therefore, as illustrated in FIG. 36, edges are capable of being represented by the markedly thin lines. Accordingly, the edges and non-edge areas are capable of being discriminated clearly, and the calculation of the pixel value of the interpolated pixel P is capable of being made such that the blurring does not occur in the image S1 obtained from the image size enlargement or reduction processing.

In the image size enlarging and reducing apparatus of FIG. 23, in which the embodiment of the image interpolation apparatus in accordance with the present invention is employed, at the time of the judgment as to whether an edge is located between the two middle pixels on each of the pixel lines L1 to L6, in cases where it has been judged with the fifth judgment that an edge is not located between the two middle pixels, the sixth judgment is further made in order to judge whether an edge is present or absent. Alternatively, in cases where it has been judged with the fifth judgment that an edge is not located between the two middle pixels, instead of the sixth judgment being made, it may be judged that an edge is not located between the two middle pixels. As another alternative, the absolute values of the three differences calculated with respect to the four pixels, which are arrayed in series on each of the pixel lines L1 to L6, may be compared with one another, and it may be judged that an edge is located between the two middle pixels in cases where the absolute value of the difference between the two middle pixels is the maximum value among the absolute values of the three differences.

Also, in the image size enlarging and reducing apparatus of FIG. 23, in which the embodiment of the image interpolation apparatus in accordance with the present invention is employed, in cases where it has been judged that an edge is not located within the area surrounded by the four pixels, the pixel value of the interpolated pixel P is calculated with the bicubic technique and from the pixel values of the 16 pixels located in the vicinity of the interpolated pixel P. Alternatively, in such cases, the pixel value of the interpolated pixel P may be calculated from the pixel values of the nine pixels or the four pixels, which are located in the vicinity of the interpolated pixel P. Further, in lieu of the bicubic technique, the linear interpolation technique, the nearest neighbor interpolation technique, the bilinear technique, or the like, may be employed in order to calculate the pixel value of the interpolated pixel P.

Further, in the image size enlarging and reducing apparatus of FIG. 23, in which the embodiment of the image interpolation apparatus in accordance with the present invention is employed, the judgment as to whether an edge is located between the two pixels, which are adjacent to each other among the four pixels located in the vicinity of the interpolated pixel P, and the classification of the edge pattern within the area surrounded by the four pixels, which are located in the vicinity of the interpolated pixel P, are performed by the utilization of the 16 pixels (=4×4 pixels), which are located in the vicinity of the interpolated pixel P. Alternatively, the judgment as to whether an edge is located between the two pixels and the classification of the edge pattern may be performed by the utilization of 36 pixels (=6×6 pixels) or a larger number of pixels, which are arrayed such that the number of pixels on one side is an even number.

In the image size enlarging and reducing apparatus of FIG. 1, in which the first embodiment of the edge detecting apparatus in accordance with the present invention is employed, the image size enlarging and reducing apparatus of FIG. 7, in which the second embodiment of the edge detecting apparatus in accordance with the present invention is employed, the image size enlarging and reducing apparatus of FIG. 13, in which the third embodiment of the edge detecting apparatus in accordance with the present invention is employed, and the embodiment of the image size enlarging and reducing apparatus in accordance with the present invention, which is shown in FIG. 20, in cases where it has been judged that an edge is not located, the pixel value of the interpolated pixel P is calculated with the bicubic technique and from the pixel values of the 16 pixels (the four pixels in the one-dimensional direction) located in the vicinity of the interpolated pixel P. Alternatively, in such cases, the pixel value of the interpolated pixel P may be calculated from the pixel values of the nine pixels (the three pixels in the one-dimensional direction) or the four pixels (the two pixels in the one-dimensional direction), which are located in the vicinity of the interpolated pixel P. Further, in lieu of the pixel value of the interpolated pixel P being calculated with the one-dimensional interpolating operation performed in the x direction or the y direction, the pixel value of the interpolated pixel P may be calculated with the two-dimensional interpolating operation. Furthermore, in lieu of the bicubic technique, the linear interpolation technique, the nearest neighbor interpolation technique, the bilinear technique, or the like, may be employed in order to calculate the pixel value of the interpolated pixel P.

What is claimed is:

1. An edge detecting apparatus, comprising:
   filtering means for:
     performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs; and
     performing filtering processing with a difference filter and on each of two primary difference pairs, each of the two primary difference pairs being constituted of two primary differences, which are adjacent to each other and are contained in the three primary differences, and thereby obtaining a secondary difference between the two primary differences, which are adjacent to each other and constitute each of the two primary difference pairs, two secondary differences being obtained for the two primary difference pairs;
   detection means for detecting as to whether an edge is located between two middle pixels, which are among the four pixels that are adjacent in series to one another in the image, the detection being made in accordance with a relationship of positive and negative signs among the three primary differences and the two secondary differences; and profile judging means for making a judgment as to a shape of a profile of pixel values in a region in a vicinity of the four pixels that are adjacent in series to one another in the image, the judgment as to the shape of the profile of pixel values being made in accordance with the relationship of the positive and the negative signs among the three primary differences and the two secondary differences.

2. An edge detecting apparatus, comprising:

first filtering means for:
  performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs; and
  performing filtering processing with a difference filter and on each of two primary difference pairs, each of the two primary difference pairs being constituted of two primary differences, which are adjacent to each other and are contained in the three primary differences, and thereby obtaining a secondary difference between the two primary differences, which are adjacent to each other and constitute each of the two primary difference pairs, two secondary differences being obtained for the two primary difference pairs, second filtering means for performing filtering processing with a difference filter and on two middle pixels, which are among the four pixels that are adjacent in series to one another in the image, and thereby obtaining a difference between pixel values of the two middle pixels, which are among the four pixels that are adjacent in series to one another in the image;

detection means for detecting as to whether an edge is located between the two middle pixels, which are among the four pixels that are adjacent in series to one another in the image, the detection being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value; and profile judging means for making a judgment as to a shape of a profile of pixel values in a region in a vicinity of the four pixels that are adjacent in series to one another in the image, the judgment as to the shape of the profile of pixel values being made in accordance with the relationship of the positive and the negative signs among the three primary differences and the two secondary differences.

3. A profile judging apparatus, comprising:

filtering means for:
  performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs; and
  performing filtering processing with a difference filter and on each of two primary difference pairs, each of the two primary difference pairs being constituted of two primary differences, which are adjacent to each other and are contained in the three primary differences, and thereby obtaining a secondary difference between the two primary differences, which are adjacent to each other and constitute each of the two primary difference pairs, two secondary differences being obtained for the two primary difference pairs; and judgment means for making a judgment as to a shape of a profile of pixel values in a region in a vicinity of the four pixels that are adjacent in series to one another in the image, the judgment being made in accordance with a relationship of positive and negative signs among the three primary differences and the two secondary differences.

4. A profile judging apparatus, comprising:

first filtering means for:
  performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs; and
  performing filtering processing with a difference filter and on each of two primary difference pairs, each of the two primary difference pairs being constituted of two primary differences, which are adjacent to each other and are contained in the three primary differences, and thereby obtaining a secondary difference between the two primary differences, which are adjacent to each other and constitute each of the two primary difference pairs, two secondary differences being obtained for the two primary difference pairs;

second filtering means for performing filtering processing with a difference filter and on two middle pixels, which are among the four pixels that are adjacent in series to one another in the image, and thereby obtaining a difference between pixel values of the two middle pixels, which are among the four pixels that are adjacent in series to one another in the image; and profile judging means for making a judgment as to a shape of a profile of pixel values in a region in a vicinity of the four pixels that are adjacent in series to one another in the image, the judgment being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

5. An edge detecting method, comprising:

performing filtering processing with a difference filter and on each of three pixel pairs, as executed by a processing unit on a computer, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

detecting as to whether an edge is located between two middle pixels, which are among the four pixels that are adjacent in series to one another in the image, the detection being made in accordance with a relationship of positive and negative signs among the three primary differences and the two secondary differences; and making a judgment as to a shape of a profile of pixel values in a region in a vicinity of the four pixels that are adjacent in series to one another in the image, the judgment being made in accordance with the relationship of the positive and negative signs among the three primary differences and the two secondary differences.

6. An edge detecting method, comprising:

performing filtering processing with a difference filter and on each of three pixel pairs, as executed by a processing unit on a computer, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing;

detecting as to whether an edge is located between the two middle pixels, which are among the four pixels that are adjacent in series to one another in the image, the detection being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value; and making a judgment as to a shape of a profile of pixel values in a region in a vicinity of the four pixels that are adjacent in series to one another in the image, the judgment as to the shape of the profile of pixel values being made in accordance with the relationship of the positive and negative signs among the three primary differences and the two secondary differences.

7. A profile judging method, comprising:

performing filtering processing with a difference filter and on each of three pixel pairs, as executed by a processing unit on a computer, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs; and making a judgment as to a shape of a profile of pixel values in a region in a vicinity of the four pixels that are adjacent in series to one another in the image, the judgment being made in accordance with a relationship of positive and negative signs among the three primary differences and the two secondary differences.

8. A profile judging method, comprising:

performing filtering processing with a difference filter and on each of three pixel pairs, as executed by a processing unit on a computer, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing; and making a judgment as to a shape of a profile of pixel values in a region in a vicinity of the four pixels that are adjacent in series to one another in the image, the judgment being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

9. A tangible computer readable storage medium storing a computer program for causing a computer to execute an edge detecting method, the computer readable storage medium storing computer program comprising the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

detecting as to whether an edge is located between two middle pixels, which are among the four pixels that are adjacent in series to one another in the image, the detection being made in accordance with a relationship of positive and negative signs among the three primary differences and the two secondary differences; and making a judgment as to a shape of a profile of pixel values in a region in a vicinity of the four pixels that are adjacent in series to one another in the image, the judgment as to the shape of the profile of pixel values being made in accordance with the relationship of the positive and negative signs among the three primary differences and the two secondary differences.

10. A tangible computer readable storage medium storing a computer program for causing a computer to execute an edge detecting method, the computer readable storage medium storing computer program comprising the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing;

detecting as to whether an edge is located between the two middle pixels, which are among the four pixels that are adjacent in series to one another in the image, the detection being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value; and making a judgment as to a shape of a profile of pixel values in a region vicinity of the four pixels that are adjacent in series one another in the image, the judgment as to the shape of the profile of pixel values being made in accordance with the relationship of the positive and the negative signs among the three primary differences and the two secondary differences.

11. A tangible computer readable storage medium storing a computer program for causing a computer to execute a profile judging method, the computer readable storage medium storing computer program comprising the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs; and making a judgment as to a shape of a profile of pixel values in a region in a vicinity of the four pixels that are adjacent in series to one another in the image, the judgment being made in accordance with the relationship of the positive and negative signs among the three primary differences and the two secondary differences.

12. A tangible computer readable storage medium storing a computer program for causing a computer to execute a profile judging method, the computer readable storage medium storing computer program comprising the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing; and making a judgment as to a shape of a profile of pixel values in a region in a vicinity of the four pixels that are adjacent in series to one another in the image, the judgment being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

13. An image size enlarging and reducing apparatus, comprising:

filtering means for:

performing filtering processing with a difference filter and on each of three pixel pairs, each of the three pixel pairs being constituted of two pixels, which are adjacent to each other and are contained in four pixels that are adjacent in series to one another in an image, and thereby obtaining a primary difference between pixel values of the two pixels, which are adjacent to each other and constitute each of the three pixel pairs, three primary differences being obtained for the three pixel pairs; and performing filtering processing with a difference filter and on each of two primary difference pairs, each of the two primary difference pairs being constituted of two primary differences, which are adjacent to each other and are contained in the three primary differences, and thereby obtaining a secondary difference between the two primary differences, which are adjacent to each other and constitute each of the two primary difference pairs, two secondary differences being obtained for the two primary difference pairs;

detection means for detecting as to whether an edge is located between two middle pixels, which are among the four pixels that are adjacent in series to one another in the image, the detection being made in accordance with a relationship of positive and negative signs among the three primary differences and the two secondary differences;

boundary setting means for setting a predetermined boundary between the two middle pixels, which are among the four pixels that are adjacent in series to one another in the image, in cases where it is detected that an edge is located between the two middle pixels;

judgment means for making a judgment as to whether a position of a new pixel to be interpolated between the two middle pixels, which are among the four pixels that are adjacent in series to one another in the image, is located on one side of the predetermined boundary or is located on other side of the predetermined boundary;

interpolating operation means for operating such that:

in cases where it is judged that the position of the new pixel is located on the one side of the predetermined boundary, the interpolating operation means performs an interpolating operation by use of the pixel value of pixels which are only located on the one side of the predetermined boundary in the image, in order to calculate a pixel value of the new pixel;

in cases where it is judged that the position of the new pixel is located on the other side of the predetermined boundary, the interpolating operation means performs an interpolating operation by use of the pixel value of pixels which are only located on the other side of the predetermined boundary in the image, in order to calculate a pixel value of the new pixel; and in cases where it is detected that an edge is not located between the two middle pixels, which are among the four pixels that are adjacent in series to one another in the image, the interpolating operation means performs a predetermined interpolating operation in order to calculate a pixel value of the new pixel;

control means for controlling the filtering means, the detection means, the boundary setting means, the judgment means, and the interpolating operation means such that:

the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are performed with respect to one direction in the image, an image, which has a size having been enlarged or reduced with respect to the one direction in the image, being thereby obtained; and the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are thereafter performed with respect to the other direction in the image, an image, which has a size having been enlarged or reduced with respect to the other direction in the image, being thereby obtained, whereby the image, which has a size having been enlarged or reduced with respect to the one direction and the other direction in the image, is obtained; and profile judging means for making a judgment as to a shape of a profile of pixel values in a region in a vicinity of the four pixels that are adjacent in series to one another in the image, the judgment as to the shape of the profile of pixel values being made in accordance with the relationship of the positive and the negative signs among the three primary differences and the two secondary differences.

14. An image size enlarging and reducing apparatus as defined in claim 13, wherein the filtering means further performs filtering processing with a difference filter and on two middle pixels, which are among the four pixels that are adjacent in series to one another in the image, and thereby obtains a difference between pixel values of the two middle pixels, which are among the four pixels that are adjacent in series to one another in the image, and wherein the detection means makes the detection as to whether an edge is located between the two middle pixels, which are among the four pixels that are adjacent in series to one another in the image, the detection being made in accordance with the relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

15. An image size enlarging and reducing method, comprising:

performing filtering processing with a difference filter and on each of three pixel pairs, as executed by a processing unit on a computer, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

detecting as to whether an edge is located between two middle pixels, which are among the four pixels that are adjacent in series to one another in the image, the detection being made in accordance with a relationship of positive and negative signs among the three primary differences and the two secondary differences;

setting a predetermined boundary between the two middle pixels, which are among the four pixels that are adjacent in series to one another in the image, in cases where it is detected that an edge is located between the two middle pixels;

making a judgment as to whether a position of a new pixel to be interpolated between the two middle pixels, which are among the four pixels that are adjacent in series to one another in the image, is located on one side of the predetermined boundary or is located on the other side of the predetermined boundary;

performing operation processing such that:

in cases where it is judged that the position of the new pixel is located on the one side of the predetermined boundary, an interpolating operation is performed by use of the pixel value of at least one pixel, which is located on the one side of the predetermined boundary in the image, a pixel value of the new pixel being thereby calculated;

in cases where it is judged that the position of the new pixel is located on the other side of the predetermined boundary, an interpolating operation is performed by use of the pixel value of at least one pixel, which is located on the other side of the predetermined boundary in the image, a pixel value of the new pixel being thereby calculated; and in cases where it is detected that an edge is not located between the two middle pixels, which are among the four pixels that are adjacent in series to one another in the image, a predetermined interpolating operation is performed, a pixel value of the new pixel being thereby calculated;

making control such that:

the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are performed with respect to one direction in the image, an image, which has a size having been enlarged or reduced with respect to the one direction in the image, being thereby obtained; and the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are thereafter performed with respect to the other direction in the image, an image, which has a size having been enlarged or reduced with respect to the other direction in the image, being thereby obtained, whereby the image, which has a size having been enlarged or reduced with respect to the one direction and the other direction in the image, is obtained; and making a judgment as to a shape of a profile of pixel values in a region in a vicinity of the four pixels that are adjacent in series to one another in the image, the judgment as to the shape of the profile of pixel values being made in accordance with the relationship of the positive and negative signs among the three primary differences and the two secondary differences.

16. An image size enlarging and reducing method as defined in claim 15, wherein the method further comprises:

performing filtering processing with a difference filter and on two middle pixels, as executed by a processing unit on a computer, which are among the four pixels that are adjacent in series to one another in the image, a difference between pixel values of the two middle pixels, which are among the four pixels that are adjacent in series to one another in the image, being obtained from the filtering processing; and the detection as to whether an edge is located between the two middle pixels, which are among the four pixels that are adjacent in series to one another in the image, is made in accordance with the relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

17. A tangible computer readable storage medium storing a computer program for causing a computer to execute an image size enlarging and reducing method, the computer readable storage medium storing computer program comprising the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

detecting as to whether an edge is located between two middle pixels, which are among the four pixels that are adjacent in series to one another in the image, the detection being made in accordance with a relationship of positive and negative signs among the three primary differences and the two secondary differences;

setting a predetermined boundary between the two middle pixels, which are among the four pixels that are adjacent in series to one another in the image, in cases where it is detected that an edge is located between the two middle pixels;

making a judgment as to whether a position of a new pixel to be interpolated between the two middle pixels, which are among the four pixels that are adjacent in series to one another in the image, is located on one side of the predetermined boundary or is located on the other side of the predetermined boundary;

performing operation processing such that:

in cases where it is judged that the position of the new pixel is located on the one side of the predetermined boundary, an interpolating operation is performed by use of the pixel value of at least one pixel, which is located on the one side of the predetermined boundary in the image, a pixel value of the new pixel being thereby calculated;

in cases where it is judged that the position of the new pixel is located on the other side of the predetermined boundary, an interpolating operation is performed by use of the pixel value of at least one pixel, which is located on the other side of the predetermined boundary in the image, a pixel value of the new pixel being thereby calculated; and in cases where it is detected that an edge is not located between the two middle pixels, which are among the four pixels that are adjacent in series to one another in the image, a predetermined interpolating operation is performed, a pixel value of the new pixel being thereby calculated; and making control such that:

the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are performed with respect to one direction in the image, an image, which has a size having been enlarged or reduced with respect to the one direction in the image, being thereby obtained; and the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are thereafter performed with respect to the other direction in the image, an image, which has a size having been enlarged or reduced with respect to the other direction in the image, being thereby obtained,
 whereby the image, which has a size having been enlarged or reduced with respect to the one direction and the other direction in the image, is obtained; and making a judgment as to a shape of a profile of pixel values in a region in a vicinity of the four pixels that are adjacent in series to one another in the image, the judgment as to the shape of the profile of pixel values being made in accordance with the relationship of the positive and negative signs among the three primary differences and the two secondary differences.

18. A computer program as defined in claim 17, wherein the tangible computer readable storage medium storing computer program further comprises the procedure for:

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing; and the procedure for detecting as to whether an edge is between the two middle pixels, which are among the four pixels that are adjacent in series to one another in the image, is a procedure for making the detection in accordance with the relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

19. A tangible computer readable recording medium, on which a machine readable storage medium tangibly encoded with medium-readable instructions for a computer program for causing a computer to execute an edge detecting method is recorded and from which the computer is capable of reading the machine readable storage medium tangibly encoded with medium-readable instructions for the computer program, wherein the machine readable storage medium tangibly encoded with medium-readable instructions for the computer program comprises the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

detecting as to whether an edge is located between two middle pixels, which are among the four pixels that are adjacent in series to one another in the image, the detection being made in accordance with a relationship of positive and negative signs among the three primary differences and the two secondary differences; and making a judgment as to a shape of a profile of pixel values in a region in a vicinity of the four pixels that are adjacent in series to one another in the image, the judgment being made in accordance with the relationship of the positive and the negative signs among the three primary differences and the two secondary differences.

20. A tangible computer readable recording medium, on which a machine readable storage medium tangibly encoded with medium-readable instructions for a computer program for causing a computer to execute an edge detecting method is recorded and from which the computer is capable of reading the machine readable storage medium tangibly encoded with medium-readable instructions for the computer program, wherein the machine readable storage medium tangibly encoded with medium-readable instructions for the computer program comprises the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing;

detecting as to whether an edge is located between the two middle pixels, which are among the four pixels that are adjacent in series to one another in the image, the detection being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value; and making a judgment as to a shape of a profile of pixel values in a region in a vicinity of the four pixels that are adjacent in series to one another in the image, judgment as to the shape of the profile of pixel values being made in accordance with the relationship of the positive and the negative signs among the three primary differences and the two secondary differences.

21. A tangible computer readable recording medium, on which a machine readable storage medium tangibly encoded with medium-readable instructions for a computer program for causing a computer to execute a profile judging method is recorded and from which the computer is capable of reading the machine readable storage medium tangibly encoded with medium-readable instructions for the computer program, wherein the machine readable storage medium tangibly encoded with medium-readable instructions for the computer program comprises the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs; and making a judgment as to a shape of a profile of pixel values in a region in a vicinity of the four pixels that are adjacent in series to one another in the image, the judgment being made in accordance with a relationship of positive and negative signs among the three primary differences and the two secondary differences.

22. A tangible computer readable recording medium, on which a machine readable storage medium tangibly encoded with medium-readable instructions for a computer program for causing a computer to execute a profile judging method is recorded and from which the computer is capable of reading the machine readable storage medium tangibly encoded with medium-readable instructions for the computer program, wherein the machine readable storage medium tangibly encoded with medium-readable instructions for the computer program comprises the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing; and making a judgment as to a shape of a profile of pixel values in a region in a vicinity of the four pixels that are adjacent in series to one another in the image, the judgment being made in accordance with a relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

23. A tangible computer readable recording medium, on which a machine readable storage medium tangibly encoded with medium-readable instructions for a computer program for causing a computer to execute an image size enlarging and reducing method is recorded and from which the computer is capable of reading the machine readable storage medium tangibly encoded with medium-readable instructions for the computer program, wherein the machine readable storage medium tangibly encoded with medium-readable instructions for the computer program comprises the procedures for:

performing filtering processing with a difference filter and on each of three pixel pairs, each of the three pixel pairs being constituted of two pixels, which are adjacent to each other and are contained in four pixels that are adjacent in series to one another in an image, a primary difference between pixel values of the two pixels, which are adjacent to each other and constitute each of the three pixel pairs, being obtained from the filtering processing, three primary differences being obtained for the three pixel pairs;

performing filtering processing with a difference filter and on each of two primary difference pairs, each of the two primary difference pairs being constituted of two primary differences, which are adjacent to each other and are contained in the three primary differences, a secondary difference between the two primary differences, which are adjacent to each other and constitute each of the two primary difference pairs, being obtained from the filtering processing, two secondary differences being obtained for the two primary difference pairs;

detecting as to whether an edge is located between two middle pixels, which are among the four pixels that are adjacent in series to one another in the image, the detection being made in accordance with a relationship of positive and negative signs among the three primary differences and the two secondary differences;

setting a predetermined boundary between the two middle pixels, which are among the four pixels that are adjacent in series to one another in the image, in cases where it is detected that an edge is located between the two middle pixels, making a judgment as to whether a position of a new pixel to be interpolated between the two middle pixels, which are among the four pixels that are adjacent in series to one another in the image, is located on one side of the predetermined boundary or is located on the other side of the predetermined boundary;

performing operation processing such that:
- in cases where it is judged that the position of the new pixel is located on the one side of the predetermined boundary, an interpolating operation is performed by use of the pixel value of at least one pixel, which is located on the one side of the predetermined boundary in the image, a pixel value of the new pixel being thereby calculated;
- in cases where it is judged that the position of the new pixel is located on the other side of the predetermined boundary, an interpolating operation is performed by use of the pixel value of at least one pixel, which is located on the other side of the predetermined boundary in the image, a pixel value of the new pixel being thereby calculated; and
- in cases where it is detected that an edge is not located between the two middle pixels, which are among the four pixels that are adjacent in series to one another in the image, a predetermined interpolating operation is performed, a pixel value of the new pixel being thereby calculated;

making control such that:
- the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are performed with respect to one direction in the image, an image, which has a size having been enlarged or reduced with respect to the one direction in the image, being thereby obtained; and
- the filtering processing, the detection as to whether an edge is located between the two middle pixels, which are among the four pixels that are adjacent in series to one another in the image, the setting of the predetermined boundary between the two middle pixels in cases where it is detected that an edge is located between the two middle pixels, the judgment made as to the position of the new pixel in cases where it is detected that an edge is located between the two middle pixels, the calculation, which is made to find the pixel value of the new pixel in cases where it is detected that an edge is located between the two middle pixels, and the calculation, which is made to find the pixel value of the new pixel in cases where it is detected that an edge is not located between the two middle pixels, are thereafter performed with respect to the other direction in the image, an image, which has a size having been enlarged or reduced with respect to the other direction in the image, being thereby obtained, whereby the image, which has a size having been enlarged or reduced with respect to the one direction and the other direction in the image, is obtained; and making a judgment as to a shape of a profile of pixel values in a region in a vicinity of the four pixels that are adjacent in series to one another in the image, the judgment as to the shape of the profile of pixel values being made in accordance with the relationship of the positive and the negative signs among the three primary differences and the two secondary differences.

24. A tangible computer readable recording medium as defined in claim 23, wherein the machine readable storage medium tangibly encoded with medium-readable instructions for the computer program further comprises the procedure for: performing filtering processing with a difference filter and on two middle pixels, which are among the four pixels that are adjacent in series to one another in the image, a difference between pixel values of the two middle pixels, which are among the four pixels that are adjacent in series to one another in the image, being obtained from the filtering processing, and wherein the procedure for detecting as to whether an edge is located between the two middle pixels, which are among the four pixels that are adjacent in series to one another in the image, is a procedure for making the detection in accordance with the relationship of positive and negative signs among the three primary differences and the two secondary differences, and in accordance with a result of a judgment having been made as to whether an absolute value of the difference between the pixel values of the two middle pixels, which are among the four pixels that are adjacent in series to one another in the image, is equal to at least a predetermined threshold value.

* * * * *